US007932345B2

(12) United States Patent  (10) Patent No.: US 7,932,345 B2
Jernigan et al.  (45) Date of Patent: *Apr. 26, 2011

(54) ALUMINUM CONTAINING POLYESTER POLYMERS HAVING LOW ACETALDEHYDE GENERATION RATES

(75) Inventors: Mary Therese Jernigan, Kingsport, TN (US); Rodney Scott Armentrout, Kingsport, TN (US); Kenrick Venett, Blountville, TN (US); Bruce Roger DeBruin, Lexington, SC (US)

(73) Assignee: Grupo Petrotemex, S.A. de C.V., San Pedro Garza Garcia (MX)

( * ) Notice: Subject to any disclaimer, the term of this patent is extended or adjusted under 35 U.S.C. 154(b) by 334 days.

This patent is subject to a terminal disclaimer.

(21) Appl. No.: 11/495,431

(22) Filed: Jul. 28, 2006

(65) Prior Publication Data
US 2007/0066791 A1 Mar. 22, 2007

Related U.S. Application Data

(60) Provisional application No. 60/718,286, filed on Sep. 16, 2005, now abandoned.

(51) Int. Cl.
C08G 63/02 (2006.01)
C08G 64/00 (2006.01)
(52) U.S. Cl. ............ 528/272; 264/176.1; 264/219; 422/131; 482/411.1; 482/412; 502/150; 528/271
(58) Field of Classification Search .............. 264/176.1, 264/219; 482/411.1, 412; 502/150; 422/131; 528/271, 272
See application file for complete search history.

(56) References Cited

U.S. PATENT DOCUMENTS

| | | | |
|---|---|---|---|
| 2,720,506 A | 10/1955 | Caldwell et al. |
| 2,808,390 A | 10/1957 | Caldwell et al. |
| 2,965,613 A | 12/1960 | Milone et al. |
| 3,264,255 A | 8/1966 | Taylor |
| 3,420,913 A | 1/1969 | Railsback |
| 3,451,971 A | 6/1969 | Lazarus |
| 3,528,945 A | 9/1970 | Stewart et al. |
| 3,528,946 A | 9/1970 | Stewart et al. |
| 3,533,973 A | 10/1970 | Stewart et al. |
| 3,538,045 A | 11/1970 | Stewart et al. |
| 3,624,040 A | 11/1971 | Rath et al. |
| 3,631,153 A | 12/1971 | Carter et al. |
| 3,682,864 A | 8/1972 | Siclari et al. |
| 3,733,309 A | 5/1973 | Wyeth et al. |
| 3,852,262 A | 12/1974 | Vit et al. |
| 3,880,582 A | 4/1975 | Sawaya |
| 4,087,482 A | 5/1978 | Shaffer |
| 4,093,593 A | 6/1978 | Go |
| 4,100,142 A | 7/1978 | Schaefer et al. |
| 4,107,149 A | 8/1978 | Bier et al. |
| 4,124,566 A | 11/1978 | Saiki et al. |
| 4,159,301 A | 6/1979 | Buser et al. |
| 4,161,571 A | 7/1979 | Yasui et al. |
| 4,169,006 A | 9/1979 | Matsubara et al. |
| 4,185,043 A | 1/1980 | Shaffer |
| 4,228,549 A | 10/1980 | Rispoli |
| 4,230,595 A | 10/1980 | Yamaji et al. |
| 4,250,078 A | 2/1981 | McFarlane et al. |
| 4,260,735 A | 4/1981 | Bander et al. |
| 4,289,871 A | 9/1981 | Rowan et al. |
| 4,330,661 A | 5/1982 | Go |
| 4,343,922 A | 8/1982 | Shaffer |
| 4,357,461 A | 11/1982 | Go et al. |
| 4,401,804 A | 8/1983 | Wooten et al. |
| 4,408,004 A | 10/1983 | Pengilly |
| 4,420,581 A | 12/1983 | McFarlane et al. |
| 4,424,337 A | 1/1984 | Smith et al. |
| 4,433,135 A | 2/1984 | Worley et al. |
| 4,434,276 A | 2/1984 | Horlbeck et al. |
| 4,440,924 A | 4/1984 | Kuze et al. |
| 4,447,595 A | 5/1984 | Smith et al. |
| 4,476,272 A | 10/1984 | Pengilly |
| 4,481,314 A | 11/1984 | Rule |
| 4,499,288 A | 2/1985 | Harris |
| 4,501,878 A | 2/1985 | Adams |
| 4,520,078 A | 5/1985 | Rabinowitz et al. |
| 4,535,118 A | 8/1985 | Pengilly |

(Continued)

FOREIGN PATENT DOCUMENTS

AT 259232 4/1965

(Continued)

OTHER PUBLICATIONS

*Plastic Additives Handbook*, 5th Ed., 2001, pp. 123-136, Hanser Gardner Publications.

Fred W. Billmeyer, Jr., Methods for Estimating Intrinsic Vicosity, *Journal of Polymer Science*, 4, 1949, pp. 83-86, E.I. du Pont de Nemours and Co., Arlington, New Jersey.

Carl W. Fuller, Colored Iron Oxide Pigments, *Synthetic Pigment Handbook*, 1973, pp. 333-349, vol. 1, John Wiley and Sons, New York.

(Continued)

*Primary Examiner* — Terressa M Boykin
(74) *Attorney, Agent, or Firm* — Oblon, Spivak, McClelland, Maier & Neustadt, L.L.P.

(57) ABSTRACT

A polyester polymer composition containing polyester polymers such as polymers having repeating ethylene terephthalate units, aluminum atoms in an amount of at least 3 ppm based on the weight of the polymer, the polyester polymers having an It.V. of at least 0.72 dL/g obtained through a melt phase polymerization and a residual acetaldehyde level of 10 ppm or less. Also provided are polyester polymer compositions containing polyester polymers and:
(i) aluminum atoms
(ii) alkaline earth metal atoms or alkali metal atoms or alkali compound residues, and
(iii) a catalyst deactivator such as a phosphorus compound. The phosphorus compound is added to the polyester melt either late in the polycondensation or upon remelting a solid polyester polymer. The polyester polymer exhibits good L* brightness, clarity, and low levels of acetaldehyde generated upon melting.

125 Claims, No Drawings

U.S. PATENT DOCUMENTS

| | | | |
|---|---|---|---|
| 4,551,368 A | 11/1985 | Smith et al. |
| 4,604,303 A | 8/1986 | Takakura et al. |
| 4,613,664 A | 9/1986 | Tate et al. |
| 4,617,374 A | 10/1986 | Pruett et al. |
| 4,619,987 A | 10/1986 | Saiki et al. |
| 4,647,650 A | 3/1987 | Sasaki et al. |
| 4,686,274 A | 8/1987 | Harris et al. |
| 4,702,963 A | 10/1987 | Phillips et al. |
| 4,704,417 A | 11/1987 | Bonin et al. |
| 4,705,844 A | 11/1987 | Espenschied et al. |
| 4,740,377 A | 4/1988 | Dawes et al. |
| 4,764,323 A | 8/1988 | Al Ghatta |
| 4,775,598 A | 10/1988 | Jaeckel |
| 4,806,696 A | 2/1989 | Job |
| 4,831,115 A | 5/1989 | Golba, Jr. et al. |
| 4,845,186 A | 7/1989 | Chujo et al. |
| 4,871,790 A | 10/1989 | Lamanna et al. |
| 4,876,230 A | 10/1989 | Job |
| 4,906,693 A | 3/1990 | Craun et al. |
| 5,008,230 A | 4/1991 | Nichols |
| 5,041,405 A | 8/1991 | Lunsford et al. |
| 5,049,647 A | 9/1991 | Al-Ghatta |
| 5,090,134 A | 2/1992 | Russemeyer et al. |
| 5,104,965 A | 4/1992 | Jenkins et al. |
| 5,114,570 A | 5/1992 | Nelson et al. |
| 5,124,301 A | 6/1992 | Wyness et al. |
| 5,220,140 A | 6/1993 | Ball et al. |
| 5,250,333 A | 10/1993 | McNeely et al. |
| 5,254,288 A | 10/1993 | Verheijen et al. |
| 5,258,233 A | 11/1993 | Mills et al. |
| 5,266,413 A | 11/1993 | Mills et al. |
| 5,296,587 A | 3/1994 | Sumner, Jr. et al. |
| 5,300,746 A | 4/1994 | Walters et al. |
| 5,310,977 A | 5/1994 | Stenkamp et al. |
| 5,318,797 A | 6/1994 | Matijevic et al. |
| 5,322,883 A | 6/1994 | Adyha et al. |
| 5,331,066 A | 7/1994 | Takanoo et al. |
| 5,340,884 A | 8/1994 | Mills et al. |
| 5,367,070 A | 11/1994 | Nath et al. |
| 5,372,864 A | 12/1994 | Weaver et al. |
| 5,382,157 A | 1/1995 | Denis et al. |
| 5,384,377 A | 1/1995 | Weaver et al. |
| 5,393,871 A | 2/1995 | Yau et al. |
| 5,403,807 A | 4/1995 | Narula |
| 5,409,983 A | 4/1995 | Jones et al. |
| 5,410,984 A | 5/1995 | Pikus et al. |
| 5,419,936 A | 5/1995 | Tindale |
| 5,496,887 A | 3/1996 | Braune |
| 5,514,462 A | 5/1996 | Endo et al. |
| 5,519,112 A | 5/1996 | Harazoe et al. |
| 5,529,744 A | 6/1996 | Tindale |
| 5,573,820 A | 11/1996 | Harazoe et al. |
| 5,589,530 A | 12/1996 | Walsh |
| 5,593,740 A | 1/1997 | Strumban et al. |
| 5,608,027 A | 3/1997 | Crosby et al. |
| 5,610,231 A | 3/1997 | Braune |
| 5,646,208 A | 7/1997 | Cattron et al. |
| 5,648,032 A | 7/1997 | Nelson et al. |
| 5,656,221 A | 8/1997 | Schumann et al. |
| 5,656,716 A | 8/1997 | Schmidt et al. |
| 5,674,801 A | 10/1997 | George |
| 5,688,874 A | 11/1997 | Hoffman |
| 5,718,860 A | 2/1998 | Lee et al. |
| 5,733,969 A | 3/1998 | Thiele |
| 5,774,571 A | 6/1998 | Marshall |
| 5,830,544 A | 11/1998 | Kerscher et al. |
| 5,830,981 A | 11/1998 | Koreishi et al. |
| 5,837,786 A | 11/1998 | Miyoshi et al. |
| 5,851,668 A | 12/1998 | Sandor et al. |
| 5,886,133 A | 3/1999 | Hilbert et al. |
| 5,898,058 A | 4/1999 | Nichols et al. |
| 5,906,882 A | 5/1999 | Valente et al. |
| 5,925,710 A | 7/1999 | Wu et al. |
| 5,940,022 A | 8/1999 | Takatsu |
| 5,945,460 A | 8/1999 | Ekart et al. |
| 5,962,608 A | 10/1999 | Ryang et al. |
| 5,976,450 A | 11/1999 | Mreijen |
| 5,998,004 A | 12/1999 | Nishino et al. |
| 6,020,419 A | 2/2000 | Bock et al. |
| 6,020,421 A | 2/2000 | Fukushima et al. |
| 6,022,920 A | 2/2000 | Maxwell et al. |
| 6,031,128 A | 2/2000 | Roh et al. |
| 6,034,202 A | 3/2000 | Aharoni et al. |
| 6,036,905 A | 3/2000 | Park et al. |
| 6,042,773 A | 3/2000 | Teramoto et al. |
| 6,063,827 A | 5/2000 | Sacripante et al. |
| 6,066,714 A | 5/2000 | Putzig et al. |
| 6,099,778 A | 8/2000 | Nelson et al. |
| 6,150,454 A | 11/2000 | Wu et al. |
| 6,156,867 A | 12/2000 | Aoyama et al. |
| 6,165,601 A | 12/2000 | Noda et al. |
| 6,166,170 A | 12/2000 | Putzig |
| 6,197,851 B1 | 3/2001 | Maxwell et al. |
| 6,200,659 B1 | 3/2001 | Fujimori et al. |
| 6,214,915 B1 | 4/2001 | Avakian et al. |
| 6,261,656 B1 | 7/2001 | Semersky |
| 6,274,212 B1 | 8/2001 | Rule et al. |
| 6,274,852 B1 | 8/2001 | Blok et al. |
| 6,281,278 B1 | 8/2001 | Takase et al. |
| 6,300,399 B1 | 10/2001 | Gallucci et al. |
| 6,313,200 B1 | 11/2001 | Finder |
| 6,316,584 B1 | 11/2001 | Seidel et al. |
| 6,323,271 B1 | 11/2001 | Caldwell et al. |
| 6,346,070 B1 | 2/2002 | Ohmatsuza et al. |
| 6,358,578 B1 | 3/2002 | Otto et al. |
| 6,365,659 B1 * | 4/2002 | Aoyama et al. ............... 524/399 |
| 6,384,180 B1 | 5/2002 | Jernigan et al. |
| 6,417,320 B1 | 7/2002 | Otto et al. |
| 6,427,826 B1 | 8/2002 | Li et al. |
| 6,428,882 B1 | 8/2002 | Peiffer et al. |
| 6,451,959 B1 | 9/2002 | Ohmatsuzawa et al. |
| 6,458,915 B1 | 10/2002 | Quillen |
| 6,465,098 B2 | 10/2002 | Mizuguchi et al. |
| 6,472,471 B2 | 10/2002 | Cooke et al. |
| 6,472,500 B2 | 10/2002 | Dhawan et al. |
| 6,473,024 B2 | 10/2002 | Toyoda et al. |
| 6,489,434 B2 | 12/2002 | Jen |
| 6,498,212 B1 | 12/2002 | Kao et al. |
| 6,500,890 B2 | 12/2002 | Edwards et al. |
| 6,500,915 B1 | 12/2002 | Fujimori et al. |
| 6,503,586 B1 | 1/2003 | Wu et al. |
| 6,541,598 B2 | 4/2003 | Duan et al. |
| 6,559,271 B2 | 5/2003 | Schaaf et al. |
| 6,569,479 B2 | 5/2003 | Rule |
| 6,569,991 B2 | 5/2003 | Nichols et al. |
| 6,572,810 B2 | 6/2003 | Chatterjee et al. |
| 6,573,359 B2 | 6/2003 | Nichols et al. |
| 6,590,069 B2 | 7/2003 | Nichols et al. |
| 6,599,596 B2 | 7/2003 | Nichols et al. |
| 6,601,987 B2 | 8/2003 | Finder et al. |
| 6,638,456 B2 | 10/2003 | Klein et al. |
| 6,649,731 B2 | 11/2003 | Hori et al. |
| 6,660,792 B2 | 12/2003 | Massey et al. |
| 6,710,158 B2 | 3/2004 | Edwards et al. |
| 6,716,904 B2 | 4/2004 | Takahashi |
| 6,727,306 B2 | 4/2004 | Edwards et al. |
| 6,733,873 B2 | 5/2004 | Mizutani et al. |
| 6,773,800 B2 | 8/2004 | Hosoe et al. |
| 6,774,204 B1 | 8/2004 | Putzig |
| 6,777,048 B2 | 8/2004 | Quillen |
| 6,780,916 B2 | 8/2004 | Tung et al. |
| 6,787,630 B1 | 9/2004 | Dominguez De Walter et al. |
| 6,797,401 B2 | 9/2004 | Herron |
| 6,803,082 B2 | 10/2004 | Nichols et al. |
| 6,827,897 B2 | 12/2004 | Hall et al. |
| 6,828,272 B2 | 12/2004 | Wiegner et al. |
| 6,852,388 B2 | 2/2005 | Murschall et al. |
| 6,887,947 B1 | 5/2005 | Schaefer et al. |
| 6,896,830 B2 | 5/2005 | Carlton et al. |
| 6,896,966 B2 | 5/2005 | Crawford et al. |
| 6,953,768 B2 | 10/2005 | Wallace et al. |
| 7,048,995 B2 | 5/2006 | Fujimori et al. |
| 7,129,317 B2 | 10/2006 | Moore et al. |
| 2002/0011694 A1 | 1/2002 | Nichols et al. |
| 2002/0032300 A1 | 3/2002 | Dowling et al. |
| 2002/0077443 A1 | 6/2002 | Nichols et al. |
| 2002/0087027 A1 | 7/2002 | Lindall et al. |

| | | | | | | |
|---|---|---|---|---|---|---|
| 2002/0091226 A1 | 7/2002 | Nichols et al. | | JP | 48056782 | 8/1973 |
| 2002/0094402 A1 | 7/2002 | Jen | | JP | 48056783 | 8/1973 |
| 2002/0128427 A1 | 9/2002 | Schaaf et al. | | JP | 48056784 | 8/1973 |
| 2002/0136808 A1 | 9/2002 | Rule | | JP | 48-79896 | 10/1973 |
| 2002/0137872 A1 | 9/2002 | Schneider et al. | | JP | 48031991 | 10/1973 |
| 2002/0137879 A1 | 9/2002 | Ohmatsuzawa et al. | | JP | 48079898 | 10/1973 |
| 2002/0193555 A1 | 12/2002 | Hori et al. | | JP | 48038634 | 11/1973 |
| 2002/0198297 A1 | 12/2002 | Odorisio et al. | | JP | 48038635 | 11/1973 |
| 2003/0018160 A1 | 1/2003 | Otto et al. | | JP | 48038637 | 11/1973 |
| 2003/0040564 A1 | 2/2003 | Tung et al. | | JP | 73035948 | 11/1973 |
| 2003/0045673 A1 | 3/2003 | Nakajima et al. | | JP | 48044959 | 12/1973 |
| 2003/0083191 A1 | 5/2003 | Nakajima et al. | | JP | 48099133 | 12/1973 |
| 2003/0108702 A1 | 6/2003 | Tung et al. | | JP | 48102191 | 12/1973 |
| 2003/0144459 A1 | 7/2003 | Fujimori et al. | | JP | 49005918 | 1/1974 |
| 2003/0216253 A1 | 11/2003 | Wiegner et al. | | JP | 49010834 | 1/1974 |
| 2004/0023000 A1 | 2/2004 | Young et al. | | JP | 49006835 | 2/1974 |
| 2004/0058805 A1 | 3/2004 | Nakajima et al. | | JP | 49006839 | 2/1974 |
| 2004/0077486 A1 | 4/2004 | Bellamy et al. | | JP | 49009116 | 3/1974 |
| 2004/0096609 A1 | 5/2004 | Nichols et al. | | JP | 49045014 | 4/1974 |
| 2004/0101642 A1 | 5/2004 | Quillen et al. | | JP | 49045015 | 4/1974 |
| 2004/0102316 A1 | 5/2004 | Wallace et al. | | JP | 49 032676 | 9/1974 |
| 2004/0106767 A1 | 6/2004 | Simon et al. | | JP | 50039711 | 4/1975 |
| 2004/0127653 A1 | 7/2004 | Ellington et al. | | JP | 51042795 | 4/1976 |
| 2004/0138057 A1 | 7/2004 | Wenzel | | JP | 51127195 | 11/1976 |
| 2004/0178386 A1 | 9/2004 | Tung et al. | | JP | 51145594 | 12/1976 |
| 2004/0180159 A1 | 9/2004 | Neal et al. | | JP | 52-039790 | 3/1977 |
| 2004/0180996 A1 | 9/2004 | Pearson et al. | | JP | 52123489 | 10/1977 |
| 2004/0180997 A1 | 9/2004 | Pearson et al. | | JP | 52129798 | 10/1977 |
| 2004/0185198 A1 | 9/2004 | Sisson et al. | | JP | 53051294 | 5/1978 |
| 2004/0192813 A1 | 9/2004 | Pearson et al. | | JP | 53051295 | 5/1978 |
| 2004/0224842 A1 | 11/2004 | Wallace et al. | | JP | 53052595 | 5/1978 |
| 2004/0225104 A1 | 11/2004 | Wiegner et al. | | JP | 53105591 | 9/1978 |
| 2004/0235640 A1 | 11/2004 | Sterzel | | JP | 54135896 | 10/1979 |
| 2004/0236066 A1 | 11/2004 | Moore et al. | | JP | 54163996 | 12/1979 |
| 2004/0241468 A1 | 12/2004 | Otaki | | JP | 55089332 | 7/1980 |
| 2004/0249113 A1 | 12/2004 | Quillen et al. | | JP | 55115425 | 9/1980 |
| 2005/0107576 A1 | 5/2005 | Hori et al. | | JP | 55149320 | 11/1980 |
| 2005/0153086 A1 | 7/2005 | Moore et al. | | JP | 56008431 | 1/1981 |
| 2005/0203267 A1* | 9/2005 | Jernigan et al. ............... 528/271 | | JP | 56-149423 | 11/1981 |
| 2005/0222345 A1 | 10/2005 | Nakayama et al. | | JP | 57038609 | 8/1982 |
| 2006/0223958 A1* | 10/2006 | Fischbuch ...................... 526/68 | | JP | 58109532 | 6/1983 |
| 2006/0287472 A1 | 12/2006 | Jernigan | | JP | 59-015427 | 1/1984 |
| 2007/0106055 A1 | 5/2007 | Kageyama et al. | | JP | 60-31526 | 2/1985 |
| 2007/0203279 A1 | 8/2007 | Jarvis et al. | | JP | 60139750 | 7/1985 |
| | | | | JP | 60-151826 | 8/1985 |

FOREIGN PATENT DOCUMENTS

| | | | | | | |
|---|---|---|---|---|---|---|
| CN | 1392174 | 1/2003 | | JP | 60202148 | 10/1985 |
| CN | 1482154 | 3/2004 | | JP | 60219226 | 11/1985 |
| DE | 1950553 | 4/1970 | | JP | 61-278558 | 12/1986 |
| EP | 0578464 | 1/1994 | | JP | 61-291650 | 12/1986 |
| EP | 0581246 | 2/1994 | | JP | 62-039208 | 2/1987 |
| EP | 699700 | 3/1996 | | JP | 62152715 | 7/1987 |
| EP | 0541702 | 9/1996 | | JP | 62161827 | 7/1987 |
| EP | 0465040 | 1/1997 | | JP | 62-177035 | 8/1987 |
| EP | 0884365 | 12/1998 | | JP | 62207337 | 9/1987 |
| EP | 0921144 | 6/1999 | | JP | 62297318 | 12/1987 |
| EP | 1065230 | 1/2001 | | JP | 2000128971 | 12/1987 |
| EP | 1152035 | 11/2001 | | JP | 63-264661 | 11/1988 |
| EP | 1477506 | 11/2004 | | JP | 63-315604 | 12/1988 |
| EP | 1227117 | 12/2004 | | JP | 62-182065 | 1/1989 |
| EP | 1516892 | 3/2005 | | JP | 22-14734 | 8/1990 |
| EP | 1535944 | 6/2005 | | JP | 3146707 | 6/1991 |
| EP | 1548046 | 6/2005 | | JP | 3161509 | 7/1991 |
| EP | 1239006 | 7/2005 | | JP | 3292323 | 12/1991 |
| EP | 1818352 A1 | 8/2007 | | JP | 4370142 | 12/1992 |
| GB | 673066 | 6/1952 | | JP | 5097990 | 4/1993 |
| GB | 1337751 | 11/1973 | | JP | 5-117379 | 5/1993 |
| JP | 46-35500 | 10/1971 | | JP | 5-287067 | 11/1993 |
| JP | 46040711 | 12/1971 | | JP | 05097990 | 11/1993 |
| JP | 46040713 | 12/1971 | | JP | 6087953 | 3/1994 |
| JP | 46040714 | 12/1971 | | JP | 06-184333 | 7/1994 |
| JP | 46041025 | 12/1971 | | JP | 62-71949 | 9/1994 |
| JP | 46041031 | 12/1971 | | JP | 62-79599 | 10/1994 |
| JP | 46041033 | 12/1971 | | JP | 6286088 | 10/1994 |
| JP | 47039497 | 11/1972 | | JP | 1994306154 | 11/1994 |
| JP | 47042989 | 12/1972 | | JP | 7133412 | 5/1995 |
| JP | 48005798 | 1/1973 | | JP | 7224218 | 8/1995 |
| JP | 48007272 | 3/1973 | | JP | 72-68188 | 10/1995 |
| JP | 48026955 | 8/1973 | | JP | 1995268188 | 10/1995 |
| | | | | JP | 1996003301 | 1/1996 |

| | | |
|---|---|---|
| JP | 1996283398 | 10/1996 |
| JP | 8325364 | 12/1996 |
| JP | 1997040850 | 2/1997 |
| JP | 9176464 | 7/1997 |
| JP | 9176465 | 7/1997 |
| JP | 9183892 | 7/1997 |
| JP | 09-256220 | 9/1997 |
| JP | 9272793 | 10/1997 |
| JP | 52129799 | 10/1997 |
| JP | 10316765 | 12/1998 |
| JP | 11005892 | 1/1999 |
| JP | 1999071106 | 3/1999 |
| JP | 1999152324 | 6/1999 |
| JP | 11-181067 | 7/1999 |
| JP | 1999236440 | 8/1999 |
| JP | 2000128970 | 5/2000 |
| JP | 2000129102 | 5/2000 |
| JP | 2000226446 | 8/2000 |
| JP | 2000302854 | 10/2000 |
| JP | 200126639 | 1/2001 |
| JP | 2001 098418 | 4/2001 |
| JP | 2001163964 | 6/2001 |
| JP | 2001262016 | 9/2001 |
| JP | 2001 278970 | 10/2001 |
| JP | 2001 354759 | 12/2001 |
| JP | 2002 249569 | 9/2002 |
| JP | 2002249648 | 9/2002 |
| JP | 2002249653 | 9/2002 |
| JP | 2002322254 | 11/2002 |
| JP | 2002322258 | 11/2002 |
| JP | 2002332337 | 11/2002 |
| JP | 2003040992 | 2/2003 |
| JP | 2003113230 | 4/2003 |
| JP | 2003113232 | 4/2003 |
| JP | 2003171454 | 6/2003 |
| JP | 2003171455 | 6/2003 |
| JP | 2003-268628 | 9/2003 |
| JP | 2003261666 | 9/2003 |
| JP | 2003268093 | 9/2003 |
| JP | 2003301038 | 10/2003 |
| JP | 2003301090 | 10/2003 |
| JP | 2003301093 | 10/2003 |
| JP | 2003306536 | 10/2003 |
| JP | 2003306538 | 10/2003 |
| JP | 2003306541 | 10/2003 |
| JP | 2003306601 | 10/2003 |
| JP | 2004035659 | 2/2004 |
| JP | 2004035660 | 2/2004 |
| JP | 2004059735 A | 2/2004 |
| JP | 2004067733 | 3/2004 |
| JP | 2004149790 | 5/2004 |
| JP | 2004156055 | 6/2004 |
| JP | 2004197088 | 7/2004 |
| JP | 2004204138 | 7/2004 |
| JP | 2004224858 | 8/2004 |
| JP | 2004256633 | 9/2004 |
| JP | 2004323627 | 11/2004 |
| JP | 2005023160 | 1/2005 |
| JP | 2005047960 | 2/2005 |
| JP | 2005047961 | 2/2005 |
| JP | 2005047962 | 2/2005 |
| JP | 2005187556 | 7/2005 |
| JP | 2005187557 | 7/2005 |
| JP | 2005187558 | 7/2005 |
| JP | 2005187559 | 7/2005 |
| JP | 2005187560 | 7/2005 |
| JP | 2005187561 | 7/2005 |
| JP | 2005220234 | 8/2005 |
| JP | 2005213291 | 11/2005 |
| JP | 2005213292 | 11/2005 |
| JP | 2005213293 | 11/2005 |
| KR | 9303713 | 5/1993 |
| KR | 120831 | 7/1995 |
| KR | 9707952 | 5/1997 |
| KR | 2001089942 | 10/2001 |
| NL | 7113206 | 3/1972 |
| SU | 374343 | 7/1973 |
| WO | WO 96/03163 | 2/1996 |
| WO | 9728218 | 8/1997 |
| WO | WO 97/44376 | 11/1997 |
| WO | WO 98/41559 | 9/1998 |
| WO | WO 99/57173 | 11/1999 |
| WO | WO 01/14452 | 3/2001 |
| WO | WO 01/21680 | 3/2001 |
| WO | WO 01/46306 | 6/2001 |
| WO | WO 01/47688 | 7/2001 |
| WO | WO 02/18472 | 3/2002 |
| WO | WO 02/051616 | 7/2002 |
| WO | WO 02/057335 | 7/2002 |
| WO | WO 02/068497 | 9/2002 |
| WO | WO 02/072665 | 9/2002 |
| WO | WO 03/010226 | 2/2003 |
| WO | WO 2004/065452 | 8/2004 |
| WO | WO 2004/074365 | 9/2004 |
| WO | WO 2004/078825 | 9/2004 |
| WO | WO 2004/101645 | 11/2004 |
| WO | WO 2005/068531 | 7/2005 |
| WO | WO 2005/075539 | 8/2005 |
| WO | WO 2005/082527 | 9/2005 |
| WO | WO 2005/095516 | 10/2005 |

OTHER PUBLICATIONS

Fred W. Billmeyer, Jr., Principles of Color Technology, *Describing Color*, 1981, pp. 25-66, John Wiley and Sons, New York.

Kirk Othmer, Titanium and Titanium Alloys, *Encyclopedia of Chemical Technology*, vol. 24, 4$^{th}$ Ed., 1997, pp. 186-224; 225-349 and 801.

Louis E. Toth, Transition Metal Carbide and Nitrides, General Properties, Preparation and Characterization, 1971, p. 1-28, Academic Press, New York.

Kirk Othmer, *Encyclopedia of Chemical Technology*, vol. 17, 4$^{th}$ Ed., 1996, pp. 108-127.

Kirk Othmer, *Encyclopedia of Chemical Technology*, vol. 4, 4$^{th}$ Ed., 1992, pp. 841-848.

Kirk Othmer, *Encyclopedia of Chemical Technology*, vol. 4, 4$^{th}$ Ed., 1997, pp. 423-430.

Kirk Othmer, *Encyclopedia of Chemical Technology*, vol. 25, 4$^{th}$ Ed., 1998, pp. 872-873.

Kirk Othmer, *Encyclopedia of Chemical Technology*, vol. 23, 4$^{th}$ Ed., 1997, p. 676.

Kirk Othmer, *Encyclopedia of Chemical Technology*, vol. 6, 4$^{th}$ Ed., 1998, pp. 228-311.

Kirk Othmer, *Encyclopedia of Chemical Technology*, vol. 24, 4$^{th}$ Ed., 1998, pp. 572-602.

Kirk Othmer, *Encyclopedia of Chemical Technology*, vol. 14., 4$^{th}$ Ed., 1998, pp. 829-902.

Kirk Othmer, *Encyclopedia of Chemical Technology*, vol. 17, 4$^{th}$ Ed., 1998, pp. 1-42; 43-67.

Kirk Othmer, *Encyclopedia of Chemical Technology*, vol. 12, 4$^{th}$ Ed., 1998, pp. 863-881.

Kirk Othmer, *Encyclopedia of Chemical Technology*, vol. 22, 4$^{th}$ Ed., 1997, pp. 256-278.

Kirk Othmer, *Encyclopedia of Chemical Technology*, vol. 16, 4$^{th}$ Ed., pp. 925-962.

D.C. Allport and A.A. Mohajer, *Block Copolymers*, 1973, pp. 264-270, John Wiley and Sons, New York.

M.E. Stewart, A.J. Cox, D.M. Naylor, Reactive Processing of Poly(ethylene 2,6-naphthalene dicarboxylate)/poly(ethylene terephthalate) Blends, *Polymer*, 1993, pp. 4060-4067, vol. 34, No. 19; Butterworth-Heinemann Ltd.

Liu et al., Improving Oxygen Barrier Properties of Poly(ethylene terephthlate) by Incorporating Isophthalate. I. Effect of Orientation, *Journal of Applied Science*, Nov. 15, 2005, 98(4), pp. 1615-1628, Wiley Periodicals, Inc.

A. Boehm and A. Glaser, The Quaterrylimides-Highly Efficient NIR Absorbers for Plastics, ANTEC paper 2004, Chicago, IL, May 2004.

Wu, S., A Generalized Criterion for Rubber Toughening: The Critical Matrix Ligament Thickness, *Journal of Applied Polymer Science*, vol. 35, pp. 549-561, 1988, John Wiley and Sons.

Weissmann, Mariana, et al.; "Theoretical Study of carbon-Coated Iron Nanowires"; *Physical Review B 70*, 201401-1 through 201401-4; 2004; The American Physical Society.

Zhang, Z.D. et al.; "Shell/Core Structure and Magnetic Properties of Carbon-Coated Fe-Co© Nanocapsules"; *Journal of Physics: Condensed Matter 13*; 1921-1929; 2001; Institute of Physics Publishing Ltd.

*Encyclopedia of Chemical Technology*; 4th Ed; vol. 4; pp. 1015-1037; John Wiley and Sons, New York.
Pierson, H.O.; *Handbook of Carbon, Graphite, Diamond and Fullerenes: Properties and Applications*; pp. 122-140; Noyes Publications; 1993.
Love, Charles H., (Retired), *Colored Iron Oxide Pigments, Natural*; pp. 323-349.
Hans Meerwein and Theodor Bersin, Investigations of Metal Alcoholates and Ortho Acid Esters, Annalen der Chemie, Chemical Insitute of Marburg University, 1929, pp. 113-150, vol. 454765 (Abstract Only).
Hans Meerwein, Increase in Ionization Capacity of Weak Electrolytes as a Result of Complex Formation and its Significance for Catalytic Processes, Annalen der Chemie, Chemical Insitute of Konigsberg University, 1927, pp. 222-253, vol. 455 (Abstract only).
Research Disclosure 39771; Anonymous; May 1997.
Co-pending U.S. Appl. No. 11/154,208, filed Jun. 16, 2005.
Co-pending U.S. Appl. No. 11/229,367, filed Sep. 16, 2005.
Co-pending U.S. Appl. No. 11/229,238, filed Sep. 16, 2005.
Co-pending U.S. Appl. No. 11/500,862, filed Aug. 8, 2006.
International Search Report from pending U.S. Appl. No. 11/154,208, filed Jun. 16, 2005.
Terekhova, Mikhailov, Tokareva; Heat Stability of Polyethylene Terephthalate (PET) Containing Phosphoric Acid Esters; Khimicheskie Volokna; 1964; pp. 1-6; No. 4.
Terekhova, Petukhov; Blocking of Terminal Groups of Polyethylene Terephthalate with o-Phosphoric Acid; Nauka I Tekhnika (Science and Technology): Synthetic Fibers; pp. 1-5; No. 2.
Kamatani, Konagaya, Nakamura; Effect of Phosphoric Acid on the Polycondensation of Bis(2-hydroxyethyl) Terephthalate Catalyzed by Sb(III) Compounds; Polymer Journal; 1980; pp. 125-130; vol. 12; No. 2.
International Search Report from co-pending case U.S. Appl. No. 11/229,367, filed Sep. 16, 2005.
Office Action dated May 14, 2007 from co-pending U.S. Appl. No. 11/229,367.
Office Action dated Aug. 2, 2006 from co-pending U.S. Appl. No. 11/229,367.
Office Action dated Jan. 18, 2007 from co-pending U.S. Appl. No. 11/229,367.
U.S. Appl. No. 10/934,546, filed Sep. 3, 2004 now ABD.
Co-pending U.S. Appl. No. 10/996,924, filed Nov. 24, 2004.
U.S. Appl. No. 10/933,975, filed Sep. 3, 2004 now ABD.
Co-pending U.S. Appl. No. 10/996,944, filed Nov. 24, 2004.
U.S. Appl. No. 10/934,987, filed Sep. 3, 2004 now ABD.
Co-pending U.S. Appl. No. 10/997,040, filed Nov. 24, 2004.
Co-pending U.S. Appl. No. 11/005,689, filed Dec. 7, 2004.
Co-pending U.S. Appl. No. 11/372,819, filed Mar. 10, 2006.
Co-pending U.S. Appl. No. 10/988,226, filed Nov. 12, 2004.
Co-pending U.S. Appl. No. 11/373,251, filed Mar. 10, 2006.
Co-pending U.S. Appl. No. 11/502,814, filed Aug. 11, 2006.
Co-pending U.S. Appl. No. 10/988,263, filed Nov. 12, 2004.
Co-pending U.S. Appl. No. 11/095,834, filed Mar. 31, 2005.
Co-pending U.S. Appl. No. 11/054,194, filed Feb. 9, 2005.
Co-pending U.S. Appl. No. 11/228,773, filed Sep. 16, 2005.
Co-pending U.S. Appl. No. 11/228,733, filed Sep. 16, 2005.
U.S. Appl. No. 60/797,452, filed Mar. 4, 2006 now expired.
Co-pending U.S. Appl. No. 11/524,056, filed Sep. 20, 2006.
U.S. Appl. No. 10/988,133, filed Nov. 12, 2004 now ABD.
U.S. Appl. No. 11/094,034, filed Mar. 30, 2005 now ABD.
Co-pending U.S. Appl. No. 11/228,672, filed Sep. 16, 2005.
Office Action dated Sep. 7, 2007 from co-pending U.S. Appl. No. 10/997,040.
Office Action dated Sep. 6, 2007 from co-pending U.S. Appl. No. 10/988,263.
The International Search Report from International Application No. PCT/US06/34616.
Office Action dated Apr. 29, 2008 in Copending U.S. Appl. No. 11/229,238.
Office Action dated Dec. 18, 2008, in copending U.S. Appl. No. 11/229,238.
International Search Report dated Sep. 6, 2006, from PCT/US2006/34543.
Office Action dated Apr. 29, 2008, in copending U.S. Appl. No. 11/229,238.
Office Action dated Jun. 23, 2009, in copending U.S. Appl. No. 11/229,238.
Office Action dated Jan. 25, 2008 from copending U.S. Appl. No. 11/229,367.
Office Action dated May 15, 2008 from copending U.S. Appl. No. 11/229,367.
Notice of Allowance dated Nov. 7, 2008 from copending U.S. Appl. No. 11/229,367.
Notice of Allowance dated Dec. 30, 2008 from copending U.S. Appl. No. 11/229,367.
Office Action dated Apr. 6, 2009 from copending U.S. Appl. No. 11/229,367.
Notice of Allowance dated Aug. 4, 2009 from copending U.S. Appl. No. 11/229,367.
Office Action dated Mar. 17, 2008 from copending U.S. Appl. No. 10/996,924.
Office Action dated Oct. 1, 2008 from copending U.S. Appl. No. 10/996,924.
Office Action dated Feb. 27, 2009 from copending U.S. Appl. No. 10/996,924.
Office Action dated Aug. 28, 2009 from copending U.S. Appl. No. 10/996,924.
Notice of Allowance dated Dec. 2, 2009 from copending U.S. Appl. No. 10/996,924.
Office Action dated Oct. 4, 2007, from copending U.S. Appl. No. 10/996,944.
Office Action dated Feb. 20, 2008, from copending U.S. Appl. No. 10/996,944.
Office Action dated Jul. 30, 2008, from copending U.S. Appl. No. 10/996,944.
Office Action dated Feb. 26, 2009, from copending U.S. Appl. No. 10/996,944.
Office Action dated Jul. 17, 2009, from copending U.S. Appl. No. 10/996,944.
Office Action dated Apr. 2, 2008, from copending U.S. Appl. No. 10/997,040.
Office Action dated Aug. 20, 2008, from copending U.S. Appl. No. 10/997,040.
Office Action dated Apr. 10, 2009, from copending U.S. Appl. No. 10/997,040.
Office Action dated Sep. 16, 2009, from copending U.S. Appl. No. 10/997,040.
Office Action dated Nov. 9, 2009, from copending U.S. Appl. No. 11/154,208.
Office Action dated Jul. 2, 2009, from copending U.S. Appl. No. 11/154,208.
Office Action dated Jan. 12, 2009, from copending U.S. Appl. No. 11/154,208.
Office Action dated Aug. 6, 2008, from copending U.S. Appl. No. 11/154,208.
Office Action dated Dec. 7, 2005, from copending U.S. Appl. No. 11/005,689.
Office Action dated Jun. 8, 2006, from copending U.S. Appl. No. 11/005,689.
Office Action dated Nov. 8, 2006, from copending U.S. Appl. No. 11/005,689.
Office Action dated May 29, 2007, from copending U.S. Appl. No. 11/005,689.
Office Action dated Oct. 18, 2007, from copending U.S. Appl. No. 11/005,689.
Office Action dated Dec. 27, 2007, from copending U.S. Appl. No. 11/005,689.
Office Action dated May 21, 2008, from copending U.S. Appl. No. 11/005,689.
Office Action dated Sep. 30, 2008, from copending U.S. Appl. No. 11/005,689.
Office Action dated Feb. 26, 2009, from copending U.S. Appl. No. 11/005,689.
Office Action dated Jul. 2, 2009, from copending U.S. Appl. No. 11/005,689.

Office Action dated Jun. 21, 2007, from copending U.S. Appl. No. 11/372,819.
Office Action dated Nov. 14, 2007, from copending U.S. Appl. No. 11/372,819.
Office Action dated May 30, 2008, from copending U.S. Appl. No. 11/372,819.
Office Action dated Dec. 3, 2008, from copending U.S. Appl. No. 11/372,819.
Office Action dated May 28, 2009, from copending U.S. Appl. No. 11/372,819.
Office Action dated Nov. 29, 2005, from copending U.S. Appl. No. 10/988,226.
Office Action dated May 11, 2006, from copending U.S. Appl. No. 10/988,226.
Office Action dated Nov. 8, 2006, from copending U.S. Appl. No. 10/988,226.
Office Action dated Jun. 5, 2007, from copending U.S. Appl. No. 10/988,226.
Notice of Allowance dated Aug. 1, 2007, from copending U.S. Appl. No. 10/988,226.
Office Action dated Jul. 28, 2008, from copending U.S. Appl. No. 11/373,251.
Office Action dated Dec. 11, 2008, from copending U.S. Appl. No. 11/373,251.
Office Action dated Apr. 14, 2009, from copending U.S. Appl. No. 11/373,251.
Office Action dated Nov. 2, 2009, from copending U.S. Appl. No. 11/373,251.
Office Action dated Feb. 6, 2008, from copending U.S. Appl. No. 11/502,814.
Notice of Allowance dated Jul. 15, 2008, from copending U.S. Appl. No. 11/502,814.
Notice of Allowance dated Dec. 19, 2007, from copending U.S. Appl. No. 11/502,814.
Notice of Allowance dated Jun. 12, 2007, from copending U.S. Appl. No. 11/502,814.
Office Action dated Jan. 22, 2007, from copending U.S. Appl. No. 11/502,814.
Office Action dated Jul. 20, 2006, from copending U.S. Appl. No. 11/502,814.
Office Action dated May 13, 2008, from copending U.S. Appl. No. 10/988,263.
Office Action dated Jan. 22, 2009, from copending U.S. Appl. No. 10/988,263.
Office Action dated Jul. 10, 2009, from copending U.S. Appl. No. 10/988,263.
Office Action dated May 28, 2008, from copending U.S. Appl. No. 11/095,834.
Office Action dated Oct. 16, 2008, from copending U.S. Appl. No. 11/095,834.
Office Action dated Jan. 28, 2009, from copending U.S. Appl. No. 11/095,834.
Office Action dated Sep. 11, 2009, from copending U.S. Appl. No. 11/095,834.
Office Action dated Feb. 6, 2008, from copending U.S. Appl. No. 11/054,194.
Office Action dated Jul. 21, 2008, from copending U.S. Appl. No. 11/054,194.
Office Action dated Jan. 9, 2009, from copending U.S. Appl. No. 11/054,194.
Office Action dated Apr. 29, 2008, from copending U.S. Appl. No. 11/228,773.
Office Action dated Sep. 9, 2008, from copending U.S. Appl. No. 11/228,773.
Office Action dated Dec. 30, 2008, from copending U.S. Appl. No. 11/228,773.
Office Action dated Jun. 15, 2009, from copending U.S. Appl. No. 11/228,773.
Office Action dated Sep. 21, 2009, from copending U.S. Appl. No. 11/228,773.
Co-pending U.S. Appl. No. 11/500,800, filed Aug. 8, 2006.
Office Action dated Jul. 8, 2009, from copending U.S. Appl. No. 11/500,800.
Office Action dated Apr. 29, 2008, from copending U.S. Appl. No. 11/228,733.
Office Action dated Sep. 9, 2008, from copending U.S. Appl. No. 11/228,733.
Office Action dated Dec. 31, 2008, from copending U.S. Appl. No. 11/228,733.
Office Action dated Jun. 19, 2009, from copending U.S. Appl. No. 11/228,733.
Office Action dated Oct. 14, 2009, from copending U.S. Appl. No. 11/228,733.
International Search Report dated Sep. 5, 2006, from PCT/US2006/034524.
Office Action dated Sep. 29, 2008 from copending U.S. Appl. No. 11/500,862.
Office Action dated Apr. 2, 2009, from copending U.S. Appl. No. 11/500,862.
Office Action dated Feb. 20, 2009 from copending U.S. Appl. No. 11/524,056 (now abandoned).
Co-pending U.S. Appl. No. 11/495,416 filed Jul. 28, 2006.
Office Action dated Apr. 14, 2009 from copending U.S. Appl. No. 11/495,416 filed Jul. 28, 2006.
Office Action dated Oct. 21, 2009 from copending U.S. Appl. No. 11/495,416 filed Jul. 28, 2006.
Co-pending U.S. Appl. No. 11/714,942 filed Mar. 7, 2007.
Office Action dated Jan. 5, 2009, from copending U.S. Appl. No. 11/714,942.
Office Action dated Jun. 3, 2009, from copending U.S. Appl. No. 11/714,942.
Notice of Allowance dated Oct. 28, 2009, from copending U.S. Appl. No. 11/714,942.
Notice of Allowance dated Dec. 15, 2009, from copending U.S. Appl. No. 11/714,942.
Co-pending U.S. Appl. No. 11/495,870 filed Jul. 28, 2006.
Office Action dated Oct. 2, 2009, from copending U.S. Appl. No. 11/495,870.
Office Action dated Jun. 24, 2009, from copending U.S. Appl. No. 11/495,870.
Office Action dated Apr. 2, 2009, from copending U.S. Appl. No. 11/495,870.
Office Action dated Nov. 28, 2008 from co-pending U.S. Appl. No. 11/495,870.
Office Action dated May 27, 2008 from co-pending U.S. Appl. No. 11/495,870.
Office Action dated Jun. 12, 2009 from co-pending U.S. Appl. No. 11/594,282.
Co-pending U.S. Appl. No. 11/511,719 filed Aug. 29, 2006.
Office Action dated Sep. 18, 2009, from copending U.S. Appl. No. 11/511,719.
Office Action dated Mar. 10, 2009, from copending U.S. Appl. No. 11/511,719.
Office Action dated Nov. 24, 2008, from copending U.S. Appl. No. 11/511,719.
Office Action dated Jun. 4, 2008, from copending U.S. Appl. No. 11/511,719.
Co-pending U.S. Appl. No. 11/711,345 filed Feb. 27, 2007.
Office Action dated Jun. 12, 2009, from copending U.S. Appl. No. 11/711,345.
Fred Billmeyer, Principles of Color Technology, 1981, P188, John Wiley & Sons, New York.
Tomita, K., "Studies on the formation of poly(ethylene Terephthalate: 6. Catalytic activity of metal compounds in polycondensation of bis(2-hydroxyethyl) Terephthalate;" Polymer, vol. 17, pp. 221-224 (1976).
Hovenkamp, S.G.; "Kinetic Aspects of Catalyzed Reactions in the Formation of Poly(ethylene Terephthalate);" Journal of Polymer Science: Part A-1, vol. 9, pp. 3617-3625 (1971).
Office Action dated Jan. 26, 2010, in copending U.S. Appl. No. 11/229,238.
Copending U.S. Appl. No. 12/611,380 filed Nov. 3, 2009.
Office Action dated Dec. 16, 2009 in copending U.S. Appl. No. 12/611,380.
Office Action dated Nov. 9, 2009 in copending U.S. Appl. No. 11/154,208.

Office Action dated Sep. 24, 2009 in copending U.S. Appl. No. 12/200,976.
Office Action dated Feb. 24, 2010 in copending U.S. Appl. No. 12/200,976.
Office Action dated Jan. 22, 2010 in copending U.S. Appl. No. 10/988,263.
Office Action dated Feb. 5, 2010 in copending U.S. Appl. No. 11/500,862.
Notice of Allowance dated Dec. 28, 2009 in copending U.S. Appl. No. 11/495,870.
Notice of Allowance dated February 19, 2010 in copending U.S. Appl. No. 11/511,719.
Office Action dated Feb. 4, 2010 in copending U.S. Appl. No. 11/711,345.
The Merck Index, An Encyclopedia of Chemicals, Drugs, and Biologicals, Fourteenth Edition, p. 1628, Merck & Co. Inc., Whitehouse Station, New Jersey, 2006.
USPTO Notice of Allowance dated Dec. 18, 2009, from co-pending U.S. Appl. No. 11/229,367.
USPTO Office Action dated Apr. 7, 2010 from co-pending U.S. Appl. No. 12/611,380.
USPTO Notice of Allowance dated Jul. 15, 2010 from co-pending U.S. Appl. No. 12/611,380.
USPTO Office Action dated Aug. 8, 2005 from co-pending U.S. Appl. No. 11/094,034.
USPTO Office Action dated Jun. 22, 2010 from co-pending U.S. Appl. No. 10/988,263.
USPTO Notice of Allowance dated Mar. 8, 2010 from co-pending U.S. Appl. No. 11/228,773.
USPTO Notice of Allowance dated Mar. 15, 2010 from co-pending U.S. Appl. No. 11/500,800.
USPTO Notice of Allowance dated Jul. 6, 2010 from co-pending U.S. Appl. No. 11/500,800.
USPTO Notice of Allowance dated Apr. 2, 2010 from co-pending U.S. Appl. No. 11/228,733.
USPTO Office Action dated Jul. 21, 2010 from co-pending U.S. Appl. No. 11/500,862.
USPTO Notice of Allowance dated Apr. 14, 2010 from co-pending U.S. Appl. No. 12/611,380.
European Search Report dated Oct. 27, 2010 for corresponding EP Application 06790179.3.

* cited by examiner

ALUMINUM CONTAINING POLYESTER POLYMERS HAVING LOW ACETALDEHYDE GENERATION RATES

CROSS REFERENCE TO RELATED APPLICATIONS

This application claims priority to U.S. Provisional Patent Application No. 60/718,286, filed Sep. 16, 2005 (now abandoned).

1. FIELD OF THE INVENTION

The invention relates to polyester polymers containing repeating units of esters formed from diols and aryl dicarboxylic acids, and in particular to polyester polymers containing aluminum atoms to which a catalyst deactivator such as a phosphorus compound is added late to provide articles having low acetaldehyde levels.

2. BACKGROUND OF THE INVENTION

There are two types of acetaldehyde (AA) of concern. The first is residual or free AA contained in the pellets or particles sent to preform molders. The second type of AA is preform AA or the AA generated when the PET pellets are melt processed to make bottle preforms. AA precursors in the pellets can be converted to AA upon melting and give unacceptable levels of AA in the preforms. Melt processing also forms more AA precursors, which can liberate AA. Acetaldehyde has a noticeable taste and can be detected by human taste buds at low levels. Unacceptably high AA levels in preforms are those that adversely impact the taste of the beverage contained in the said bottles or those that exceed brand owners' specifications for the desired application.

Relatively tasteless beverages such as water are particularly negatively impacted by the strong taste of AA. Many water bottle applications require lower levels of preform AA than carbonated soft drink ("CSD") bottle applications. Converters who take polyester particles and make bottle preforms would like to have one resin that could be used to make preforms for both water and CSD applications. This would simplify the materials handling process at the converter by allowing for one feed silo or one type of feed silo for water and CSD applications, one product storage area or one type of product storage area for water and CSD applications, etc. Most resins sold into water bottle markets have a lower It.V. than those resins sold into CSD markets. A dual use resin would have to a high enough It.V. for CSD applications and a low enough level of preform AA for water bottle applications. The level of perform AA is impacted by the AA generation rate of polyester particles upon melting.

In order to use one resin, some converters are adding AA scavengers to CSD resins to get acceptable perform AA for the water bottle market. AA scavengers add significant cost to the container and often negatively impact the color of the container by making it either more yellow or darker as compared to an analogous container without AA scavenger added. Certain carriers for AA scavengers hurt preform appearance, and subsequently bottle appearance, due to more or larger black specks relative to an analogous preform or bottle without AA scavenger and its carrier added.

There is cost savings associated with manufacturing polyesters entirely in the melt phase. There are also subsequent melt processing advantages to avoiding solid-phase polycondensation. Injection molding to make preforms is an example of melt processing. For instance, solid-stated polyester particles develop large shell to core It.V. gradients, which result in larger It.V. losses during melt processing. In addition, solid-stated polyesters have higher melting points due to the annealing that occurs during solid-stating. On the other hand, there is also some quality concerns associated with manufacturing polyesters entirely in the melt phase. Making a high intrinsic viscosity polyester polymer exclusively in the melt phase increases the time exposed to the elevated temperatures necessary to keep the polyester molten, relative to a conventional process with both melt-phase and solid-phase steps. Increasing the time at melt temperatures increases the formation of AA precursors in the molten polyester, which is cooled and formed into polyester particles. During subsequent melt processing of the polyester particles to form articles, the AA precursors, which are present at higher levels, are converted to AA; therefore, high IV polyester particles made entirely in the melt phase have higher AA generation rates upon melting, relative to high IV polyester particles made by a conventional process. It also follows that high IV polyester particles made entirely in the melt phase have higher preform AA levels than high IV polyester particles made by a conventional process using solid state polymerization techniques.

During subsequent melt processing of the polyester particles to form articles such as preforms, the polycondensation catalyst can catalyze the reactions of the AA precursors to form AA. The polycondensation catalyst can also catalyze the reactions to form AA precursors.

There is a need for a polyester polymer built to a high IV entirely in the melt phase and thereby avoids the costly step of solid state polymerization with its melt processing disadvantages, yet generates low amounts of AA upon remelting in the absence of added AA scavengers since scavengers either add cost, black specks or darken/yellow the polymer or all of the above. The need is especially acute in the water bottle market which demands very low levels of AA in preforms and bottles. It would be even more desirable if the same polyester composition can meet the IV requirements of the CSD bottle market.

3. SUMMARY OF THE INVENTION

In one aspect of the invention, there is now provided a polyester polymer composition comprising: polyester polymers comprising repeating alkylene arylate units and aluminum atoms in an amount of at least 3 ppm based on the weight of the polymer, said polymer having an It.V. of at least 0.72 dL/g obtained through a melt phase polymerization and a residual acetaldehyde level of 10 ppm or less.

In another aspect of the invention, there is provided a polyester composition comprising polyester polymers and:
 (i) aluminum atoms
 (ii) alkaline earth metal atoms or alkali metal atoms or alkali compound residues, and
 (iii) a catalyst deactivator effective to at least partially deactivate the catalytic activity of the combination of said (i) aluminum atoms and (ii) alkaline earth metal atoms or alkali metal atoms or alkali compound residues.

There is also provided a process for the manufacture of polyester polymers, comprising adding phosphorus atoms to a polyester melt, said polyester melt containing a) aluminum atoms and b) alkaline earth metal atoms or alkali metal atoms or alkali compound residues, wherein the phosphorus atoms are added to the polyester melt when one or more of the following conditions are satisfied or thereafter and before solidification of the polyester melt:
 a) the polyester melt reaches an It.V. of at least 0.50 dL/g or
 b) vacuum applied to the polyester melt, if any, is at least partially released, or
 c) if the polyester melt is present in a melt phase polymerization process, adding the phosphorus compound within a final reactor for making the polyester polymer or between the final reactor and before a cutter for cutting the polyester melt, or d) if the polyester melt is present in a melt phase polymerization process, following at least 85% of the time for polycondensing the polyester melt; or e) the It.V. of the polyester melt is within 0.10 dL/g of the It.V. obtained upon solidification; or f) at a point within 20 minutes or less of solidifying the polyester melt.

3. DETAILED DESCRIPTION OF THE INVENTION

The present invention may be understood more readily by reference to the following detailed description of the invention.

It must also be noted that, as used in the specification and the appended claims, the singular forms "a," "an" and "the" include plural referents unless the context clearly dictates otherwise. For example, reference to processing or making a "polymer," a "preform," "article," "container," or "bottle" is intended to include the processing or making of a plurality of polymers, preforms, articles, containers or bottles.

References to a composition containing "an" ingredient or "a" polymer is intended to include other ingredients or other polymers, respectively, in addition to the one named.

By "comprising" or "containing" or "having" is meant that at least the named compound, element, particle, or method step etc. must be present in the composition or article or method, but does not exclude the presence of other compounds, catalysts, materials, particles, method steps, etc., even if the other such compounds, material, particles, method steps etc. have the same function as what is named, unless expressly excluded in the claims.

It is also to be understood that the mention of one or more method steps does not preclude the presence of additional method steps before or after the combined recited steps or intervening method steps between those steps expressly identified. Moreover, the lettering of process steps is a convenient means for identifying discrete activities or steps, and unless otherwise specified, recited process steps can be arranged in any sequence.

Expressing a range includes all integers and fractions thereof within the range. Expressing a temperature or a temperature range in a process, or of a reaction mixture, or of a melt or applied to a melt, or of a polymer or applied to a polymer means in all cases that the limitation is satisfied if either the applied temperature, the actual temperature of the melt or polymer, or both are at the specified temperature or within the specified range.

The word "composition" means that each listed ingredient is present in the composition, and does not imply that any ingredient in the composition is unbound or unreacted. The composition may be solid or liquid. The stated ingredients in the composition may be bound, unbound, reacted, unreacted, and unless otherwise specified, in any oxidation state.

By "atoms" as used in conjunction with a metal is meant the metal atom occupying any oxidation state, any morphological state, any structural state, and any chemical state, whether as added to or as present in the polymer or composition of matter.

In the process of the invention, the final IV of the polyester polymer is built entirely in the melt phase polymerization process. The process of the invention opens up a technique not possible with conventional processes. In conventional processes, the molecular weight of the polyester polymer is increased to a moderate IV, solidified, and then followed by solid-phase polymerization to continue the molecular weight increase to the final desired higher IV. The conventional process does not permit appreciable catalyst deactivation in the melt phase as the subsequent solid-phase polymerization requires catalysis. Since the process of the invention is capable of building the molecular weight to the desired final IV entirely in the melt phase, the catalyst can be at least partially deactivated to thereby avoid at least some of the catalytic activity upon subsequent melting of particles which is a common contributor to the generation of additional AA.

Further, because the catalyst can be at least partially deactivated in the melt phase, the process of the invention also opens up the possibility of using faster or more highly active melt-phase catalysts than conventional catalysts such as antimony catalysts. The use of highly active melt phase catalysts has been discouraged because they are generally also more active at catalyzing the side reactions that form acetaldehyde (AA). Although more highly active melt phase polycondensation catalysts shorten the melt phase residence time, which is a factor that, when all other things are equal, tends to produce a polymer having lower levels of free AA in the pellets; however, upon melting particles to form an article, the benefits obtained by faster reaction times in the melt phase polycondensation are largely if not completely lost due to increased catalysis of side reactions that form AA or AA precursors. In a conventional process which employs solid-phase polymerization, highly active catalysts could be used only in the presence of AA scavengers or were not used in practice at all due to their high activity for side reactions to form AA or AA precursors when the polymer particles are subsequently melted when making an article.

As noted above, the process of the invention now allows one to employ a highly active catalyst system which results in a shorter residence time, and further provides polyester particles which generate low levels of AA upon subsequent melting by at least partially deactivating the catalyst. In one embodiment, the highly active catalyst system results in polyesters with faster or equivalent melt-phase polycondensation rates, relative to Sb-catalyzed polyesters, and, after late addition of a deactivator, will produce polyesters with a lower amount of AA generated, relative to Sb-catalyzed polyesters.

In one embodiment, there is now provided a polyester polymer composition comprising: polyester polymers comprising repeating alkylene arylate units and aluminum atoms in an amount of at least 3 ppm based on the weight of the polymer, said polymer having an It.V. of at least 0.72 dL/g obtained through a melt phase polymerization and a residual acetaldehyde level of 10 ppm or less.

In another embodiment, there is provided a polyester composition comprising polyester polymers and:
 (i) aluminum atoms
 (ii) alkaline earth metal atoms or alkali metal atoms or alkali compound residues, and
 (iii) a catalyst deactivator in an amount effective to at least partially deactivate the catalytic activity of the combination of said (i) aluminum atoms and (ii) alkaline earth metal atoms or alkali metal atoms or alkali compound residues.

The "polyester polymer" is any thermoplastic polyester polymer. Polyester thermoplastic polymers of the invention are distinguishable from liquid crystal polymers and thermosetting polymers in that thermoplastic polymers have no appreciable ordered structure while in the liquid (melt) phase, they can be remelted and reshaped into a molded article, and liquid crystal polymers and thermosetting polymers are unsuitable for the intended applications such as packaging or stretching in a mold to make a container.

The polyester polymer is desirably a random polymer such that the monomer units in the polymer chain are randomly arranged rather than arranged in a block fashion.

The polyester polymer contains repeating alkylene arylate units, such as alkylene terephthalate or alkylene naphthalate repeat units in the polymer chain. More specific examples of these repeating units include ethylene terephthalate, ethylene naphthalate, and trimethylene terephthalate. More preferred are polyester polymers which comprise:
 (i) a carboxylic acid component comprising at least 80 mole % of the residues of terephthalic acid, derivatives of terephthalic acid, naphthalene-2,6-dicarboxylic acid, derivatives of naphthalene-2,6-dicarboxylic acid, or mixtures thereof, and
 (ii) a hydroxyl component comprising at least 80 mole % of the residues of ethylene glycol or 1,3-propanediol,
based on 100 mole percent of carboxylic acid component residues and 100 mole percent of hydroxyl component residues in the polyester polymer.

Typically, polyesters such as polyethylene terephthalate are made by reacting a diol such as ethylene glycol with a dicarboxylic acid as the free acid or its $C_1$-$C_4$ dialkyl ester to produce an ester monomer and/or oligomers, which are then polycondensed to produce the polyester. More than one compound containing carboxylic acid group(s) or derivative(s) thereof can be reacted during the process. All the compounds that enter the process containing carboxylic acid group(s) or derivative(s) thereof that become part of said polyester product comprise the "carboxylic acid component." The mole % of all the compounds containing carboxylic acid group(s) or derivative(s) thereof that are in the product add up to 100. The "residues" of compound(s) containing carboxylic acid group(s) or derivative(s) thereof that are in the said polyester product refers to the portion of said compound(s) which remains in the said polyester product after said compound(s) is condensed with a compound(s) containing hydroxyl group(s) and further polycondensed to form polyester polymer chains of varying length.

More than one compound containing hydroxyl group(s) or derivatives thereof can become part of the polyester polymer product(s). All the compounds that enter the process containing hydroxyl group(s) or derivatives thereof that become part of said polyester product(s) comprise the hydroxyl component. The mole % of all the compounds containing hydroxyl group(s) or derivatives thereof that become part of said polyester product(s) add up to 100. The "residues" of hydroxyl functional compound(s) or derivatives thereof that become part of said polyester product refers to the portion of said compound(s) which remains in said polyester product after said compound(s) is condensed with a compound(s) containing carboxylic acid group(s) or derivative(s) thereof and further polycondensed to form polyester polymer chains of varying length.

The mole % of the hydroxyl residues and carboxylic acid residues in the product(s) can be determined by proton NMR.

In another preferred embodiment, the polyester polymer comprises:
 (a) a carboxylic acid component comprising at least 90 mole %, or at least 92 mole %, or at least 96 mole % of the residues of terephthalic acid, derivatives of terephthalic acid, naphthalene-2,6-dicarboxylic acid, derivatives of naphthalene-2,6-dicarboxylic acid, or mixtures thereof, more preferably terephthalic acid or derivates of terephthalic acid, and
 (b) a hydroxyl component comprising at least 90 mole %, or at least 92 mole %, or at least 96 mole % of the residues of ethylene glycol or 1,3-propanediol, more preferably ethylene glycol,
based on 100 mole percent of the carboxylic acid component residues and 100 mole percent of the hydroxyl component residues in the polyester polymer.

The reaction of the carboxylic acid component with the hydroxyl component during the preparation of the polyester polymer is not restricted to the stated mole percentages since one may utilize a large excess of the hydroxyl component if desired, e.g. on the order of up to 200 mole % relative to the 100 mole % of carboxylic acid component used. The polyester polymer made by the reaction will, however, contain the stated amounts of aromatic dicarboxylic acid residues and ethylene glycol residues.

Derivatives of terephthalic acid and naphthalane dicarboxylic acid include $C_1$-$C_4$ dialkylterephthalates and $C_1$-$C_4$ dialkylnaphthalates, such as dimethylterephthalate and dimethylnaphthalate.

Modifiers can be present in amount of up to 40 mole %, or up to 20 mole %, or up to 10 mole %, or up to 8 mole %, or up to 5 mole %, based on the 100 mole percent of their respective component, carboxylic acid or hydroxyl, in the polymer. Mono, tri and higher functional modifiers are preferably present and/or added in amounts of only up to about 8 mole %, or up to 4 mole %, or up to about 2 mole %, based on the 100 mole percent of their respective component, carboxylic acid or hydroxyl, in the polymer.

In addition to a diacid component of terephthalic acid, derivatives of terephthalic acid, naphthalene-2,6-dicarboxylic acid, derivatives of naphthalene-2,6-dicarboxylic acid, or mixtures thereof, the carboxylic acid component(s) of the present polyester may include one or more additional modifier carboxylic acid compounds. Such additional modifier carboxylic acid compounds include mono-carboxylic acid compounds, dicarboxylic acid compounds, and compounds with a higher number of carboxylic acid groups. Examples include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. More specific examples of modifier dicarboxylic acids useful as part of an acid component(s) are phthalic acid, isophthalic acid, naphthalene-2,6-dicarboxylic acid, cyclohexane-1,4-dicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexane-1,4-dicarboxylic acid being most preferable. It should be understood that use of the corresponding acid anhydrides, esters, and acid chlorides of these acids is included in the term "carboxylic acid". It is also possible for tricarboxyl compound branching agents and compounds with a higher number of carboxylic acid groups to modify the polyester, along with monocarboxylic acid chain terminators.

In addition to a hydroxyl component comprising ethylene glycol, the hydroxyl component of the present polyester may include additional modifier mono-ols, diols, or compounds with a higher number of hydroxyl groups. Examples of modifier hydroxyl compounds include cycloaliphatic diols preferably having 6 to 20 carbon atoms and/or aliphatic diols preferably having 3 to 20 carbon atoms. More specific examples of such diols include diethylene glycol; triethylene glycol; 1,4-cyclohexanedimethanol; propane-1,3-diol; butane-1,4-diol; pentane-1,5-diol; hexane-1,6-diol; 3-methylpentanediol-(2,4); 2-methylpentanediol-(1,4); 2,2,4-trimethylpentane-diol-(1,3); 2,5-ethylhexanediol-(1,3); 2,2-diethyl propane-diol-(1, 3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane. As modifiers, the polyester polymer may preferably contain such comonomers as isophthalic acid, 2,6-naphthalenedicarboxylic acid, 1,4-cyclohexanedimethanol, and diethylene glycol.

The polyester composition may include blends of polyalkylene terephthalates and/or polyalkylene naphthalates along with other thermoplastic polymers such as polycarbonate (PC) and polyamides. It is preferred that the polyester composition should comprise a majority of the polyester polymers, more preferably in an amount of at least 80 wt. %, or at least 95 wt. %, and most preferably 100 wt. %, based on the weight of all thermoplastic polymers (excluding fillers, inorganic compounds or particles, fibers, impact modifiers, or other polymers which may form a discontinuous phase). It is also preferred that the polyester polymers do not contain any filler, fibers, or impact modifiers or other polymers which form a discontinuous phase.

In one embodiment, the composition contains less than 60 wt %, or less than 40 wt %, or less than 20 wt. %, or less than 10 wt. %, or less than 5 wt. %, or no post-consumer recycled polyester polymer ("PCR") present in the composition, based on the total weight of all polyester polymers. In another embodiment, the composition contains PCR in an amount of greater than zero and up to 60 wt. %, or up to 40 wt. %, or up to 20 wt %, or up to 10 wt. %, based on the total weight of all polyester polymers.

The polyester composition of the invention also contains an aluminum residue. An aluminum residue is the moiety remaining in a polymer melt upon addition of aluminum atoms to the melt phase process for making the polyester polymer, and the oxidation state, morphological state, structural state, or chemical state of the aluminum compound as added or of the residue present in the composition is not limited. The aluminum residue may be in a form identical to the aluminum compound as added to the melt phase reaction, but typically will be altered since the aluminum participated in accelerating the rate of polycondensation. By the term "aluminum atoms" or "aluminum" is meant the presence of aluminum in the polyester polymer detected through any suitable analytical technique regardless of the oxidation state of the aluminum. Suitable detection methods for the presence of aluminum include inductively coupled plasma optical emission spectroscopy (ICP-OES). The concentration of aluminum is reported as the parts per million of metal atoms based on the weight of the polymer. The term "metal" does not imply a particular oxidation state.

Aluminum may be added to the melt phase process (the method of addition not being limited and including adding the aluminum compound to the catalyst mix tank of the melt phase process and feeding to a melt phase vessel or pipes connecting vessels) as a compound (which includes a salt or a complex), or as a metal provided that it is ultimately active as a catalyst in the polycondensation phase either alone or in combination with the alkali metal or alkaline earth metal atoms or compounds. Aluminum oxides are not included within the meaning of an aluminum compound or metal because they are insoluble and have little, if any, catalytic activity in the polymer melt. It is desirable to select an aluminum compound which can be dissolved in a diluent or a carrier that is volatile and/or reactive with the polyester forming ingredients. Suitable liquid reactive carriers can have any molecular weight, such as those ranging from 62 to about 10,000 grams per mole. Aluminum compounds can also be added as slurries or suspensions in a liquid that is volatile and/or reactive with the polyester forming ingredients. Aluminum can also be added to the melt phase process by melt blending the aluminum compound with a polyester polymer in a suitable extruder or other device to form a concentrate, and subsequently, preferably melting the concentrate as a molten feed to the melt phase process. A preferred mode of addition of aluminum compounds is addition to a catalyst mix tank, which is part of the polyester melt phase process equipment. Preferably, the catalyst mix tank also contains an alkali metal compound or an alkaline earth compound or alkali compound as well as a suitable solvent. Ethylene glycol is a preferred solvent. The starting catalyst components, an aluminum compound and an alkali metal compound or an alkaline earth metal compound or an alkali compound are heated at a temperature and for an amount of time to affect dissolution initially. Suitable temperatures include 110 to 140° C., or 115 to 135° C., for one to four hours. A nitrogen purge can minimize color formation in the solution or mixture if color bodies are a problem. The nitrogen purge rate should be sufficient to remove volatiles that react to form color bodies, such as from 0.5 to 3 scfm, or 1 to 2 scfm. To maintain or improve solubility, it is helpful to keep the solution or mixture at 115 to 135° C. with a nitrogen purge. The contents of the catalyst mix tank may be transferred to a catalyst feed tank, which may be utilized to introduce the solution or mixture into the polyester melt phase manufacturing process.

Aluminum compounds of the invention are catalytically active. To determine, if desired, whether an aluminum compound is catalytically active by measuring whether or not the reaction rate is increased or the It.V. is increased by at least 0.1 dL/g if measured from a starting point of 0.2 to 0.4 dL/g and after 1 hour at 280° C. and 0.8 mm Hg with adequate agitation or after 1 hour at any desired set of operating conditions, and using the concentration desired for actual operations. Preferably, the aluminum compound chosen will have sufficient catalytic activity such that the reaction rate is increased or the It.V. is increased by at least 0.2 dL/g, if measured from a starting point of 0.2 to 0.4 dL/g after 1 hour at 280° C. and 0.8 mm Hg with adequate agitation or after 1 hour at any desired set of operating conditions, using the concentration desired for actual operations. It is preferred that catalytic activity of aluminum compounds is checked in the presence of any other catalyst components to be used in actual operations, but in the absence of other catalytically active compounds which will not be used.

Preferred aluminum compounds include aluminum compounds with at least one organic substituent. Illustrative examples of suitable compounds include those of the formula:

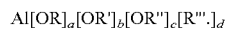

wherein R, R', R" are independently an alkyl group, aryl group, acyl group or hydrogen, where preferably at least one of R, R' R" and R'" is not hydrogen, R'" is an anionic group, and a, b, c, d are independently 0 or positive integers, and a+b+c+d is equal to 3 or no greater than 3.

Suitable examples of aluminum compounds include the carboxylic acid salts of aluminum such as aluminum acetate, aluminum benzoate, aluminum lactate, aluminum laurate, aluminum stearate, aluminum alcoholates such as aluminum ethylate, aluminum isopropylate, aluminum tri n-butyrate, aluminum tri-tert-butyrate, mono-sec-butoxyaluminum diisopropylate, and aluminum chelates in which the alkoxy group of an aluminum alcoholate is partially or wholly substituted by a chelating agents such as an alkyl acetoacetate or acetylacetone such as ethyl acetoacetate aluminum diisopropylate, aluminum tris(ethyl acetoacetate), alkyl acetoacetate aluminum diisopropylate, aluminum monoacetylacetate bis (ethyl acetoacetate), aluminum tris(acetyl acetate), aluminum acetylacetonate.

Preferred among the aluminum compounds are the basic carboxylic acid salts of aluminum and aluminum alcoholates, Basic carboxylic acid salts of aluminum include monobasic and dibasic compounds. The basic aluminum acetate used can be either the diacetate monohydroxy compound or the monoacetate dihydroxy compound or a mixture thereof. In particular, basic aluminum acetate and aluminum isoproxide are preferred aluminum compounds. Stabilizing basic aluminum acetate with boric acid may in some instances increases its solubility. Aluminum isopropoxide is most desirable.

An amount of aluminum atoms is added to effect polycondensation. Preferred amounts are effective to polycondense at a reasonable rate. A reasonable rate is one at which a polyester line can be operated and still return the cost of capital. More preferred, a reasonable rate is that achieved with 250 ppm Sb or faster. The amount of aluminum present in the polyester polymer generally ranges from at least 3 ppm, or at least 5 ppm, or at least 8 ppm, or at least 10 ppm, or at least 15 ppm, or at least 20 ppm, or at least 30 ppm, and up to about 150 ppm, or up to about 100 ppm, or up to about 75 ppm, or up to about 60 ppm Al based on the weight of the polymer. Increasing the alkali or alkaline earth metal to aluminum mole ratio (M:Al) increases the rate; therefore, low Al loadings may give a reasonable rate with moderate to high M:Al, while giving slow rates at low M:Al mole ratio.

At high catalyst loadings, solubility of the catalysts in the polyester may be a concern. Late addition of a phosphorus compound does reduce the haze level. In applications where clarity is important, high loadings of catalysts are avoided. The preferred range of aluminum is from 5 ppm to −60 ppm. Other suitable amounts include from 7, or from 10 ppm and up to 60 ppm, or up to 40 ppm, or up to 30 ppm. Al.

An alkali metal residue or an alkaline earth metal residue is the alkali metal atoms or alkaline earth metal atoms present in the polyester polymer in any form or oxidation state, or if an alkali compound is used, then the residual remainder of the alkali compound present within the polymer melt or the finished polymer or article. Their oxidation states or ultimate physical, morphological, structural, or chemical states are not limited. The word "alkali metal" or "alkaline earth metal" or "metal" includes the atom in its elemental state or in an oxidation state corresponding to its allowable valences in its Periodic group. The chemical state of the alkali upon addition is also not limited. The alkali may be added as a metal compound, organometallic compound, or as a compound without a metal. Likewise, the chemical state of the alkaline earth metal compound or alkali metal compound upon addition is not limited.

The alkali metals and alkaline earth metals include the metals in Group IA and Group IIA or the periodic table, including but not limited to Li, Na, K, Rb, Cs, Mg, Ca, Sr, and preferably Li, Na or K. If rapid rates and clarity are the primary concern, Li is most preferred. If color is the primary concern, Na is most preferred. The metals may be added to the melt phase as metal compounds (which includes a complex or a salt) having counterions, among which the preferred ones are hydroxides, carbonates, and carboxylic acids.

Other suitable alkali compounds are those mentioned in U.S. Pat. No. 6,156,867, the disclosure of which is fully incorporated herein by reference. They include the tertiary amine compounds and the quartenary ammonium compounds. The particular amine compounds selected are desirably those which do not impart more yellow color to the polymer.

The ratio of the moles of alkali metal or moles of alkaline earth metal or moles of alkali to the moles of aluminum (M:Al MR) generally ranges from at least 0.1, or at least 0.25, or at least 0.5, or at least 0.75, or at least 1, or at least 2, and up to about 75, up to about 50, up to about 25, up to about 20, up to about 15, up to about 10, or up to about 8, or up to about 6, or up to about 5. To determine the particular amount and molar ratio employed, consideration is taken to the desired reaction rate, color, clarity and AA generation rate exhibited in the final polymer.

When the aluminum level is between 10 and 60 ppm in the polyester based on the weight of the polyester polymer, the M:Al MR desirably ranges from 0.5:1 to 6:1, or from 1:1 to 5:1. When the aluminum level ranges from 3 ppm to less than 10 ppm, the M:Al MR may range from greater than 6:1 up to 75:1, especially if AA is Li. When the aluminum level is high between greater than 60 ppm to 100 ppm, the M:Al MR may be as low as from 0.1:1 to less than 0.5:1, especially when AA is Li.

High catalyst loadings may impact the solubility of the catalysts in the molten polyester polymer, which in turn may increase the haze level of the polymer. However, an advantageous feature of one embodiment of the invention lies in that the late addition of a deactivator reduces the haze level even at high catalyst loadings. Therefore, there is now provided a polyester composition containing phosphorus atoms, and a metal content of at least 35 ppm, at least 45 ppm, at least 60 ppm, or at least 70 ppm, or at least 80 ppm, or at least 90 ppm, based on the cumulative weight of aluminum, alkaline earth metals and alkali metals, based on the weight of the polyester polymer. The amount of phosphorus is desirably at a ratio of moles phosphorus to total moles of all catalytically active metals (P:M MR) within a range of 0.25:1 to 3:1, where the total moles of all catalytically active metals employed is the sum of the moles of aluminum, the moles of alkali metals, if any, and the moles of alkaline earth metals, if any, and the moles of any other catalytically active metals. The amount of phosphorus is more desirably at a P:M MR within a range of 0.5:1 to 1.5:1. Typical amounts of phosphorus atoms will be at least 30 ppm, or at least 50 ppm, or at least 100 ppm. The solution haze values of these polymers at high catalyst loadings can be as low as 30 ntu or less, or 20 ntu or less, or 15 ntu or less, or 10 ntu or less. The relative reduction of haze by the late addition of a phosphorus compound is as large as 40% or more, or 50% or more, or 60% or more, relative to the same polymer made without phosphorus.

The weight of aluminum and alkaline earth metal or alkali metal can be measured upon addition to the melt phase or by analytical techniques for detecting the amount in the finished polymer or article. Suitable detection methods for the presence of aluminum and alkali metals or alkaline earth metals include inductively coupled plasma optical emission spectroscopy (ICP-OES). While X-ray fluorescence spectroscopy (XRF) is a suitable detection method for some alkaline earth metals and some alkali metals, it is not suitable for detecting aluminum at lower levels, like those found in polyester. The concentration of an alkaline earth metal or an alkali metal is reported as the parts per million of metal atoms based on the weight of the polymer.

The aluminum and alkali or alkaline earth metals may be added as a solution, fine dispersion, a paste, a slurry, or neat. They are preferably added as a liquid, a melt, or a free flowing solid which can be metered. Most preferably they are added as a liquid, and in particular as a liquid solution or dispersion.

The reaction product of the aluminum compound and the alkali metal compound or alkaline earth metal compound or alkali compound from the catalyst feed tank is desirably added to the beginning of polycondensation (e.g. upon completion of at least 90% of esterification or within the first 30 minutes of polycondensation reactions.

To avoid potential undesirably side reactions between aluminum catalyst and water generated in the esterification zone which may inhibit or deactivate the aluminum catalyst and thereby slow down the rate of polycondensation, it is desirable in yet another embodiment to add the aluminum compounds after substantial completion of the esterification reaction or at the beginning of or during polycondensation. In a further embodiment, at least 75%, or at least 85%, or at least 95% of the esterification reaction (in terms of conversion) is conducted in the absence of added aluminum compounds. It is desirable to add the aluminum compound and the alkali metal or alkaline earth metal compound at or near the same addition point. It is most desirable to premix and heat the aluminum compound and the alkali metal or alkaline earth metal compound, like in a catalyst mix tank, prior to addition to the melt phase manufacturing line for polyester polymers.

Other catalyst metals may be present if desired. For example, Mn, Zn, Sb, Co, Ti, and Ge catalysts may be used in conjunction with aluminum and alkaline earth metals or alkali catalysts. Preferably, the polyester polymer is made without the addition of cobalt to the melt phase reaction since organic toners are preferred. Titanium catalysts can be used, particularly if melt phase manufacture involves ester exchange reactions. The titanium catalysts are those compounds added in amounts which increase the It.V. of polyester melt by at least 0.3 dL/g, if not deactivated, under the operating conditions used to make the polyester polymer Typically, the titanium catalyst added during ester exchange will be deactivated prior to polycondensing the resulting oligomer mixture since, left untreated before polycondensing, the titanium catalyst will severely discolor the polymer due to its high activity, which includes side reactions. However, if desired, small quantities of active titanium catalysts may be present with the catalyst system of the invention. The amount of titanium catalyst, if used, generally ranges from 2 ppm to 15 ppm, based on the weight of the polymer. Antimony catalysts can also be used in combination with the catalyst system of the invention. The amount of antimony can range from 20 ppm to 250 ppm. Due to AA generation concerns, the amount of antimony is preferred to be no greater than 125 ppm, based on the weight of the polymer. It may be necessary to increase the amount of deactivator or phosphorus compound If catalytic metals other than aluminum, alkaline earth metals, or alkali metals are present.

Preferably, the polyester polymer is made without the addition of titanium, cobalt, or antimony to the melt phase reaction. More preferably, the polyester polymer is made without the addition of any catalytically active metal or metal compounds to the melt phase reaction other than the aluminum/alkali metal or alkaline earth or alkali system (e.g. for measurement purposes compounds are catalytically active if they increase the reaction rate or increase the It.V. by at least 0.1 dL/g from a starting point of 0.2 to 0.4 dL/g after 1 hour at 280° C. and 0.8 mm Hg with agitation). It is to be recognized, however, that one or more of metals such as cobalt or manganese will most likely be present at low levels in the melt because they come as impurities with the terephthalic acid composition made from a metal-catalyzed, liquid-phase oxidation process. Metal impurities present in the raw material supply to the melt phase process are not considered to be metals added to the melt phase process.

The polyester polymer also contains a catalyst deactivator. By a catalyst deactivator is meant a compound effective to at least partially deactivate or inhibit the activity of the catalyst system. A compound is effective to at least partially deactivate the catalyst system when by its addition at a given level, and solely for testing the effectiveness of a compound at a given level, when either or both a) the rate of solid-stating under actual operating conditions is reduced relative to the same polymer without the deactivator ("no additive case") and/or b) when added earlier, the rate of melt-phase polycondensation under actual operating conditions to a constant It.V. target is reduced, that is, it takes more time to reach the It.V. target, or the It.V. of the polymer is reduced at constant time relative to the no additive case. Preferably, the catalyst deactivator also reduces the rate of AA generation upon melting particles relative to the no additive case to lower the contribution of AA generation on AA levels in a molded article, such as a preform, relative to a no additive case, and more preferably upon melting particles having an It.V. of at least 0.72 dL/g obtained from a melt phase polymerization.

The catalyst deactivator is added late during the process manufacturing the polymer melt in order to limit the activity of catalyst system during subsequent melt processing steps, in which the catalyst system would otherwise catalyze the conversion of acetaldehyde precursors present in the polymer particles to acetaldehyde and/or catalyze the formation of more AA precursors and their subsequent conversion to AA. Left untreated, the polymer would have a high acetaldehyde generation rate during extrusion or injection molding, thereby contributing to an increase in the AA levels in articles made from the melt. The stabilizer or deactivator can also help thermally stabilize the polymer melt near the end of melt phase polycondensation and during remelting which occurs, for example, during melt processing into articles, without which more reactions would occur to cleave the polymer chains in the highly viscous melt, a route to forming more AA precursors and ultimately, more AA. In addition to lowering the formation rate of AA precursors and AA, the stabilizer or deactivator may improve the hydrolytic stability of the polymer. Any side reaction at least partially catalyzed by the polycondensation catalyst system may be less of a problem when the polycondensation catalyst system is at least partially deactivated. The catalyst deactivator is not added along with the addition of aluminum compounds or alkali metal compounds or alkaline earth metal compounds or alkali compounds, nor is it added at the commencement of polycondensation because it would inhibit the catalytic activity of the metal catalysts and hence, the rate of polycondensation. It should be noted, however, that not all types or forms of phosphorus compounds are deactivators, and if they are not, they may, if desired, be added along with the catalyst or at the commencement of polycondensation.

Suitable deactivating compounds are preferably phosphorus containing compounds. The phosphorus compounds contain one or more phosphorus atoms. Preferred are phosphate triesters, acidic phosphorus compounds or their ester derivatives, and amine salts of acidic phosphorus containing compounds. Acidic phosphorus compounds have at least one oxyacid group, that is, at least one phosphorus atom double-bonded to oxygen and single-bonded to at least one hydroxyl or OH group. The number of acidic groups increases as the number of hydroxyl groups, bound to the phosphorus atom that is double-bonded to oxygen, increases.

Specific examples of phosphorus compounds include phosphoric acid, pyrophosphoric acid, phosphorous acid, polyphosphoric acid, carboxyphosphonic acids, alkylphosphonic acids, phosphonic acid derivatives, and each of their acidic salts and acidic esters and derivatives, including acidic phosphate esters such as phosphate mono- and di-esters and non-acidic phosphate esters (e.g. phosphate tri-esters) such as trimethyl phosphate, triethyl phosphate, tributyl phosphate, tributoxyethyl phosphate, tris(2-ethylhexyl) phosphate, oligomeric phosphate tri-esters, trioctyl phosphate, triphenyl phosphate, tritolyl phosphate, (tris)ethylene glycol phosphate, triethyl phosphonoacetate, dimethyl methyl phosphonate, tetraisopropyl methylenediphosphonate, mono-, di-, and tri-esters of phosphoric acid with ethylene glycol, diethylene glycol, or 2-ethylhexanol, or mixtures of each. Other examples include distearylpentaerythritol diphosphite, mono- and di-hydrogen phosphate compounds, phosphite compounds, certain inorganic phosphorus compounds that are preferably soluble in the polymer melt, poly(ethylene) hydrogen phosphate, and silyl phosphates. Haze in solutions of particles or in molded parts is one indication of the lack of solubility or limited solubility of an additive in the polymer melt. Soluble additives are more likely to deactivate/stabilize the catalyst system.

Other phosphorus compounds which may be added include the amine salts of acidic phosphorus compounds. The amines may be cyclic or acyclic, may be monomeric, oligomeric, or polymeric, and should be selected so as to minimize haze and/or maximize solubility when these are issues. The organic constituents of the amine may in principle be any organic group. Ammonia and related compounds like ammonium hydroxide are suitable.

Suitable organic groups on the amine include linear and branched alkyl, cycloalkyl, aryl, aralkyl, alkaryl, heteroaryl, etc. Each of these types of organic groups may be substituted or unsubstituted, i.e. with hydroxy, carboxy, alkoxy, halo, and like groups. The organic groups may also contain carbonate, keto, ether, and thioether linkages, as well as amide, ester, sulfoxide, sulfone, epoxy, and the like. This list is illustrative and not limiting.

Preferred amines are cyclic amines having a 5 to 7 membered ring, preferably a six membered ring. These rings may constitute a single "monomeric" species, or may be part of a larger oligomer or polymer.

Preferred cyclic amines are hindered amines which have organic groups substituted at ring positions adjacent to the ring nitrogen. The ring nitrogen itself may also be substituted, i.e. by alkyl, aryl, aralkyl, alkaryl, and other groups. The hindered amines may also comprise a portion of an oligomeric moiety or polymeric moiety.

Another type of preferred amines are amino acids. Amino acids with decomposition points at or above polymerization temperatures are especially preferred. The L-enantiomer, the D-enantiomer or any mixture thereof, including racemic mixtures, may be used. The amine group and the carboxylic acid group do not have to be attached to the same carbon. The amino acids may be alpha, beta or gamma. Substituted amino acids may be used. Amino acids with some solubility in water are especially preferred as this allows the synthesis of the salt to be done in water, that is, without VOC's (volatile organic compounds).

Suitable amines contain at least one nitrogen capable of salt formation with a phosphorus-containing acid. In hindered amines containing N-alkylated piperidinyl moieties, for example, salt formation may involve the piperidinyl nitrogen, generating species such as (but not limited to):

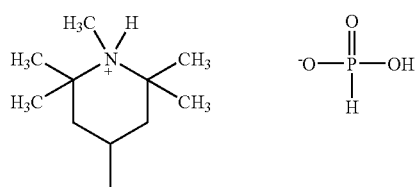

When there is one nitrogen in the amine compound that can form a salt, one mole of phosphorus-containing acid is used per mole of amine compound. When there are two or more nitrogen atoms in the amine compound that can form salts, two or more moles of acid can be used per mole of amine compound, up to an amount of acid, which creates salts having no remaining neutralizable nitrogen, or slightly in excess of this amount.

The carboxylic acid group of the amino acid opens up the possibility that the amine portion of the salt might be reacted into the polyester chain. Reaction into the polyester chain should result in less volatility and less extractability. Reaction into the polyester chain can also be accomplished if the amine portion of the salt contains a hydroxyl and/or a carboxyl group. If there is only 1 carboxyl or hydroxyl group, the salt could function as an end-capper. If there are a total of 2 or more reactive groups (carboxyl or hydroxyl), the salt may not always be at the end of the chain. Reaction into the polyester chain is also possible for the phosphorus-containing portion of the salt. For example, phosphoric acid can react with hydroxyl compounds to form phosphate esters. The chain end of polyesters is often a hydroxyethyl end group. Phosphoric acid can also react in the middle of a polyester chain.

The precursor to the phosphorus moiety of the phosphorus salt may be any oxyacid of phosphorus including but not limited to hypophosphorous acid, phosphorous acid, phosphoric acid, polyphosophoric acid, polyphosphorous acids, pyrophosphoric acid, phosphinic acids, phosphonic acids, phosphate monoesters, phosphate diesters, phosphonate monoesters, pyrophosphate monoesters, pyrophosphate diesters, pyrophosphate triesters, or salts or compounds which still bear at least one acidic hydrogen, etc. The hydrogen on any OH group bound directly to the P=O group is acidic. Compounds with more than one acidic hydrogen may have one or more acidic hydrogens substituted with organic groups such as alkyl, aryl, aralkyl, alkaryl, etc., by polyether oligomers, polyester oligomers, etc. At least one salt-forming acidic hydrogen must remain, however. Oxyacids of phosphorus with one or more hydrogen bound directly to the P=O group may have one or more of these hydrogens substituted with organic groups such as alkyl, aryl, aralkyl, alkaryl, etc. Examples of these compounds include but are not limited to alkylphosphonic acids, alkylphosphinic acids and dialkylphosphinic acids. As with the amines, the organic groups may be substituted.

In one embodiment, the salts are prepared by the reaction of one or more acidic phosphorus-containing compounds with one or more basic organic compounds containing nitrogen, wherein the phosphorus-containing compounds are preferably selected from compounds having the formulas:

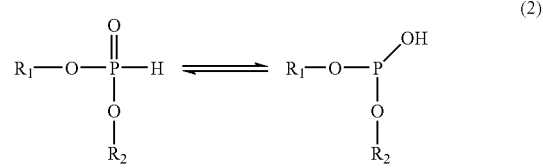

(3)
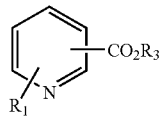
(4)
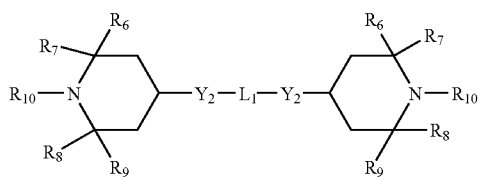
(5)
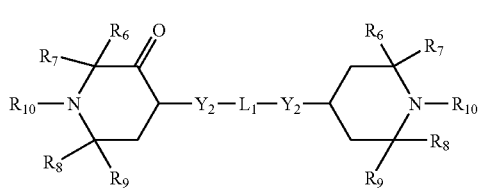
wherein
R₁ and R₂ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;
n is 2 to 500; and
X is selected from hydrogen and hydroxy;
and wherein the basic organic compounds containing nitrogen are preferably selected from compounds having the formulas:
(1)
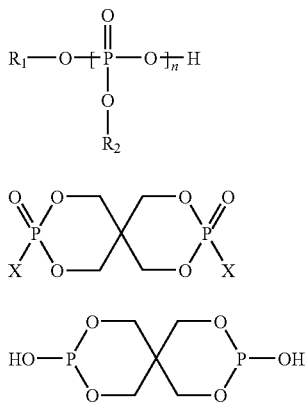
(2)
(3)
(4)
(5)
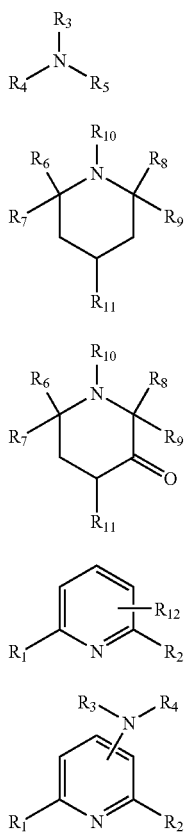
(6)
(7)
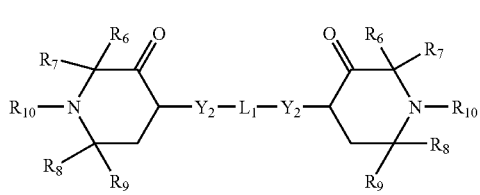
(8)
(9)
(10)
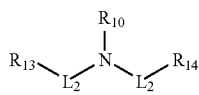
(11)
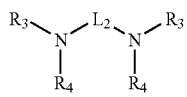
(12)
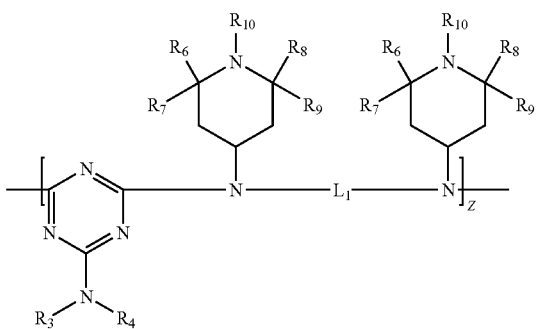
(13)
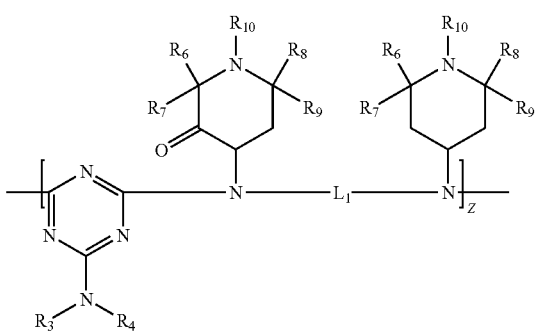

(14)
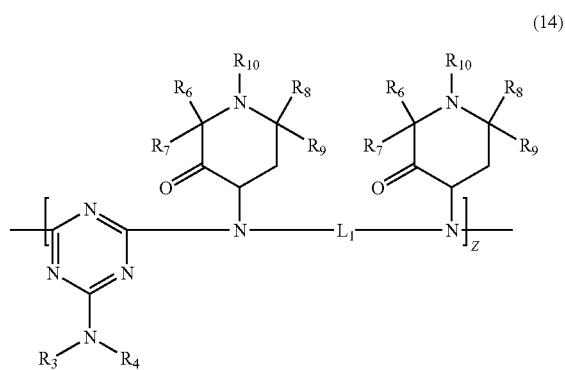

(15)
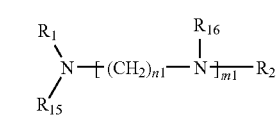

(16)
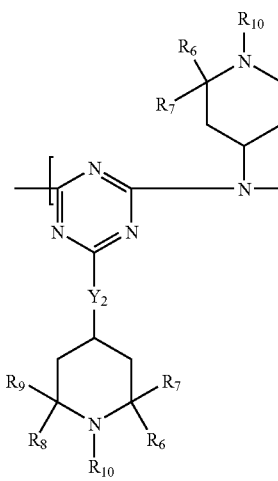

(17)
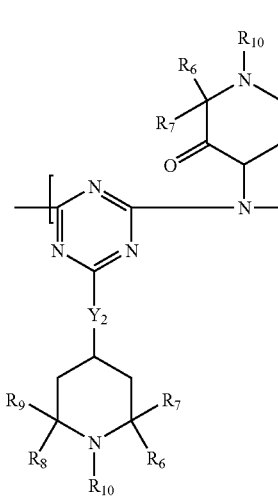

(18)
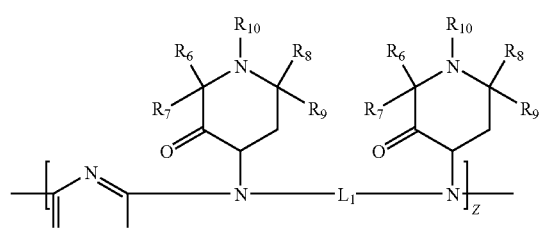

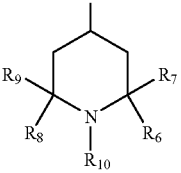

(19)
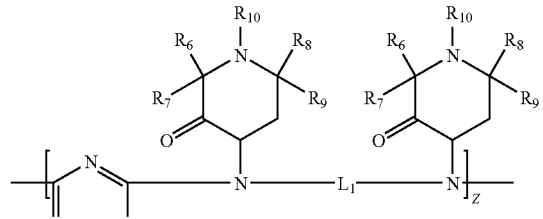

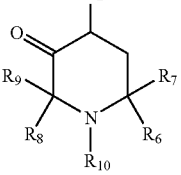

(20)
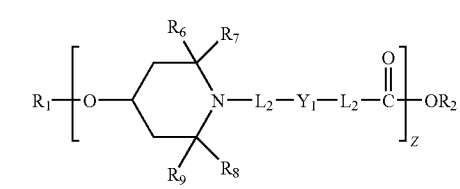

wherein $R_1$ and $R_2$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

Each of the following types of organic groups may be substituted or unsubstituted, i.e. with hydroxy, carboxy, alkoxy, halo, and/or like groups, and any combination thereof. The organic groups may also contain carbonate, keto, ether, and thioether linkages, as well as amide, ester, sulfoxide, sulfone, epoxy, and the like. This list is illustrative and not limiting.

$R_3$, $R_4$, and $R_5$ are independently selected from hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein preferably, at least one of $R_3$, $R_4$, and $R_5$ is a substituent other than hydrogen; however, in the case where $R_3$, $R_4$, and $R_5$ are all hydrogen, ammonium hydroxide is the preferred form; $R_3$ and $R_4$ or $R_4$ and $R_5$ collectively may represent a divalent group forming a ring with the nitrogen atom to which they are attached, e.g., morpholino, piperidino and the like;

- $R_6$, $R_7$, $R_8$, and $R_9$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl;
- $R_{10}$ is selected from hydrogen, —$OR_6$, $C_1$-$C_{22}$-alkyl, substituted $C_1$-$C_{22}$-alkyl, $C_3$-$C_8$-cycloalkyl, substituted $C_3$-$C_8$-cycloalkyl;
- $R_{11}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, —$Y_1$—$R_3$ or a succinimido group having the formula

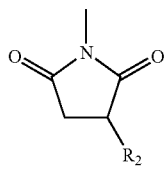

wherein

- $R_{12}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl and may be located at the 3 4 or 5 positions on the aromatic ring;
- the —$N(R_3)(R_4)$ group may be located at the 3, 4 or 5 positions on the pyridine ring of nitrogen compound (5);
- the —$CO_2R_3$ and $R_1$ groups may be located at any of the 2, 3, 4, 5, 6 positions of the pyridine ring of nitrogen compound (6);
- $L_1$ is a divalent linking group selected from $C_2$-$C_{22}$-alkylene; —$(CH_2CH_2$—$Y_1)_{1-3}$—$CH_2CH_2$—; $C_3$-$C_8$-cycloalkylene; arylene; or —$CO$—$L_2$—$OC$—;
- $L_2$ is selected from $C_1$-$C_{22}$-alkylene, arylene, —$(CH_2CH_2$—$Y_1)_{1-3}$—$CH_2CH_2$— and $C_3$-$C_8$-cycloalkylene;
- $Y_1$ is selected from —$OC(O)$—, —$NHC(O)$—, —$O$—, —$S$—, —$N(R_1)$—;
- $Y_2$ is selected from —$O$— or —$N(R_1)$—;
- $R_{13}$ and $R_{14}$ are independently selected from —$O$—$R_2$, and —$N(R_2)_2$;
- Z is a positive integer of up to about 20, preferably up to about 6;
- m1, is selected from 0 to about 10;
- n1 is a positive integer selected from 2 to about 12;

$R_{15}$, and $R_{16}$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, and radical A wherein radical A is selected from the following structures:

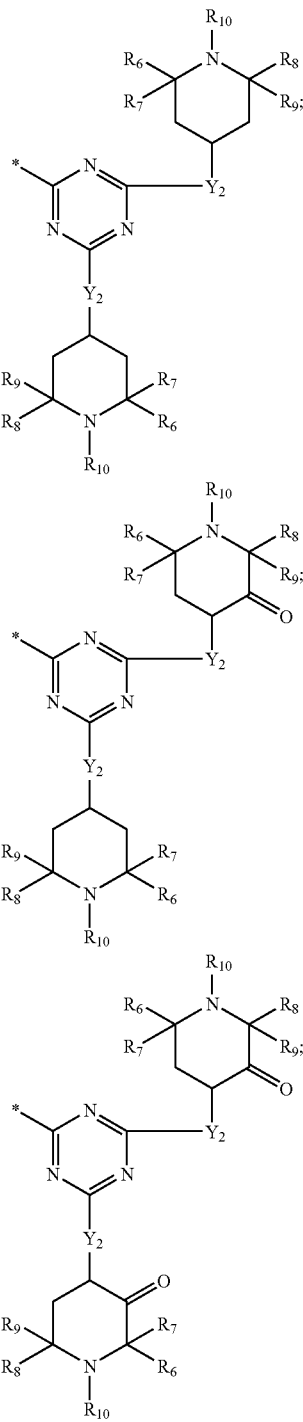

Radical A structures wherein * designates the position of attachment.

Preferably at least one of $R_{15}$ and $R_{16}$ is an A radical; and wherein the ratio of the number of phosphorus atoms in the acidic phosphorus-containing compound to the number of basic nitrogen atoms in the basic organic compound is about 0.05 to about 2, preferably from about 0.25 to about 1.1.

The term "$C_1$-$C_{22}$-alkyl" denotes a saturated hydrocarbon radical which contains one to twenty-two carbons and which may be straight or branched-chain. Such $C_1$-$C_{22}$ alkyl groups can be methyl, ethyl, propyl, butyl, pentyl, hexyl, heptyl, octyl, isopropyl, isobutyl, tertbutyl, neopentyl, 2-ethylheptyl, 2-ethylhexyl, and the like. The term "substituted $C_1$-$C_{22}$-alkyl" refers to $C_1$-$C_{22}$-alkyl radicals as described above which may be substituted with one or more substituents selected from hydroxy, carboxy, halogen, cyano, aryl, heteroaryl, $C_3$-$C_8$-cycloalkyl, substituted $C_3$-$C_8$-cycloalkyl, $C_1$-$C_6$-alkoxy, $C_2$-$C_6$ alkanoyloxy and the like.

The term "$C_3$-$C_8$-cycloalkyl" is used to denote a cycloaliphatic hydrocarbon radical containing three to eight carbon atoms. The term "substituted $C_3$-$C_8$-cycloalkyl" is used to describe a $C_3$-$C_8$-cycloalkyl radical as detailed above containing at least one group selected from $C_1$-$C_6$-alkyl, $C_1$-$C_6$-alkoxy, hydroxy, carboxy, halogen, and the like.

The term "aryl" is used to denote an aromatic radical containing 6, 10 or 14 carbon atoms in the conjugated aromatic ring structure and these radicals are optionally substituted with one or more groups selected from $C_1$-$C_6$-alkyl; $C_1$-$C_6$-alkoxy; phenyl, and phenyl substituted with $C_1$-$C_6$-alkyl; $C_1$-$C_6$-alkoxy; $C_3$-$C_8$-cycloalkyl; halogen; hydroxy, carboxy, cyano, trifluoromethyl and the like. Typical aryl groups include phenyl, naphthyl, phenylnaphthyl, anthryl (anthracenyl) and the like. The term "heteroaryl" is used to describe conjugated cyclic radicals containing at least one hetero atom selected from sulfur, oxygen, nitrogen or a combination of these in combination with from two to about ten carbon atoms and these heteroaryl radicals substituted with the groups mentioned above as possible substituents on the aryl radical. Typical heteroaryl radicals include: 2- and 3-furyl, 2- and 3-thienyl, 2- and 3-pyrrolyl, 2-, 3-, and 4-pyridyl, benzothiophen-2-yl; benzothiazol-2-yl, benzoxazol-2-yl, benzimidazol-2-yl, 1,3,4-oxadiazol-2-yl, 1,3,4-thiadiazol-2-yl, 1,2,4-thiadiazol-5-yl, isothiazol-5-yl, imidazol-2-yl, quinolyl and the like.

The terms "$C_1$-$C_6$-alkoxy" and "$C_2$-$C_6$-alkanoyloxy" are used to represent the groups —O—$C_1$-$C_6$-alkyl and —OCOC$_1$-$C_6$-alkyl, respectively, wherein "$C_1$-$C_6$-alkyl" denotes a saturated hydrocarbon that contains 1-6 carbon atoms, which may be straight or branched-chain, and which may be further substituted with one or more groups selected from halogen, methoxy, ethoxy, phenyl, hydroxy, carboxy, acetyloxy and propionyloxy. The term "halogen" is used to represent fluorine, chlorine, bromine, and iodine; however, chlorine and bromine are preferred.

The term "$C_2$-$C_{22}$-alkylene" is used to denote a divalent hydrocarbon radical that contains from two to twenty-two carbons and which may be straight or branched chain and which may be substituted with one or more substituents selected from hydroxy, carboxy, halogen, $C_1$-$C_6$-alkoxy, $C_2$-$C_6$-alkanolyloxy and aryl. The term "$C_3$-$C_8$-cycloalkylene" is used to denote divalent cycloaliphatic radicals containing three to eight carbon atoms and these are optionally substituted with one or more $C_1$-$C_6$-alkyl groups. The term "arylene" is used to denote 1,2-, 1,3-, and 1,4-phenylene radicals and these optionally substituted with $C_1$-$C_6$— alkyl, $C_1$-$C_6$-alkoxy and halogen.

Preferred hindered amines contain alkyl-substituted piperidinyl moieties and/or triazine moieties, more preferably hindered amines where at least one amine group is substituted by both a triazine moiety and an alkyl-substituted piperidine moiety. In the most preferred hindered amines, amino group-containing moieties are linked by an alkylene group, preferably a (—CH$_2$—)$_n$ group where n is from 2 to 12, preferably from 4-10, and most preferably 6 or 8. The most preferred hindered amine is Cyasorb® UV-3529, containing repeat units of the formula:

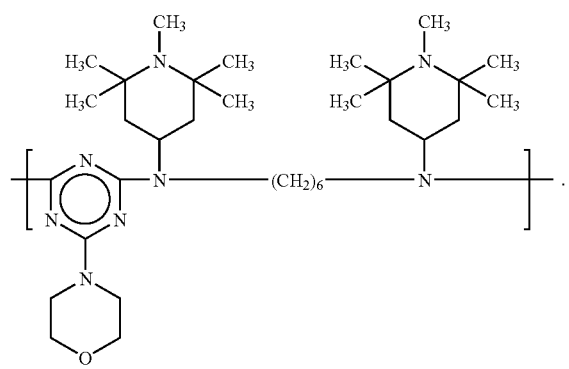

(21)

The salt of the amine component may be prepared by bringing together the acidic phosphorus-containing compound and the basic nitrogen-containing organic compound or ammonium hydroxide in a suitable manner. A suitable manner is any procedure that involves contacting the acidic phosphorus-containing acid with the basic organic compound or ammonium hydroxide. For example, the acidic phosphorus-containing compound and the basic nitrogen-containing organic compound or ammonium hydroxide may be dissolved in appropriate solvents and the solutions mixed followed by precipitation of the reaction product; mixing the phosphorus-containing acid and the basic organic compound or ammonium hydroxide without solvent; and the like.

The ratio of the number of acidic groups in the acidic phosphorus compound to the number of basic nitrogen atoms in the basic organic compound or ammonium hydroxide may be in the range of about 0.05 to about 2, preferably from about 0.25 to about 1.1. Compositions that contain a large excess of unreacted acidic phosphorus compounds may result in corrosion of process equipment during polyester manufacture, concentrate manufacture (if any) or preform manufacture.

Since the catalyst system used in the invention can be so easily at least partially deactivated, phosphorus compounds previously found to be less effective with antimony catalyzed systems, such as the full esters of acidic phosphorus compounds, like phosphate triesters, can now be used in the polymer melt and process of the invention. Moreover, phosphorus compounds found to cause an increase in haze with antimony catalyzed systems, such as phosphorous acid, may be used as a deactivator with the catalyst system of the present invention without acting to increase the haze due to reduction of a metal, which, in the case of antimony catalyzed systems, imparts a gray or black color to the polyester.

The quantity of phosphorus compound or other catalyst deactivator used in this process is effective to reduce the amount of AA generated upon remelting the polymer produced in the melt phase by partially or fully deactivating the catalytic activity of the combination of said (i) aluminum atoms and (ii) alkaline earth metal atoms or alkali metal atoms or alkali compound residues. The amount of AA generated upon remelting that can be tolerated depends on the end-use application and often on the particular beverage brand owner involved. Preforms used to make water bottles often have lower AA specifications than preforms used to make bottles for carbonated soft drinks (CSD). For example, the maximum acceptable level of AA in CSD preforms may be about 8 ppm, while the maximum acceptable level of AA in some water preforms may be about 3 ppm. Preforms intended for use in both CSD and water markets, dual-use preforms, often have AA specifications similar to preforms used solely in the water market. The quantity of phosphorus compound or other catalyst deactivator used depends on the target in the polyester, which depends on the end-use application and/or beverage brand owner involved. For example, the targeted phosphorus level in PET will be higher for water or dual-use applications than for CSD applications. Since late addition of catalyst deactivator can cause It.V. loss, the minimum amount of deactivator possible should be added to achieve the targeted AA level in the part for a given application. If the deactivator is corrosive, the minimum amount of deactivator possible should be added to achieve the targeted AA level in the part for a given application.

Consideration is taken for the cumulative amount of aluminum, alkali or alkaline earth metals, and any other catalyst metals present in the melt. The ratio of the moles of phosphorus to the total moles of aluminum and alkaline earth metal and/or alkali metal (P:M MR where AA is deemed to be the sum of the moles of aluminum, the moles of alkaline earth metals, if present and the moles of alkali metals, if present, and where MR stands for mole ratio) is generally at least 0.1:1, or at least 0.3:1, or at least 0.5:1, or at least 0.7:1, or at least 1:1, and up to about 5:1, or more preferably up to about 3:1, or up to 2:1, or up to 1.8:1, or up to 1.5:1. Excessively large quantities of phosphorus compounds should be avoided to minimize the loss in polymer It.V. upon addition of the phosphorus compound to the polyester melt. The preferred range for P:M MR is 0.5 to 1.5.

Compounds of metals other than aluminum, alkali metals and alkaline earth metals also react with phosphorus compounds. If, in addition to compounds of aluminum, alkali metals and/or alkaline earth metals, other metal compounds that react with phosphorus compounds are present, then the amount of phosphorus compound added late is desirably in excess of that required to achieve the targeted P:M MR to ensure that the phosphorus compounds react or combine with all reactive metals present. In another embodiment of the invention, the polyester polymer composition contains aluminum atoms within a range of 5 ppm to 100 ppm, or 7 to 60 ppm, or 10 ppm to 30 ppm, based on the weight of the polyester polymer, and the molar ratio of all alkaline earth metal and alkali metal atoms to the moles of aluminum atoms is within a range of 0.5:1 to 6:1, or 1:1 to 5:1, or 2:1 to 4:1, and the P:M ratio ranges from 0.1:1 to 3:1, or 0.3:1 to 2:1, or 0.5:1 to 1.5:1. Preferably, the polyester polymer composition contains aluminum and at least one of lithium or sodium or potassium or a combination of thereof. In one embodiment, the composition contains aluminum and lithium, or aluminum and sodium atoms.

Since one of the benefits of the invention is the ease with which the catalyst system may be deactivated, care should be taken not to add the phosphorus compound or another deactivator too early as this would retard the polycondensation rate. The addition of the final amount of desired phosphorus should be completed only upon substantial completion of polycondensation and thereafter, and preferably, the final amount of desired phosphorus compound should not be added to the polymer melt in the melt phase manufacturing process until substantial completion of the polycondensation or thereafter.

In the embodiments in which the phosphorus compounds are added in the melt phase polymerization, by the final amount of phosphorus is meant the final amount of phosphorus desired in the polyester polymer exiting the melt phase manufacturing process or as appearing in a pellet. If desired, a partial amount of phosphorus compound may be added early in the melt phase manufacturing process, such as at the initiation of polycondensation, provided that a portion of phosphorus representing the final amount is added late in the course of polycondensation or thereafter but before solidification as explained further below. To maximize polycondensation and/or production rates, the majority, or preferably the bulk, or most preferably the whole of the phosphorus compound is added late to the melt phase manufacturing process.

To minimize It.V. loss if large quantities of phosphorus are added, or to further minimize the potential It.V. loss even if moderate or optimal quantities of phosphorus are added, it is desirable to add the phosphorus compound neat, that is without further dilution, such as in the case of 85% or more phosphoric acid. If a carrier is used, it is preferred that that the carrier is nonreactive, that is, does not break the polymer chain nor increase AA generation rates. Water, alcohols, glycols and lower molecular weight PET are known to break the polymer chain. Once the minimum amount of the phosphorus compound and the associated It.V. loss are known, the melt-phase process can be carried out such that the It.V, made before deactivation/stabilization, is higher by the amount of It.V. loss expected so that the target ItV. can be achieved.

The melt phase reaction proceeds in a batch, semi-batch, or continuous mode. Preferably, the process of the invention is continuous.

In the process of the invention, polyester polymers are made in a melt phase reaction comprising forming a polyester polymer melt in the presence of an aluminum compound and an alkali metal or an alkaline earth metal compound or alkali compound. At least a portion of the polycondensation reaction proceeds in the presence of the combination of an aluminum compound, alkali metal compound, alkaline earth metal compound or alkali compound. The various ways in which aluminum compound, the alkali metal compound, the alkaline earth metal compound or alkali compound can be added, their order of addition, and their points of addition are further described below.

Polyester precursor reactants are fed to an esterification reaction vessel where the first stage of the melt phase process is conducted. The esterification process proceeds by direct esterification or by ester exchange reactions, also known as transesterification. In the second stage of the melt phase process, the oligomer mixture formed during esterification is polycondensed to form a polyester melt. The molecular weight of the melt continues to be increased in the melt phase process to the desired IV. The catalyst system of the invention is useful in any melt phase process for making polyethylene terephthalate based polymers.

To further illustrate, a mixture of one or more dicarboxylic acids, preferably aromatic dicarboxylic acids, or ester forming derivatives thereof, and one or more diols, such as ethylene glycol, are continuously fed to an esterification reactor operated at a temperature of between about 200° C. and 300° C., and at a super-atmospheric pressure of between about 1 psig up to about 70 psig. The residence time of the reactants typically ranges from between about one and five hours. Normally, the dicarboxylic acid(s) is directly esterified with diol(s) at elevated pressure and at a temperature of about 240° C. to about 285° C. The esterification reaction is continued until a acid or ester group conversion of at least 70% is achieved, but more typically until a acid or ester group conversion of at least 85% is achieved to make the desired oligomeric mixture (or otherwise also known as the "monomer").

The resulting oligomeric mixture formed in the esterification zone (which includes direct esterification and ester exchange processes) includes bis(2-hydroxyethyl)terephthalate (BHET) monomer, low molecular weight oligomers, DEG, and trace amounts of water as the condensation by-product not totally removed in the esterification zone, along with other trace impurities from the raw materials and/or possibly formed by catalyzed side reactions, and other optionally added compounds such as toners and stabilizers. The relative amounts of BHET and oligomeric species will vary depending on whether the process is a direct esterification process in which case the amount of oligomeric species are significant and even present as the major species, or a ester exchange process in which case the relative quantity of BHET predominates over the oligomeric species. Water is removed as the esterification reaction proceeds in order to drive the equilibrium toward the desired products. Methanol is removed as the ester exchange reaction of a dimethyl ester of a dicarboxylic acid proceeds in order to drive the equilibrium toward the desired products. The esterification zone typically produces the monomer and oligomer species, if any, continuously in a series of one or more reactors. Alternately, the monomer and oligomer species in the oligomeric mixture could be produced in one or more batch reactors. It is understood, however, that in a process for making PEN, the reaction mixture will contain the monomeric species bis(2-hydroxyethyl)-2,6-naphthalate and its corresponding oligomers. At this stage, the It.V. is usually not measurable or is less than 0.1 dL/g. The average degree of polymerization of the molten oligomeric mixture is typically less than 15, and often less than 7.0.

The reaction to make the oligomeric mixture is otherwise preferably uncatalyzed in the direct esterification process and additionally catalyzed in ester exchange processes. Typical ester exchange catalysts which may be used in an ester exchange reaction include titanium alkoxides and dibutyl tin dilaurate, zinc compounds, manganese compounds, each used singly or in combination with each other. Alkali metal compounds, such as those of lithium or sodium, or alkaline earth compounds, such as those of magnesium or calcium, may also be used as ester exchange catalysts. Any other catalyst materials well known to those skilled in the art are suitable. In a most preferred embodiment, however, the ester exchange reaction proceeds in the absence of titanium compounds. Titanium based catalysts present during the polycondensation reaction negatively impact the b* by making the melt more yellow. While it is possible to deactivate the titanium based catalyst with a stabilizer after completing the ester exchange reaction and prior to commencing polycondensation, in a most preferred embodiment it is desirable to eliminate the potential for the negative influence of the titanium based catalyst on the b* color of the melt by conducting the direct esterification or ester exchange reactions in the absence of any added titanium containing compounds. Suitable alternative ester exchange catalysts include zinc compounds, manganese compounds, or mixtures thereof.

Once the oligomeric mixture is made to the desired percent conversion of the acid or ester groups, it is transported from the esterification zone or reactors to the polycondensation zone. The commencement of the polycondensation reaction is generally marked by either a higher actual operating temperature than the operating temperature in the esterification zone, or a marked reduction in pressure (usually sub-atmospheric) compared to the esterification zone, or both. Typical polycondensation reactions occur at temperatures ranging from about 260° C. and 300° C., and at sub-atmospheric pressure of between about 350 mmHg to 0.2 mm Hg. The residence time of the reactants typically ranges from between about 2 to about 6 hours. In the polycondensation reaction, a significant amount of glycol is evolved by the condensation of the oligomeric ester species and during the course of molecular weight build-up.

In some processes, polycondensation reactions are initiated and continued in the melt phase in a prepolymerization zone and finished in the melt phase in a finishing zone, after which the melt is solidified to form the polyester polymer melt phase product, generally in the form of chips, pellets, or any other shape. Each zone may comprise a series of one or more distinct reaction vessels operating at different conditions, or the zones may be combined into one reaction vessel using one or more sub-stages operating at different conditions in a single reactor. That is, the prepolymer stage can involve the use of one or more reactors operated continuously, one or more batch reactors, or even one or more reaction steps or sub-stages performed in a single reactor vessel. The residence time of the melt in the finishing zone relative to the residence time of the melt in the prepolymerization zone is not limited. For example, in some reactor designs, the prepolymerization zone represents the first half of polycondensation in terms of reaction time, while the finishing zone represents the second half of polycondensation. Other reactor designs may adjust the residence time between the finishing zone to the prepolymerization zone at about a 1.5:1 ratio or higher. A common distinction between the prepolymerization zone and the finishing zone in many designs is that the latter zone frequently operates at a higher temperature and/or lower pressure than the operating conditions in the prepolymerization zone. Generally, each of the prepolymerization and the finishing zones comprise one or a series of more than one reaction vessel, and the prepolymerization and finishing reactors are sequenced in a series as part of a continuous process for the manufacture of the polyester polymer.

In one embodiment, the temperature applied to the polymer melt or of the polymer melt in at least a portion of the polycondensation zone is greater than 280° and up to about 290° C. In another embodiment, the temperatures in the finishing zone are, contrary to conventional practice, lower than 280° C. in order to avoid rapid increases in the rate of AA precursor formation. The pressure in the finishing zone may be within the range of about 0.2 to 20 mm Hg, or 0.2 to 10 mm Hg, or 0.2 to 2 mm Hg.

The addition of aluminum compounds and alkaline earth metal compounds or alkali compounds to the melt phase reaction may proceed in a variety of ways. Broadly speaking, the aluminum compound and alkaline earth metal compound or alkali compounds may be added in combination as a unitary stream, or as separate streams. The alkaline earth metal or alkali compounds and the aluminum compounds may be combined together into a solution or into a dispersion or a slurry with a solvent such as ethylene glycol and added as a unitary stream.

When the aluminum compounds and alkaline earth metal compounds or alkali compounds are stirred and heated at about 125° C. and an adequate nitrogen purge sweeps vapors away from the surface of the mixture and out of the mix tank, the resulting mixtures are usually almost colorless. For most combinations, the mixture clears at some point during the heating to about 125° C., which lasts preferably at least 0.5 hours or at least 1 hour and no more than 4 hours. Depending on the Li:Al MR, some of the mixtures stay clear upon cooling to room temperatures while others become slurries or dispersions. In an analogous procedure, the use of nitrogen to keep vapors near the surface of the mixture results in a solution or a dispersion or a slurry that is more colored. More color in a catalyst solution, slurry or dispersion can lead to more color in the polymer.

Therefore, there is also provided an embodiment of the invention comprising a mixture of an aluminum compound and an alkali metal compound or an alkaline earth metal compound or alkali compound suitable for catalyzing a polycondensation reaction prepared by combining one or more aluminum compounds with one or more of alkali metal or alkaline earth metal or alkali compounds to form a mixture, and optionally heating the mixture in the presence of a gas purge, such as an inert gas, followed by optionally allowing the mixture to cool through ambient conditions such as through 25° C. If the optional nitrogen purge is employed, the rate should be sufficient to remove volatiles that react to form color bodies; therefore, if a given nitrogen purge rate keeps the solution colorless, that purge rate is adequate or sufficient. A preferred nitrogen purge rate is 0.5 to 3 scfm. A more preferred nitrogen purge rate is 1 to 2 scfm. The resulting mixture desirably does not show visible phase separation on standing for one (1) week at room temperature. For some M:Al MR, this can be made possible by employing solvents such as mono-ol ether compounds or polyhydroxy ether compounds alone or in combination with ethylene glycol, such as diethylene glycol, 2-methoxy ethanol, ethylene glycol butyl ether, 2-isopropxyethanol, ethylene glycol monophenyl ether, a polyoxyalkylene polyether polyol, or combinations thereof. Other suitable solvents which will keep the Al and alkaline earth metal or alkali metal catalyst system in solution include a combination of ethylene glycol with mono-basic or dibasic hydroxyacids having at least 3 carbon atoms and a carboxylic group and hydroxyl group in the alpha or beta position to each other through one or two carbon atoms, such as lactic acid, tartaric acid, mandelic acid or salicylic acid. Alternatively, if the composition precipitates upon standing at room temperature, it is desirable to keep the mixture hot in the catalyst mix and/or feed tanks until added to the melt-phase polyester manufacturing line Adding the aluminum compound and alkaline earth metal or alkali metal compound together in solution or a dispersion or a slurry as a unitary stream provides the convenience of reducing the number of addition points.

The alkaline earth metal or alkali compounds may, if desired, be added to the esterification zone before, during, or after completion of esterification, or between the esterification zone and polycondensation zone, or at a point when polycondensation starts. In one embodiment, the alkaline earth metal or alkali compounds are added before 50% conversion of the esterification reaction mixture In a more preferred embodiment, the alkaline earth metal or alkali is added between the esterification zone and inception of or during polycondensation or at the inception or during prepolymerization. Since the alkali metal or alkaline earth metal or alkali operates as part of the polycondensation catalyst system, it is desirable to add the alkali metal or alkaline earth metal or alkali compound to the polyester melt early in the polycondensation reaction to provide the benefit of shorter reaction time or a higher molecular weight build-up. As previously stated, it is preferable that the aluminum compound and the alkali metal or alkaline earth metal or alkali compounds are added close together e.g. both after 90% esterification and before the It.V. of the melt reaches 0.2 dL/g, or 0.1 dL/g, or before an increase of 0.1 dL/g after exiting the last esterification reactor, or before entering the first polycondensation reaction vessel), and it is more preferable that the aluminum compound and the alkali metal or alkaline earth metal or alkali compounds are heated together prior to introduction into a melt-phase polyester manufacturing line.

In the process of the invention, the polyester melt is formed by polycondensing the oligomer mixture in the presence of an aluminum compound. An aluminum compound may be added late to the esterification zone, to the oligomer mixture exiting the esterification zone, or at the start of polycondensation, or to the polyester melt during polycondensation, and preferably as noted above after at least about 75% conversion in the esterification zone. However, since aluminum operates as part of the polycondensation catalyst system, it is desirable to add aluminum to the polyester melt early in the polycondensation reaction to provide the benefit of shorter reaction time or a higher molecular weight build-up. An aluminum compound is added preferably when the percent conversion of the acid end groups is at least 75%, more preferably when the % conversion of the acid end groups is at least 85%, and most preferably when the % conversion of the acid end groups from esterification is at least 93%.

In a preferred embodiment, an aluminum compound is added to the oligomer mixture upon or after completion of esterification or to a polyester melt no later than when the It.V. of the melt reaches 0.3 dL/g, or no later than when the It.V. of the melt reaches 0.2 dL/g, and more preferably to the oligomer mixture exiting the esterification zone or prior to commencing or at the start of polycondensation.

In one embodiment where the phosphorus compound is added to a melt phase polymerization process, the catalyst stabilizer is added to the polyester melt late during the course of polycondensation and before solidification. The deactivator is added to the polyester melt late in the course of the polycondensation reaction when one or more of the following conditions are satisfied or thereafter and before solidification of the polyester melt:

a) the polyester melt reaches an It.V. of at least 0.50 dL/g or
b) vacuum applied to the polyester melt, if any, is released, at least partially, or
c) if the polyester melt is present in a melt phase polymerization process, adding the phosphorus compound within a final reactor for making the polyester polymer, near its discharge point, or between the final reactor and before a cutter for cutting the polyester melt, or
d) if the polyester melt is present in a melt phase polymerization process, following at least 85% of the time for polycondensing the polyester melt; or
e) the It.V. of the polyester melt is within +/−0.15 dl/g of the It.V. obtained upon solidification; or
f) at a point within 30 minutes or less, or 20 minutes or less of solidifying the polyester melt.

In one embodiment, the deactivator is added to the polyester melt after the polyester melt obtains an It.V. of at least 0.50 dL/g, or at least 0.55 dL/g, or at least 0.60 dL/g, or at least 0.65 dL/g, or at least 0.68 dL/g, or at least 0.70 dL/g, or at least 0.72 dL/g or at least 0.76 dL/g, or at least 0.78 dL/g, and most preferably, regardless of when the deactivator is added, the resulting polymer exiting the melt phase manufacture has an It.V. of at least 0.68 dL/g or at least 0.72 dL/g or at least 0.76 dL/g.

In another embodiment, the deactivator is added to the polyester melt during or after releasing the vacuum from the polyester melt undergoing polycondensation reactions, or after bringing the pressure in a polycondensation zone or reactor from a lower level of at most 10 mm Hg or less or preferably from a lower level of at most 3 mm Hg or less to a level of 300 mm Hg or greater, or 450 mm Hg or greater, or 600 mm Hg or greater, or to atmospheric pressure or greater, and preferably before the polyester melt is solidified.

In another embodiment, the deactivator is added at a location near or at the end of a final reactor or between the final reactor and before a cutter. For example, the deactivator is added to the last polycondensation reactor at a location proximal to the outlet of the last polycondensation reactor, or to a pipe connecting directly or indirectly the last polycondensation reactor and a gear pump or extruder providing the motive force to drive the melt through a die plate for cutting wherein said pipe is directed back to or proximal to the outlet or the bottom of the last polycondensation reactor, or to a pipe inlet to the last polycondensation reactor that is proximal to its outlet. By proximal to the outlet of the last polycondensation reactor, it is meant that the addition location is within the last 25% or less of said reactor or with in the last 15% or less of said reactor or preferably in the last 10% or less of said reactor. The percentage can be by length or height or volume of the last polycondensation reactor. Preferably the percentage is by length or height. The last percentages of lengths, heights or volumes are measured starting from the last polycondensation reactor's outlet.

In yet another embodiment, the deactivator is added to the polyester melt following at least 85%, or at least 90%, or at least 95%, or at least 98%, or about 100% of the average polycondensation time. The average polycondensation time is measure of the average time elapsed between when a given portion of melt enters the start of polycondensation zone to when that given portion of melt reaches the exit of the polyester melt from the last polycondensation reactor. The average polycondensation time or average residence time in the polycondensation zone can be measured by tracer studies or modeling. In a further embodiment, the deactivator is added to the polyester melt when the It.V. of the polyester melt is within 0.15 dL/g, or within 0.10 dL/g, or within 0.05 dl/g, or within 0.030 dL/g, or within 0.02 of the It.V. obtained upon solidification. For example, the polyester melt could have an It.V. that is 0.10 dL/g below the It.V. obtained upon solidification, or it could have an It.V. that is 0.10 dL/g above the It.V. obtained upon solidification.

In yet another embodiment, the deactivator is added to the polyester melt at a point within 30 minutes or less, within 20 minutes or less, or within 10 minutes or less, or 5 minutes or less, or 3 minutes or less of solidifying the polyester melt. The solidification of the polyester melt typically occurs when the melt is forced through a die plate into a water bath and cut into pellets, or in a melt-to-mold process when the melt is injection molded into a molded article. In the broadest sense, solidification occurs when the temperature of the polymer melt is cooled below the crystalline melting temperature of the polymer.

In yet a more preferred embodiment, each of the embodiments identified herein occurs individually or in combination in a continuous manufacturing process where the throughput of the melt phase process is at least 1 metric ton/day, or at least 50 metric tons/day, or at least 100 metric tons/day, or at least 200 metric tons/day, or at least 300 metric tons/day, or at least 400 metric tons/day, or at least 500 metric tons/day of polyester polymer in a steady state operation.

The reaction time of the melt from an It.V. of 0.40 dL/g through and up to an It.V. in the range of at least 0.68 dL/g to 0.94 dL/g is preferably 240 minutes or less, 210 minutes or less, 180 minutes or less, 150 minutes or less, or 120 minutes or less, or 90 minutes or less, or 50 minutes or less. During the times stated, the vacuum applied is preferably between 0.5 and 1.0 mm Hg, the temperature is preferably between 275° C. to 285° C. The target It.V. is preferably between 0.82 and 0.92 dL/g prior to deactivation/stabilization.

Stabilizing or deactivating the catalyst late or near the end of a melt phase process can result in polyester particles that, in the absence of M scavengers, generate less AA during subsequent melt processing than the particles would if the stabilizer or deactivator had not been added. With late addition of a phosphorus compound, aluminum, alkali metal and/or alkaline earth metal and/or alkali catalyst systems can produce polyester polymer particles with lower AA generation rates than polyester polymers made without the presence of a catalyst deactivator or polyesters made with conventional antimony catalysts that are or are not similarly deactivated late with a phosphorus compound. Molded parts, such as preforms, can have lower free acetaldehyde levels when made from polyester polymers catalyzed by an aluminum, alkali metal and/or alkaline earth metal and/or alkali systems and with a phosphorus compound added late than when made from polyester polymers catalyzed by the same system but with no late addition of a phosphorus compound or when made from polyester polymers catalyzed by a conventional antimony catalyst that is or is not similarly deactivated late with a phosphorus compound. The P:M MR used with the aluminum and alkali metal and/or alkaline earth metal and/or alkali catalyst systems affects the acetaldehyde generation level in particles and acetaldehyde level in molded parts. With late addition of a phosphorus compound to the polyester melt catalyzed with an aluminum and alkali metal and/or alkaline earth metal and/or alkali system, it is now possible to obtain a polyester polymer particles having low free AA levels and an AA generation rate low enough for use in water bottle applications without the need to add AA scavengers or other AA lowering additives.

Once the polymer molecular weight is built to the desired degree, it is discharged from the final polycondensation reactor, in this case a finisher, to be pelletized. A gear pump may be utilized to facilitate funneling an amount of bulk polymer through a conduit to exit from finishing vessel. Prior to cutting the molten polymer, and in another aspect, prior to exiting the melt phase final reactor, it may be desirable to combine the bulk polymer in the melt phase with a second stream that is a liquid (which includes a molten stream, dispersions, emulsions, homogeneous liquids, and heterogeneous slurries). The second stream can be introduced into the melt phase process at any stage prior to solidification, but preferably between the cutter and the entry into the final bulk polymer reactor (such as a finisher). The second stream may be introduced after the last half of the residence time within the final reactor and before the cutter.

The manner in which the second liquid stream is introduced and the source of the second liquid stream is not limited. For example, it may it may be desirable to treat and additionally process a portion of a slip stream. Once treated, the treated portion of a slip stream may be circulated back to the finishing tank. In another example, it may be desirable to introduce a slip stream (second liquid stream) into the finisher through an extruder or a pumping means from a source independent from or other than the bulk polymer produced in the melt phase process.

In one embodiment, the catalyst deactivator may be added into a slip stream taken from the stream existing the final polycondensation reactor and recirculated back into the final reactor or at a point before the slipstream is taken from the melt phase stream exiting the final reactor. In addition, other compounds such as UV inhibitors, colorants, reheat additives, or other additives can be added into a slipstream depending upon the fitness for use requirements of the polymer in its ultimate application. Any one or a mixture of these additives may be contained in the second liquid stream.

The additives including the catalyst deactivator may be added to the molten bulk polymer stream via a slipstream or introduced from a fresh source as described above. Additionally or alternatively, a solid additive may be added from a solid additive supply vessel to the slip stream. Additional processing equipment, such as an extruder, may be employed to facilitate mixing the solid additive into slip stream. The extruder may also serve to provide an additional amount of mixing to the slip stream. The extruder may be in line with the slipstream, or may intersect into the slipstream. One or more optional gear pumps may also be employed to provide motive force to the slip stream as it is enriched with one or more additives. Optionally, one or more static mixers in line with the slipstream line may be employed to process the slip stream to provide an additional degree of mixing as desired. Thus, a treated portion or additive enriched polymer slip stream may be generated and returned to the finishing tank for reintroduction into the bulk polymer flow.

If desired, the second additive rich, or catalyst deactivator containing stream may be returned to the finisher tank and distributed therein in any suitable manner. In one embodiment, the second stream may be distributed within the finisher or final polycondensation vessel through a distributor plate. The plate may have a circular design with an inlet to receive the second stream and flow through a plurality of channels through which the second stream is distributed and exits at the bottom of the plate through the channel outlets.

The distributor plate may comprise a first plate having an inner surface and an outer surface, the outer surface having an opening for receiving the second material, the inner surface having a plurality of channels disposed therein, wherein at least one of the channels of the first plate is in communication with the opening, and a second plate connected to the first plate, the second plate having an inner surface and an outer surface, the inner surface of the second plate having a plurality of channels disposed therein, wherein at least one of the plurality of channels of the second plate are aligned with said plurality of channels of the first plate to form enclosed channels in communication with the opening. Desirably, at least one of the plurality of channels of said second plate has outlet holes, wherein the outlets extend from at least one of the channels of the second plate to the outer surface of the second plate.

With late addition of a phosphorus compound to the polyester melt catalyzed with an aluminum and alkali metal and/ or alkaline earth metal and/or alkali system, it is now possible to mold a polyester polymer particles into an article, such as a preform, having free AA levels low enough for use in water bottle applications without the need to add AA scavengers or other AA lowering additives. Moreover, this type of polymer particles having both low free AA levels and low AA generation rates without the presence of an AA lowering additive can be obtained to a high It.V. (at least 0.68 dL/g, or at least 0.70 dL/g, or at least 0.72 dL/g, or at least 0.74 dL/g, or at least 0.76 dL/g, or at least 0.80 dL/g, or at least 0.82 dL/g or at least 0.84 It.V.) in the melt phase without the necessity for polymerizing the polymer in the solid-state. Furthermore, since this type of polyester particles has an AA generation rate low enough for use in water bottle applications without the need to add AA scavengers and can be obtained to a high It.V., this type of polyester particles is suitable for dual-use applications: it has the low AA generation rate required for some water bottles and the high It.V. required for CSD bottles; therefore, one type of polyester particle can be used for both applications. While a AA stripping treatment to lower free AA below 2 ppm prior to beginning the injection molding process may be needed, this AA stripping process would be brief compared with that for Sb-catalyzed PET with a phosphorus compound added late.

The need for and length of the AA stripping process depends on the amount of residual AA present in the polyester polymer particles after melt phase manufacture and on customers' specifications for residual AA in the particles, which may vary depending on the application. The amount of residual AA present in the polyester polymer particles after melt phase manufacture is desirably reduced to a level of 5 ppm or less, or 4 ppm or less, or 3 ppm or less, or 2 ppm or less, or 1 ppm or less.

Since polycondensation temperature has a major influence on finisher stage time or production rate and a relatively minor influence on the AA generation rate, it is possible to significantly decrease finisher times or increase production rates by modest temperature increases of 2° C. and, with late addition of a phosphorus compound, minimize the impact on AA generation rates or preform AA. At the same temperature, many combinations of this catalyst system are more active than antimony catalysts, that is, take less time to reach the same It.V. With the combination of higher polycondensation temperatures and higher inherent catalytic activities, shorter finisher times or faster production rates relative to Sb catalysts are likely Especially at higher Al levels and/or higher alkaline earth metal or alkali metal or alkali levels, the late addition of a phosphorus compound to the polyester melt significantly decreases particulate haze in the polymer, resulting in a molded article with better clarity. Since higher Al levels and/ or higher alkaline earth metal or alkali metal or alkali levels in PET increase production rates, late addition of a phosphorus compound facilitates maximizing production rates while minimizing haze. Crystallized polymers that are catalyzed by aluminum/alkaline earth metal or alkali metal systems tend to be brighter or have higher $L^*$ color values relative to crystallized polymers catalyzed by antimony systems under the same polymerization conditions. Moreover, the late addition of a phosphorus compound to polyester melts catalyzed by aluminum/alkaline earth metal or alkali metal systems produces polymers which when crystallized have even higher $L^*$ color values or higher brightness relative to the no phosphorus case, which may have somewhat higher It.V. For example, the crystallized polyester polymers obtained by the process of the invention have an $L^*$ of at least 55, or at least 60, or at least, 65, at least 70.

PET made exclusively in the melt phase using an aluminum/alkaline earth metal or alkali catalyst system with addition of a phosphorus compound near the end of the melt phase process can have a low enough preform AA or AA generation rate upon melting for water bottle applications, while also exhibiting decreased finisher times or increased production rates, slower crystallization rates from the melt, lower haze and a similar or improved yellowness and/or brightness after toning, relative to PET made exclusively in the melt phase using a conventional Sb catalyst. Slower crystallization from the melt means that less heat is needed in the extruder portion of injection molding process to mold clear preforms; therefore, the cooling time is shorter and hence, the injection molding cycle time is decreased, that is, more, clear bottle preforms can be made per unit time. The attribute of a low preform AA or low acetaldehyde generation rate upon melting polyester particles provides a single polymer with dual use capabilities, that is, a single polymer can be used in both the carbonated soft drink applications and the water bottle applications. In addition to the slower crystallization rates and the concomitant shorter cycle times, and the use of one polymer resin for both water and CSD markets, there is the additional advantage of avoiding the expense of using an additive to react with free AA, such as an AA scavenger.

It is to be understood that the melt phase process conditions and reactor configurations described above are illustrative of a melt phase process, and that the invention is not limited to this illustrative process. For example, while reference has been made to a variety of operating conditions at certain discrete It.V. values, differing process conditions may be implemented inside or outside of the stated It.V. values, or the stated operating conditions may be applied at It.V. points in the melt other than as stated. Moreover, one may adjust the process conditions based on reaction time instead of measuring or predicting the It.V. of the melt. The process is also not limited to the use of tank reactors in series or parallel or to the use of different vessels for each zone. Nor is it necessary to split the polycondensation reaction into a prepolymer zone and a finishing zone because the polycondensation reaction can take place in one polycondensation reactor with variations in operating conditions over time or in a multitude of reactors in series, either in a batch, semi-batch, or a continuous process.

Once the desired It.V. is obtained, the molten polyester polymer in the melt phase reactors is discharged as a melt phase product and solidified without the addition of an acetaldehyde scavenger to the polymer melt. Avoiding the addition of acetaldehyde scavengers is desirable because acetaldehyde scavengers are costly and can be responsible for increasing the yellowness or b* color of the polyester polymer or decreasing its L* color after toning out yellowness, especially when the reaction product of AA and the scavenger is yellow. The addition of acetaldehyde scavengers can also be responsible for increasing the amount of black specks in the polyester polymer. If the AA scavenger has thermal stability or volatility issues, the effectiveness of a given amount of scavenger at lowering AA may suffer when the scavenger is added in the finisher in a polycondensation zone where high heat and high vacuum are applied. The effectiveness of a given amount of scavenger at lowering AA in preforms may suffer when the scavenger is added to melt phase manufacturing as a significant portion of the scavenger may be used up reacting with residual AA in the manufacturing process, especially after the finisher when vacuum has been released and prior to solidification into particles. A larger amount of scavenger could be added; however, this would further increase costs.

An acetaldehyde scavenger is a compound or polymer which interacts by physical forces or by chemical reaction with acetaldehyde to bind acetaldehyde and prevent its release from the polyester polymer. Rather than preventing the formation of acetaldehyde precursors or the subsequent reactions of the precursors to form AA, the scavengers operate by binding to free or residual acetaldehyde that is already formed.

Acetaldehyde scavengers are known to those of skill in the art. Examples include polyamides such as those disclosed in U.S. Pat. No. 5,266,413, U.S. Pat. No. 5,258,233 and U.S. Pat. No. 4,831,115; polyesteramides such as those disclosed in U.S. application Ser. No. 595,460, filed Feb. 5, 1996; nylon-6 and other aliphatic polyamides such as those disclosed in Japan Patent Application Sho 62-182065 (1987); ethylenediaminetetraacetic acid (U.S. Pat. No. 4,357,461), alkoxylated polyols (U.S. Pat. No. 5,250,333), bis(4-[bgr]-hydroxyethoxyphenyl) sulfone (U.S. Pat. No. 4,330,661), zeolite compounds (U.S. Pat. No. 5,104,965), 5-hydroxyisophthalic acid (U.S. Pat. No. 4,093,593), supercritical carbon dioxide (U.S. Pat. No. 5,049,647 and U.S. Pat. No. 4,764, 323) and protonic acid catalysts (U.S. Pat. No. 4,447,595 and U.S. Pat. No. 4,424,337), and the most well known acetaldehyde scavengers are homo and copolyamides such as poly (caprolactam), poly(hexamethylene-adipamide), poly(m-xylylene-adipamide), and any other compound or polymer having an active methylene group The melt phase product is processed to a desired form, such as amorphous particles; however, crystallized pellets are preferred. The shape of the polyester polymer particles is not limited, and can include regular or irregular shaped discrete particles without limitation on their dimensions, including stars, spheres, spheroids, globoids, cylindrically shaped pellets, conventional pellets, pastilles, and any other shape, but particles are distinguished from a sheet, film, preforms, strands or fibers.

The number average weight (not to be confused with the number average molecular weight) of the particles is not particularly limited. Desirably, the particles have a number average weight of at least 0.10 g per 100 particles, more preferably greater than 1.0 g per 100 particles, and up to about 100 g per 100 particles.

The method for solidifying the polyester polymer from the melt phase process is not limited. For example, molten polyester polymer from the melt phase process may be directed through a die, or merely cut, or both directed through a die followed by cutting the molten polymer. A gear pump may be used as the motive force to drive the molten polyester polymer through the die. Instead of using a gear pump, the molten polyester polymer may be fed into a single or twin screw extruder and extruded through a die, optionally at a temperature of 190° C. or more at the extruder nozzle. Once through the die, the polyester polymer can be drawn into strands, contacted with a cool fluid, and cut into pellets, or the polymer can be pelletized at the die head, optionally underwater. The polyester polymer melt is optionally filtered to remove particulates over a designated size before being cut. Any conventional hot pelletization or dicing method and apparatus can be used, including but not limited to dicing, strand pelletizing and strand (forced conveyance) pelletizing, pastillators, water ring pelletizers, hot face pelletizers, underwater pelletizers and centrifuged pelletizers.

The polyester polymer is one which is crystallizable. The method and apparatus used to crystallize the polyester polymer is not limited, and includes thermal crystallization in a gas or liquid. The crystallization may occur in a mechanically agitated vessel; a fluidized bed; a bed agitated by fluid movement; an un-agitated vessel or pipe; crystallized in a liquid medium above the $T_g$ of the polyester polymer, preferably at 140° C. to 190° C.; or any other means known in the art. Also, the polymer may be strain crystallized. The polymer may also be fed to a crystallizer at a polymer temperature below its $T_g$ (from the glass), or it may be fed to a crystallizer at a polymer temperature above its $T_g$. For example, molten polymer from the melt phase polymerization reactor may be fed through a die plate and cut underwater, and then immediately fed to an underwater thermal crystallization reactor where the polymer is crystallized underwater. Alternatively, the molten polymer may be cut, allowed to cool to below its $T_g$, and then fed to an underwater thermal crystallization apparatus or any other suitable crystallization apparatus. Or, the molten polymer may be cut in any conventional manner, allowed to cool to below its $T_g$, optionally stored, and then crystallized.

A preferred solidification technique integrates the cutting with the crystallization by not allowing the heat energy imparted to the polymer in the melt phase manufacture to drop below the $T_g$ before the polymer is both cut and crystallized. In one integrated solidification technique, the molten polyester polymer is directed through a die, cut at the die plate under water at high temperature and greater than atmospheric pressure, swept away from the cutter by the hot water and through a series of pipes to provide residence time to thermally crystallize the particles in the hot liquid water at a temperature greater than the $T_g$ of the polymer and preferably at about 130 to 180° C., after which the water is separated from the crystallized particles and the particles are dried. In another integrated solidification technique, the molten polyester polymer is cut underwater, the particles are immediately separated from the liquid water after cutting, the particles are dried, and while the particles are still hot and before the temperature of the particles drops below the $T_g$ of the polymer and desirably while the particle temperature is above 140° C., the particles are directed from the dryer onto a surface or vessel which allows the particles to form a moving bed with a bed height sufficient to allow the latent heat within the particles to crystallize the particles without the external application of a heating medium or pressurizing means. Such a surface or vessel is desirably an at least partially enclosed vibrating conveyor, such as is available from Brookman Kreyenborg GmbH.

The degree of crystallinity is optionally at least 30%, or at least 35%, or at least 40%. The melt phase products are preferably substantially free of titanium catalyst residues, and in a direct esterification process, are preferably prepared by adding to the melt phase a polycondensation catalyst consisting only of or formed only from aluminum containing compound(s) and an alkali metal or an alkaline earth metal containing compound(s). Titanium based non-catalytic reheat additives may be included. Thus, polyester polymers made in the melt phase having a low or acceptable AA generation rate can be isolated and provided to a converter without the need for increasing their molecular weight in the solid state. By making the high It.V. product in the melt phase, the solid stating step can be altogether avoided. Solid stating is commonly used for increasing the molecular weight (and the It.V) of the pellets in the solid state, usually by at least 0.05 It.V. units, and more typically from 0.1 to 0.5 It.V. units.

In addition, certain agents which colorize the polymer can be added to the melt. In one embodiment, a bluing toner is added to the melt in order to reduce the b* of the resulting polyester polymer melt phase product. Such bluing agents include blue inorganic and organic toners. In addition, red toners can also be used to adjust the a* color. Organic toners, e.g., blue and red organic toners, such as those toners described in U.S. Pat. Nos. 5,372,864 and 5,384,377, which are incorporated by reference in their entirety, can be used. The organic toners can be fed as a premix composition. The premix composition may be a neat blend of the red and blue compounds or the composition may be pre-dissolved or slurried in one of the polyester's raw materials, e.g., ethylene glycol.

Examples of reheat additives (a reheat additive is deemed a compound added to the melt in contrast to forming a reheat aid in situ) include activated carbon, carbon black, antimony metal, tin, titanium nitride, titanium, copper, silver, gold, palladium, platinum, black iron oxide, and the like, as well as near infrared absorbing dyes, including, but not limited to those disclosed in U.S. Pat. No. 6,197,851 which is incorporated herein by reference.

The iron oxide, which is preferably black, is used in very finely divided form, e.g., from about 0.01 to about 200 µm, preferably from about 0.1 to about 10.0 µm, and most preferably from about 0.2 to about 5.0 µm. Suitable forms of black iron oxide include, but are not limited to magnetite and maghemite. Red iron oxide may also be used. Such oxides are described, for example, on pages 323-349 of Pigment Handbook, Vol. 1, copyright 1973, John Wiley & Sons, Inc.

Other components can be added to the composition of the present invention to enhance the performance properties of the polyester polymer. For example, crystallization aids, impact modifiers, surface lubricants, denesting agents, antioxidants, ultraviolet light absorbing agents, colorants, nucleating agents, other reheat rate enhancing aids, sticky bottle additives such as talc, and fillers and the like can be included.

The compositions of the present invention optionally may contain one or more UV absorbing compounds. One example includes UV absorbing compounds which are covalently bound to the polyester molecule as either a comonomer, a side group, or an end group. Suitable UV absorbing compounds are thermally stable at polyester processing temperatures, absorb in the range of from about 320 nm to about 380 nm, and are difficult to extract or nonextractable from said polymer. The UV absorbing compounds preferably provide less than about 20%, more preferably less than about 10%, transmittance of UV light having a wavelength of 370 nm through a bottle wall 12 mils (305 microns) thick. Suitable chemically reactive UV absorbing compounds include substituted methine compounds of the formula

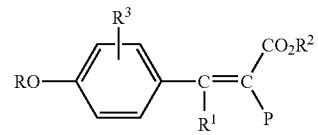

wherein:

R is hydrogen, alkyl, substituted alkyl, aryl, substituted aryl, cycloalkyl, substituted cycloalkyl or alkenyl, or a polyoxyalkylene chain, such as polyoxyethylene or polyoxypropylene polymers, each optionally having some oxypropylene or oxyethylene units in the polymer chain as a block or random copolymer, the polyoxyalkylene chain having a number average molecular weight ranging from 500 to 10,000;

$R^1$ is hydrogen, or a group such as alkyl, aryl, or cycloalkyl, all of which groups may be substituted;

$R^2$ is any radical which does not interfere with condensation with the polyester, such as hydrogen, alkyl, substituted alkyl, allyl, cycloalkyl or aryl;

$R^3$ is hydrogen or 1-3 substituents selected from alkyl, substituted alkyl, alkoxy, substituted alkoxy and halogen, and P is cyano, or a group such as carbamyl, aryl, alkylsulfonyl, arylsulfonyl, heterocyclic, alkanoyl, or aroyl, all of which groups may be substituted.

Preferred methine compounds are those of the above formula wherein: $R^2$ is hydrogen, alkyl, aralkyl, cycloalkyl, cyanoalkyl, alkoxyalkyl, hydroxyalkyl or aryl; R is selected from hydrogen; cycloalkyl; cycloalkyl substituted with one or two of alkyl, alkoxy or halogen; phenyl; phenyl substituted with 1-3 substituents selected from alkyl, alkoxy, halogen, alkanoylamino, or cyano; straight or branched lower alkenyl; straight or branched alkyl and such alkyl substituted with 1-3 substituents selected from the following: halogen; cyano; succinimido; glutarimido; phthalimido; phthalimidino; 2-pyrrolidono; cyclohexyl; phenyl; phenyl substituted with alkyl, alkoxy, halogen, cyano, or alkylsulfamoyl; vinyl-sulfonyl; acrylamido; sulfamyl; benzoylsulfonicimido; alkylsulfonamido; phenylsulfonamido; alkenylcarbonylamino; groups of the formula

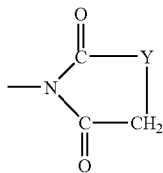

where Y is —NH—, —N-alkyl, —O—, —S—, or —CH$_2$O—; —S—R$_{14}$; SO$_2$CH$_2$CH$_2$SR$_{14}$; wherein R$_{14}$ is alkyl, phenyl, phenyl substituted with halogen, alkyl, alkoxy, alkanoylamino, or cyano, pyridyl, pyrimidinyl, benzoxazolyl, benzimidazolyl, benzothiazolyl; or groups of the formulae

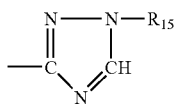

—NHXR$_{16}$, —CONR$_{15}$R$_{15}$, and —SO$_2$NR$_{15}$R$_{15}$; wherein R$_{15}$ is selected from H, aryl, alkyl, and alkyl substituted with halogen, phenoxy, aryl, —CN, cycloalkyl, alkylsulfonyl, alkylthio, or alkoxy; X is —CO—, —COO—, or —SO$_2$—, and R$_{16}$ is selected from alkyl and alkyl substituted with halogen, phenoxy, aryl, cyano, cycloalkyl, alkylsulfonyl, alkylthio, and alkoxy; and when X is —CO—, R$_{16}$ also can be hydrogen, amino, alkenyl, alkylamino, dialkylamino, arylamino, aryl, or furyl; alkoxy; alkoxy substituted with cyano or alkoxy; phenoxy; or phenoxy substituted with 1-3 substituents selected from alkyl, alkoxy, or halogen substituents; and
P is cyano, carbamyl, N-alkylcarbamyl, N-alkyl-N-arylcarbamyl, N,N-dialkylcarbamyl, N,N-alkylarylcarbamyl, N-arylcarbamyl, N-cyclo-hexylcarbamyl, aryl, 2-benzoxazolyl, 2-benzothiazolyl, 2-benzimidazolyl, 1,3,4-thiadiazol-2-yl, 1,3,4-oxadiazol-2-yl, alkylsulfonyl, arylsulfonyl or acyl.

In all of the above definitions the alkyl or divalent aliphatic moieties or portions of the various groups contain from 1-10 carbons, preferably 1-6 carbons, straight or branched chain. Preferred UV absorbing compounds include those where R and R$^1$ are hydrogen, R$^3$ is hydrogen or alkoxy, R$^2$ is alkyl or a substituted alkyl, and P is cyano. In this embodiment, a preferred class of substituted alkyl is hydroxy substituted alkyl. A most preferred polyester composition comprises from about 10 to about 700 ppm of the reaction residue of the compound

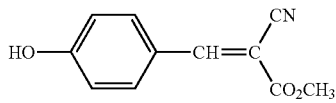

These compounds, their methods of manufacture and incorporation into polyesters are further disclosed in U.S. Pat. No. 4,617,374 the disclosure of which is incorporated herein by reference. The UV absorbing compound(s) may be present in amounts between about 1 to about 5,000 ppm by weight, preferably from about 2 ppm to about 1,500 ppm, and more preferably between about 10 and about 500 ppm by weight. Dimers of the UV absorbing compounds may also be used. Mixtures of two or more UV absorbing compounds may be used. Moreover, because the UV absorbing compounds are reacted with or copolymerized into the backbone of the polymer, the resulting polymers display improved processability including reduced loss of the UV absorbing compound due to plateout and/or volatilization and the like.

The solid particles produced in the melt phase process preferably have an acetaldehyde generation rate, when measured at 295° C. for 5 minutes, of 20 ppm or less, or 18 ppm or less, or 16 ppm or less, or 13 ppm or less, or 11 ppm or less, or 10 ppm or less, or 8 ppm or less. The process of the invention does not require melting the particles at 295° C. for 5 minutes to make molded articles. Like all other measurement conditions stated throughout this description, these measurement conditions are not required to be a part of the described feature or property of the polymer or operating condition, and are only stated as a frame or reference to determine whether a polymer does or does not possess the feature, regardless of whether or not the polymer is actually made or processed under the described measurement conditions. The conditions of 295° C. for 5 minutes apply to CEAST or Tinius Olsen extrusion plastometers, which have relatively low shear and do not melt polyester almost instantaneously. Mini-injectors have more shear, melt polyester almost instantaneously, and will require milder conditions to produce about the same level of AA. For example, with same polyester sample, a mini-injector produces higher levels of AA generation after processing at 285° C. for 5 minutes than a CEAST extrusion plastometer does after processing at 295° C. for 5 minutes.

In another embodiment, the level of AA level in articles, such as in a preform (e.g. 20 oz. preform), is 11 ppm or less, or 9 ppm or less, or 7 ppm or less, or 5 ppm or less, or 4 ppm. With respect to a 20 oz. preform, preforms are molded with an injection molding machine barrel temperature of 275° C. to 290° C., or at about 285° C. and a polymer melt residence time of approximately 2 minutes or less.

Solely for testing purposes on preforms, the injection molding machine is lined out prior to collecting preforms for testing, that is, the first 30 shots are discarded for an eight cavity machine. Twenty successive preforms are collected from a single cavity mold, the one with the highest AA test results historically. Of the 20 preforms, five are randomly selected to go in one bag, five more are randomly selected to go into another bag, and 10 are retained for future grinding and retesting, if needed. The convention is to keep preforms in the freezer until they are ground; however, this is not essential. Prior to grinding, the preforms are chilled in liquid nitrogen. The entire preform is ground up, per ASTM F2013-00. The five preforms in the first bag are cryogenically ground, and two samples are withdrawn for residual or free AA testing. After grinding, samples should be kept in the freezer until it is time to test free AA. The five preforms in the second bag are cryogenically ground, and two samples are withdrawn for residual or free AA testing. The samples are tested per ASTM F2013-00 and in random order. Each sample is tested twice In yet another embodiment, the free AA on solid particles fed to a melt processing zone is 10 ppm or less, or 7 ppm or less, or 5 ppm or less, or 3 ppm or less.

The free AA can be measured on solid particles or preforms. The method used to determine the level of free AA in the polyester polymer composition is the test method ASTM # F2013-00. This test method is used to measure the level of free acetaldehyde in particles, powders, preforms, bottles, and any other form the polyester polymer composition may take. For purposes of measuring residual or free acetaldehyde, the sample is tested according to the method described below.

The test procedure for measuring the level of free acetaldehyde on a sample, whether a preform, pellet, powder, or other form is the ASTM # F2013-00 test method. Samples are cryogenically ground through a Wiley Mill equipped with a 1.0 mesh screen. The final ground material has a particle size less than 800 µm. A portion of a sample (0.20 g) is weighed into a 20-mL head-space vial, sealed and then heated at 150° C. for sixty minutes. After heating, the gas above the sealed sample of PET polymer is injected onto a capillary GC column. The acetaldehyde is separated, and the ppm of acetaldehyde present in the sample is then calculated. The amount of acetaldehyde calculated represents the amount of free or residual acetaldehyde present in the sample.

For measuring the acetaldehyde generation rate on preforms, it is sufficient to use this ASTM # F2013-00 Method as described above without subjecting the preforms to a further melt history since by virtue of making a preform, the pellets are melted in an extruder prior to injection molding. By melt extruding or injection molding, AA precursors in the polymer melt have the opportunity to covert to acetaldehyde.

The acetaldehyde generation rate can be measured on the solid particles. However, for purposes of measuring the acetaldehyde generation, the sample has to undergo a second melt history (where the melt-phase polyester manufacturing is counted as the first melt history) in order to determine the level of acetaldehyde generated. If the sample is a particle or powder which has not undergone a melt step in addition to a prior melt phase polycondensation step, the sample is first treated according to the Sample Preparation procedure described below, after which the sample is submitted to the ASTM # F2013-00 test method for analysis.

Sample Preparation For the purpose of measuring the acetaldehyde generation rate, and if the sample manufactured exclusively in the melt phase has not seen a melt history subsequent to melt phase polycondensation, it is prepared according to this method prior to submitting the sample to the ASTM # F2013-00 test. Samples of polymer powder ground to pass a 3 mm screen are heated in an oven at 115° C. under vacuum (25-30 in. Hg) with a 4 SCFH nitrogen purge for at least 48 h. Although overnight drying would be sufficient for water removal alone, which is all that is needed for solid-stated samples, this extended oven treatment also serves to desorb to about 1 ppm or less the residual AA present in the high IV powder after melt-phase-only synthesis and prior to AA generation testing. If pellets have not been stripped beforehand of most of the residual AA (target: 1 ppm or less), it is necessary to desorb residual AA from the pellets. Pellets can be ground to pass a 2 mm screen prior to residual AA removal under the conditions described above. If grinding is not done, it would take longer and/or require a higher temperature to desorb residual AA from pellets to about 1 ppm or less, due to the larger particle size (longer diffusion path). Any suitable acetaldehyde devolatization technique can be employed on particles which reduces the level of free acetaldehyde down to about 1 ppm or less, including passing hot inert gas over the particles for a time period sufficient to reduce the residual acetaldehyde to the desired level. Preferably, the acetaldehyde devolatization temperature should not exceed 165° C., or more preferably, not exceed 160° C., or even more preferably, not exceed 150° C. The sample is then packed in a preheated Tinius Olsen extrusion plastometer using a steel rod. The orifice die is calibrated according to ASTM D 1238. A small amount of material is purged out the bottom, which is then plugged. The piston rod assembly is put in the top of the barrel. A 225 g weight may be placed on top of the piston rod to hold the rod down inside of the barrel. The polymer is held at 295° C. for 5 min. The orifice plug is then removed from the bottom of the barrel. Via a large weight and operator pressure, the extrudate is pushed out of the barrel into an ice water bath. The extrudate is patted dry, sealed in a bag and placed in a freezer until the ASTM # F2013-00 test is performed.

Alternatively, a CEAST Model 7027 Modular Melt Flow instrument is used. An AA generation program is initiated that will maintain a temperature of 295° C. and will extrude the melted PET material in 5 minutes at a constant flow rate as defined in the firmware of the instrument. As the extrudate is pushed out of the barrel and into an ice water bath, the sample is collected, patted dry, sealed in a bag and placed in a freezer until the ASTM # F2013-00 test is performed.

Acetaldehyde can be generated in polyester resins with the Ceast Model 7027 Modular Melt Flow or any similar extrusion plastometer instrument; however, the Ceast 7027 instrument is preferred because the automated functions of this instrument reduce test variability by maintaining consistent contact times for the polymer inside the extrusion barrel. This particular model of instrument incorporates automated packing of the resin at the start of the test procedure. The instrument is equipped with a motorized platform that will push the material out of the barrel until the piston is at a specified height above the bottom of the barrel. The platform will then hold the piston rod in place, allowing the resin to heat up and generate acetaldehyde. At the end of the specified hold time, the platform extrudes the remainder of the resin out of the barrel while traveling at a constant speed. These steps eliminate the possibility of variability in results from packing the material through the final extrusion step. Variability in loading the polymer is reduced with the design of the barrel, but loading of the polymer is not automated.

Acetaldehyde can be generated in the above manner over a temperature range of 265° C. to 305° C. The most consistent results are obtained between 275° C. and 295° C. The length of time the resin is held inside the barrel shows good results when between 2 and 15 minutes. The range of 5 to 10 minutes shows the best repeatability and distinction between materials. For the AA generation numbers stated for this invention, 295° C. and 5 minutes were used.

Use of this method of acetaldehyde generation and testing allows for screening of polyester resins for acetaldehyde generation without needing large amounts of material for evaluations such as molding of bottle preforms. As little as 10 grams of material may be used in this process, making it ideal for testing laboratory samples.

In the invention, it is now possible to provide a feed of polyester polymer particles made without solid state polymerization to a subsequent melt processing step (e.g. extrusion/injection molding) having both low residual acetaldehyde and a low acetaldehyde generation rate. Advantageously, the melt phase production of the polyester particles no longer has to be controlled nor restricted to the low production temperatures to produce polyester polymer particles having a low level of residual acetaldehyde (<10 ppm). Instead, a polyester polymer particle having a low level of residual acetaldehyde and a low acetaldehyde generation can now be obtained from a melt phase production of the polyester polymer with an acceptable throughput or production rate. By this method, a robust melt-phase production process with wide processing windows is feasible in which the addition of an acetaldehyde scavenger is not necessary nor desirable, which allows for the use of an aluminum/alkali metal or alkaline earth catalyst composition, and permits the advancement of the polyester polymer to a high It.V. By deactivating the aluminum/alkali or alkaline earth metal catalyst such that the conversion of acetaldehyde precursors does not occur as readily in the subsequent transfer piping after the vacuum has been released in the melt-phase-only manufacturing process and during subsequent melt processing, particles fit for making preforms can be provided to an injection molding machine once residual acetaldehyde has been lowered, as by way of stripping. In an embodiment, polyester polymer particles having a very low level of residual acetaldehyde (<3 ppm) are obtained by the post-melt-phase-polycondensation elimination of residual acetaldehyde. Thus, once particles are obtained from the melt phase production process, the residual acetaldehyde present in the particles is further reduced by conventional means or by a preferred means as described below. The amount of residual acetaldehyde in the solid particles is reduced by techniques other that solid state polymerization processes which are expensive and result in significant molecular weight advancement. Desirably, the residual acetaldehyde in the solid particles are reduced in the solid state to a level of 3 ppm or less without increasing the It.V. of the particles by more than 0.03 dL/g. In this more preferred embodiment, the particles are not remelted and devolatized in order to reduce their level of acetaldehyde, nor are the particles subjected to solid state polymerization techniques which result in advancing the It.V. of the particles more than 0.03 dL/g. More preferably, the level of residual acetaldehyde in the solid particles is reduced to a level of 2 ppm or less.

Any conventional technique for reducing the acetaldehyde in the particles is suitable other than solid state polymerization techniques and preferably other than by remelting/devolatization. For example, the vacuum procedure described previously as part of the sample preparation for the AA generation rate test would be suitable, once it was modified for pellets; however, on a larger scale, a vessel would replace the oven.

Another technique to reduce the level of acetaldehyde in solid particles without advancing their molecular weight beyond 0.03 dL/g is referred to herein as acetaldehyde stripping. By this method, the residual acetaldehyde of the particles is reduced by introducing the particles into a vessel to form a bed of particles within the vessel, and contacting the bed with a stream of gas introduced at a gas flow rate not exceeding 0.15 SCFM per pound of particles per hour, and withdrawing finished particles from the vessel having a reduced amount of residual acetaldehyde.

In a gas stripping operation, a gas such as air or an inert gas such as nitrogen is contacted with the polyester polymer particles either co-current or countercurrent, preferably countercurrent to the flow of the particles, in a vessel in a continuous or batchwise process, preferably a continuous process. The temperature of the gas introduced into the AA stripping vessel is not particularly limited, and can range from ambient to 180° C., but preferably from ambient to 70° C., or up to about 50° C., or up to about 40° C., and more preferably about ambient. The temperature of the gas exiting the stripping vessel will approximate the temperature of the pellets introduced into the vessel. Thus, if particles are introduced at 100° C., the exit temperature of the gas will be about 100° C.+/−20° C. The temperature of the gas exiting the vessel should not exceed a temperature at which the molecular weight of the particles is advanced in the solid state by more than 0.03 dL/g. The residence time of the particles depends on the starting level of residual AA, the gas temperature and particle mass/gas ratio, but in general, the residence time ranges from 0.5 hour to 20 hours. The gas composition is not particularly limited, and includes nitrogen, carbon dioxide, or ambient air. The gas does not need to be dried, since the function of the gas is not to dry the pellets but to strip residual AA from the pellets. If desired, however, the gas may be dried.

While gas stripping of acetaldehyde may also occur in the dryer feeding the extruder for making an article, it is preferred to feed the dryer with polymer particles already having 3 ppm or less of residual acetaldehyde in order to reduce the gas flow used in the dryer and/or improve the quality of the articles made from the extruder. Moreover, in an AA stripping process, dry gas is not required to strip the AA from the particles, whereas in a drying process, a stream of dried air is circulated through the particles primarily to reduce the moisture on or in the particles with the secondary advantage of also removing AA. Thus, in an AA stripping process, ambient air can be and preferably is used as the stripping medium. Since this invention lowers residual AA levels dramatically, particularly when optimal P:M MR, low polycondensation temperatures, low aluminum levels and low M:Al MR are used, it may be possible to make particles having low residual AA, such as 10 ppm or less or 5 ppm or less, and to forgo a separate AA stripping step or solid state polymerization step. The residual AA from such products can be lowered to 2 ppm or less in the dryer feeding the extruder for making an article. Dryer temperature, gas flow, desiccant type and residence time will impact the efficacy of AA stripping in the dryer feeding the extruder for making an article.

In an embodiment, particles having an It.V. of at least 0.68 dL/g and a degree of crystallinity within a range of 20% to 55% and have a residual acetaldehyde level of 3 ppm or more, or 10 ppm or more, or 20 ppm or more, or 30 ppm or more, or 40 ppm or more are fed to a vessel, preferably through the upper end of a vessel, as hot particles (e.g. 100° C. to 180° C.) to increase the efficiency of AA stripping and form a bed of pellets flowing by gravity toward the bottom end of the vessel while a countercurrent flow of gas such as ambient air is circulated through the bed, said gas introduced into the vessel at a temperature ranging from ambient conditions to 70° C., or from ambient to 40° C., to thereby reduce the level of residual AA on the particles introduced into the vessel. The particles are withdrawn from the vessel within about 0.5 to 20 hours of their introduction into the countercurrent stream of gas. While the vessel can be pressurized, it is preferably not pressurized except by the pressure created from the gas flow. The vessel is desirably operated at about 0-5 psig, or ambient pressure.

The level of residual acetaldehyde present in and/or on the stripped particles is preferably 5 ppm or less, or 3 ppm or less, or 2 ppm or less, or 1.5 ppm or less. The level of residual acetaldehyde present on the particles fed to the stripping vessel after being obtained from the melt phase polycondensation and deactivation/stabilization of this invention is generally 3 ppm or more, or 5 ppm or more, or 10 ppm or more or 20 ppm or more, or 30 ppm or more, or 40 ppm or more. In another embodiment, the difference in the residual acetaldehyde levels of the pellets entering the stripping vessel and those exiting the vessel is at least 2 ppm, or at least 4 ppm, or at least 7 ppm, or at least 10 ppm or 20 ppm or more, or 30 ppm or more.

The gas can be introduced into the vessel by any conventional means, such as by a blower, fans, pumps, and the like. The gas may flow co-current to or countercurrent to or across the flow of particles through the vessel. The preferred flow of gas through the bed of particles is countercurrent to the particle flow through the bed. The gas can be introduced at any desired point on the vessel effective to lower the level of acetaldehyde in the particles exiting the vessel as compared to those fed to the vessel. Preferably, the gas introduction point is to the lower half of the bed height in the vessel, and more preferably to the lower ¼ of the bed height. The gas flows through at least a portion of the particle bed, preferably through at least 50 volume % of the bed, more preferably through at least 75% of the particle bed volume. Any gas is suitable for use in the invention, such as air, carbon dioxide, and nitrogen. Some gases are more preferred than others due to being readily available and having low cost. For example, the use of air rather than nitrogen would lead to significant operating cost improvements. It was believed that the use of nitrogen gas was required in operations which pass a hot flow of gas through a bed of particles at temperatures above 180° C., such as in a preheater or solid-stater, because nitrogen is inert to the oxidative reactions, resulting in pellet discoloration, which would otherwise occur between many polyester polymers and the oxygen in ambient air. However, by keeping the process temperature low such that the gas exiting the vessel does not exceed 190° C., particle discoloration is minimized. In one embodiment, the gas contains less than 90 volume % nitrogen, or less than 85 volume % nitrogen, or less than 80 volume % nitrogen. In another embodiment, the gas contains oxygen in an amount of 17.5 vol % or more. The use of air at ambient composition (the composition of the air at the plant site on which the vessel is located), or air which is not separated or purified, is preferred. Desirably, ambient air is fed through the gas inlet. While the air can be dried if desired, it is not necessary to dry the air since the object is to remove acetaldehyde from the particles.

Any vessel for containing particles and allowing a feed of gas and particles into and out of the vessel is suitable. For example, there is provided a vessel having at least an inlet for gas, and inlet for the polyester polymer particles, an outlet for the gas, and an outlet for the finished particles. The vessel is preferably insulated to retain heat. The gas inlet and the finished particle outlet are desirably located below the gas outlet and the particle inlet, preferably with the gas outlet and particle inlet being toward the top of the vessel and the gas inlet and finished particle outlet being toward the bottom of the vessel. The gas is desirably introduced into the bed within the vessel at about ½ or more desirably at about the lower ¼ of the bed height within the vessel. The particles are preferably introduced at the top of the vessel, and move by gravity to the bottom of the vessel, while the gas preferably flows countercurrent to the direction of the particle flow. The particles accumulate within the vessel to form a bed of particles, and the particles slowly descend down the length of the vessel by gravity to the finished particle outlet at the bottom of the vessel. The bed height is not limited, but is preferably at a substantially constant height in a continuous process and is at least 75% of the height of the vessel containing the particles within the stripping zone. The vessel preferably has an aspect ratio L/D of at least 2, or at least 4, or at least 6. While the process can be conducted in a batch or semi batch mode in which as the particles would not flow and the stream of gas can be passed through the bed of particles in any direction, the process is preferably continuous in which a stream of particles continuously flows from the particle inlet to the finished particle outlet as the particles are fed to the vessel.

A suitable gas flow rate introduced into the vessel and passing through at least a portion of the particle bed is one which is sufficient to lower the amount of residual acetaldehyde on the particles exiting the vessel as compared to those introduced into the vessel. For example, for every one (1) pound of particles charged to the vessel per hour, suitable gas flow rates introduced into the vessel are at least 0.0001 standard cubic feet per minute (SCFM), or at least 0.001 SCFM, or at least 0.005 SCFM. High flow rates are also suitable, but not necessary, and the gas flow rate should be kept sufficiently low to avoid unnecessary energy consumption by the gas pumps, fans, or blowers. Moreover, it is not desired to unduly cool the particles or dry the particles because the achievement of either or both of these objectives typically requires the use of high gas flow rates. The gas flow rate is preferably not any higher than 0.15 SCFM, or not higher than 0.10 SCFM, or not higher than 0.05 SCFM, or even not higher than 0.01 SCFM for every one (1) pound of charged particles per hour.

Optimal process conditions to minimize oxidation reactions, discoloration, maintain the It.V. of the particles, and remove acetaldehyde while keeping the production costs low are to introduce the gas at ambient temperature, to feed particles within a range of 150° C. to 170° C. into a vertical cylindrical vessel at an air flow rate ranging from 0.002 SCFM to 0.009 SCFM per 1 lb/hr of PET. The size of the vessel is such that the residence time of the pellets averages about 0.5 to 20 hours, or more preferably 3 to 15 hours.

PET samples catalyzed by the levels of Li/Al studied desirably have lower peak temperatures for crystallization upon cooling from the melt ($T_{cc}$) than the Sb controls. As $T_{cc}$ decreases, this indicates that the crystallization rate from the melt is slower. Slower crystallization rates from the melt can result in less haze in molded articles, like preforms. Slower crystallization rates from the melt enable the use of lower extruder barrel temperatures, which in turn require shorter cooling times and result in shorter injection molding cycle times. Converters will value the productivity increases associated with reduced injection molding cycle times.

Per Table 4 in Example 2, at a fixed Li:Al MR of 4, PET samples catalyzed by the higher Li and Al levels studied at the lower polymerization temperatures studied have lower peak temperatures for crystallization upon heating from the glass ($T_{ch2}$) than the Sb controls. The sample with the lowest $T_{ch2}$ also has a large amount of phosphorus added late.

Another designed experiment (ranges given in parentheses) varied aluminum level (10-40 ppm), Li:Al MR (1-5), temperature (275-285° C.), and P:M MR (0-1), where the phosphorus source is phosphoric acid. The $T_{cc}$ ranged from 150 to 161° C., with an average of 156° C. At a Li:Al MR of 5, the $T_{ch2}$ decreases much faster with increasing Al levels from 10 to 40 ppm than at a Li:Al MR of 1.

As $T_{ch2}$ decreases, this indicates that the crystallization rate from the glass is faster. Faster crystallization from the glass is desirable in thermoformable tray applications and for resin producers who crystallize amorphous pellets optionally prior to polymerizing in the solid state.

The particles of the invention are directly or indirectly packaged as a bulk into shipping containers, which are then shipped to customers or distributors. It is preferred to subject the crystallized particles to any process embodiment described herein without solid state polymerizing the particles at any point prior to packaging the particles into shipping containers. With the exception of solid state polymerization, the particles may be subjected to numerous additional processing steps in-between any of the expressed steps.

Shipping containers are containers used for shipping over land, sea or by air. Examples include railcars, semi-tractor trailer containers, Gaylord boxes, ship hulls, or any other container which is used to transport finished polyester particles to a customer. Customers are typically converter entities who convert the particles into preforms or other molded articles.

The shipping containers contain a bulk of polyester polymer particles. A bulk occupies a volume of at least 3 cubic meters. In preferred embodiments, the bulk in the shipping container occupies a volume of at least 5 cubic meters, or at least 10 cubic meters.

In one embodiment, there is provided finished polyester polymer particles having an average It.V. of at least 0.68 dL/g, or 0.70 dL/g, or 0.72 dL/g, or 0.74 dL/g, or 0.76 dL/g, or 0.80 dL/g, obtained in a melt phase polymerization and a residual acetaldehyde level of 10 ppm or less, or of 5 ppm or less; wherein said particles comprising an aluminum level in an amount of at least 3 ppm, or at least 5 ppm, or at least 10 ppm, or at least 15 ppm, or at least 20 ppm, based on the weight of the polymers. Preferably, the polyester particles in the shipping container also have a degree of crystallinity of at least 20%, preferably at least 30%; and the particles also contain a nonzero level of an alkaline earth metal or alkali metal, along with a nonzero level of phosphorus. More preferably, the AA generation rate of such particles is less than 20 ppm, or less than 18 ppm, or less than 16 ppm, or less than 14 ppm, or less than 12 ppm, or less than 10 ppm, and the particles have an L* brightness of at least 55, or at least 60, or at least 65, at least 70, or at least 73, or at least 76, and lack AA scavengers. The particles are desirably contained in a shipping container. Most preferably, the particles have not been solid state polymerized. By "finished" particles, it is meant particles that have been subjected by the particle manufacturer to all the processing conditions needed to produce a particle ready for feeding into dryer hoppers associated with a molding machine or directly to a molding machine used for converting particles into articles, without any further processing steps performed by the particle manufacturer.

Articles can be formed from the melt phase products by any conventional techniques known to those of skill. For example, melt phase products, optionally solid state polymerized, which are crystallized to a degree of crystallization of at least 20%, are fed to a machine for melt extruding and injection molding the melt into shapes such as preforms suitable for stretch blow molding into beverage or food containers, or a machine for injection molding, or a machine for merely extruding into other forms such as sheet. Suitable processes for forming the articles are known and include extrusion, extrusion blow molding, melt casting, injection molding, a melt to mold process, stretch blow molding (SBM), thermoforming, and the like.

Examples of the kinds of shaped articles which can be formed from the melt phase products and the polyester polymer composition of the invention include sheet; film; packaging and containers such as preforms, bottles, jars, and trays; rods; tubes; lids; and filaments and fibers. Beverage bottles made from polyethylene terephthalate suitable for holding water or carbonated beverages, and heat-set beverage bottles suitable for holding beverages which are hot filled into the bottles are examples of the types of bottles which are made from the crystallized pellet of the invention. Examples of trays are those which are dual ovenable and other CPET trays.

Suitable methods for making articles comprise:
(i) introducing solid polyester polymer particles having:
  aluminum residues;
  alkaline earth metal residues or alkali metal atoms or alkali compound residues
  phosphorus residues;
  a degree of crystallinity of at least 20%; and
  a residual acetaldehyde level of 10 ppm or less,
  and lacking organic acetaldehyde scavengers into a melt processing zone and melting the particles to form a molten polyester polymer composition; and
(ii) forming an article comprising a sheet, strand, fiber, or a molded part from the molten polymer composition.

In this embodiment, the catalyzed polyester polymer particles produced in the melt phase are made to a high It.V. and are provided as a suitable feed to the melt processing zone by having both low residual acetaldehyde and a low acetaldehyde generation rate without the presence of acetaldehyde scavengers in the particles fed to the melt processing zone. In this embodiment, the residual acetaldehyde is less than 10 ppm or can be lowered to less than 10 ppm acetaldehyde by gas stripping the particles produced from the melt phase production process. Further, the catalyst deactivator added late in the melt phase at least partially inhibits the catalyst residues in the polymer from catalyzing the conversion of acetaldehyde precursors to acetaldehyde. In this embodiment, the particles fed to the melt processing zone are preferably not solid-state polymerized. The polyester particles made by melt-phase-only synthesis have a small surface to center molecular weight gradient and undergo less It.V. loss during melt processing than conventional polyesters. For example, bottles and/or preforms, and in particular beverage bottles such as carbonated soft drink or water bottles are made from the particles of the invention and the It.V. difference between the It.V. of the particles and the It.V of the preforms and/or bottles is not more than 0.04 dL/g, preferably not more than 0.03 dL/g, and most preferably not more than 0.02 dL/g.

In another embodiment, the molded article preferably lacks an organic acetaldehyde scavenger. Preferably, ingredients added to the solid polyester particles at the melt processing step do not include organic acetaldehyde scavengers.

The amount of AA in and/or on the molded article can be measured by ASTM F2013-00. The level of AA in a ground 20 oz. preform is 9 ppm or less, or 7 ppm or less, or 5 ppm or less, or 4 ppm or less as measured on a preform molded with a barrel temperature of 285° C. and a residence time of approximately 2 minutes. Performs can be made from the particles of this invention at a variety of injection molding barrel temperatures and residence times. Specific injection molding conditions are given here only to provide context for the numerical values specified for preform AA and not to limit the invention to certain injection molding conditions. Alternatively, preforms made from the particles of this invention have a reduction in perform AA of at least 20%, or at least 30% or more, or at least 40% or more, or at least 50% or more, or at least 60% or more, or at least 70% or more relative to preforms made from the composition without the addition of a catalyst stabilizer and/or deactivator. The level of residual acetaldehyde is measured on the article, such as on a preform. In this case, a second heat history (melt manufacturing is counted as the first) need not be imparted to the preform sample since the particles were melted in the injection molding machine. The amount of residual acetaldehyde present in the particles after drying but prior to injection molding should be subtracted from the residual acetaldehyde value obtained in the perform.

At the melt processing extruder, other components can be added to the extruder to enhance the performance properties of the pellets. These components may be added neat to the bulk polyester pellets or in a liquid carrier or can be added to the bulk polyester pellets as a solid polyester concentrate containing at least about 0.5 wt. % of the component in the polyester polymer let down into the bulk polyester. The types of suitable components include crystallization aids, impact modifiers, surface lubricants, denesting agents, antioxidants, ultraviolet light absorbing agents, colorants, nucleating agents, reheat rate enhancing aids, sticky bottle additives such as talc, and fillers and the like. All of these additives and many others and their uses are well known in the art and do not require extensive discussion.

As described above, the catalyst deactivators are added late in the course of polycondensation or thereafter but before solidification. In another embodiment, while the bulk of a catalyst deactivator is added late in the course of polycondensation or thereafter but before solidification, a portion may be added earlier in the course of polycondensation. The impact on production rate of any early addition of a catalyst deactivator needs to be considered; therefore, only small portions, if any, should be added early. In addition to the embodiment where the total amount of deactivator is added during the melt phase process for making the polyester polymer, in another embodiment, a portion of the total amount of deactivator is added to the polyester polymer in at least two stages, once in the melt phase process for making the polyester polymer and again at any point after the polyester polymer is solidified and before the article is formed from the polyester polymer, such as during melt processing the polyester polymer to make an article as conventionally done in an extruder or injection molding machine for making the article. In yet a further embodiment, the total amount of the deactivator is added after solidification and before making the article.

Partial or total addition of the phosphorus compound after solidification from a melt phase manufacturing process may be accomplished by either melt compounding the catalyst deactivator with the polyester polymer particles to form a solid concentrate of polyester polymer particles containing randomly dispersed catalyst deactivator compounds, after which the concentrate is fed to the melt processing zone for making an article along with a feed stream of polyester particles; or a stream of catalyst deactivator compounds can be added directly as a neat stream, or in a slurry or dispersion made with a liquid carrier, together with a stream of the polyester polymer particles to the melt processing zone to make the articles. Thus, there is provided an embodiment in which amorphous polyester polymers are produced from a melt phase process without a catalyst deactivator added late, followed by blending the catalyst deactivator with the polyester polymer by a compounding extrusion or in the extruder portion of the injection molding process such as that used to melt blend dry, liquid, or molten ingredients into a stream of polyester polymer in an extruder, or that used to make a molded article by an extrusion in the injection molding process, or blending in any other mixing device.

In this embodiment, the mixing device where the catalyst deactivator is introduced may be part of the injection molding process, or it may be a separate step prior to injection molding. The catalyst deactivator may be introduced neat, in a liquid carrier or via a polymer concentrate. Introduction neat or in a liquid carrier is more preferred since reaction with the catalyst in the polymer carrier may lower effectiveness. If the catalyst deactivator is a liquid and is added neat, a mixer at ambient conditions could be used to coat the pellets with the liquid additive prior to entry into an extruder. If the polymer concentrate route is used, the concentrate pellets could be dry blended at ambient conditions with the made exclusively in the melt-phase pellets to make a 'salt and pepper' type blend. These same comments and approaches apply to melt blending the catalyst deactivator with solid-stated pellets.

This embodiment is particularly useful if the pellets are solid state polymerized. Incorporating the catalyst deactivator in the melt phase may in some instances lower the solid-stating rate. If one desires to solid state polymerize the polyester pellets, it is advantageous to add the catalyst deactivator after the pellets have undergone a solid state polymerization process.

This invention can be further illustrated by the additional examples of embodiments thereof, although it will be understood that these examples are included merely for purposes of illustration and are not intended to limit the scope of the invention.

EXAMPLES

All of the high IV polyesters in the examples were made exclusively in the melt phase, i.e., the molecular weight of the polyester melt-phase products as indicated by their IhV or ItV were not increased in the solid state.

Commercial polyester available from Eastman Chemical Company as CB-12 is submitted every time the AA generation test is done on experimental samples. The AA level in preforms made from CB-12, a polymer made under typical manufacturing conditions and solid-state polymerized, is considered acceptable for carbonated soft drink applications. The AA generation results on this commercial polyester are considered as a benchmark: AA generation rates less than or equal to the AA generation value of the commercial CB-12 pellets predict an acceptable level of preform AA for carbonated soft drink applications.

Some water applications require much lower preform AA levels than CB-12 delivers. Under typical molding conditions, CB-12 preforms contain 9-11 ppm AA, depending on the extruder size, etc. For some water bottle applications, there is a specification of 3 ppm AA in the perform. This is about a 70% reduction in preform AA relative to CB-12.

The percent reduction in preform AA is calculated by subtracting the water target from the CB-12 average value, dividing by the CB-12 average value and multiplying by 100. Percent reductions in other responses are mentioned throughout the examples. The point of comparison will be identified, such as the base case (no phosphorus) or the Sb control, and its response will be used in place of the CB-12 average value in the preceding description of a % reduction calculation. When multiple base case runs or Sb controls exist, the average of the response for the multiple runs is used in the calculation. A Li/Al experimental run will be identified, and its response is used in place of the water target in the preceding description of a % reduction calculation. When replicate Li/Al experimental runs exist, the average of the response for the replicate runs is used in the calculation.

Color values are measured on polyester polymers ground to a powder passing a 3 mm screen. Color measurements were performed in reflectance (specular included) using a Hunter-Lab UltraScan XE (Hunter Associates Laboratory, Inc., Reston Va.), which employs diffuse/8° (illumination/view angle) sphere optical geometry. Results were reported using the CIELAB scale with the D65 illuminant and 10° observer. The spectrophotometer is standardized regularly and UV control was employed and maintained in calibration following the HunterLab recommendations. An optional glass port plate is installed at the reflectance port to minimize contamination of the sphere. Powders are placed in an optical glass cell. Color is measured in a cell, a 33-mm path length optical glass cell, available from HunterLab. The powders are allowed to settle by vibrating the sample for 20 seconds using a laboratory Mini-Vortexer (VWR International, West Chester, Pa.). The glass cell is maintained flush against the reflectance port and covered with a black opaque cover. A single cell packing is evaluated and the cell is removed and replaced for a total of three measurements for each sample. The reported value should be the average of the triplicates.

Three clear, molded discs were prepared from the samples using a Daca MicroCompounder/MicroInjector. The molded discs had a thickness of 67-mil and a diameter of 2.9 cm. The approximate chip molding conditions were as follows: 278° C. screw temperature, 283° C. barrel temperature, 14° C. mold temperature, 120 psi injection pressure, and 1.4 scfh nitrogen flow to the feed throat. Commercial polyester available from Eastman Chemical Company as CM-01 is pressed into chips every time chips are molded from experimental samples. CM-01 is a polymer made under typical manufacturing conditions and solid-state polymerized.

Color measurement (L*, a*, b* and haze) on the discs was performed using a HunterLab UltraScan XE (Hunter Associates Laboratory, Inc., Reston Va.), which employs diffuse/8° (illumination/view angle) sphere optical geometry. The color scale employed was the CIE LAB scale with D65 illuminant and 10° observer specified. Three chips were stacked together to give a sample of approximately 200 mil (0.51 cm) thickness. The three chips were stacked together and placed in the sample holder inside the instrument such that the area of largest surface area was placed perpendicular to the light source. The color measurements were made in the total transmission (TTRAN) mode, in which both light transmitted directly through the sample and light that is diffusely scattered is measured. Color in transmission at any thickness can be recalculated according to the following:

$$T_h = T_o 10^{-\beta h}$$

$$\beta = \frac{\log_{10}(T_o/T_d)}{d}$$

where
$T_h$=transmittance at target thickness
$T_o$=transmittance without absorption
$\beta$=Absorption coefficient
$T_d$=transmittance measured for sample
h=target thickness
d=thickness of sample Haze is defined as the scattering of light within or at the surface of a nearly clear specimen, which is responsible for cloudy appearance seen in transmission. A transmission haze measurement is a ratio of the diffuse light to the total light transmitted by a specimen, and is calculated according to the following formula:

$$\text{Haze} = \left(\frac{Y_{Diffuse transmission}}{Y_{Total transmission}}\right) \times 100$$

Haze was measured on three chips using a BYK-Gardner HazeGuard Plus according to ASTM D1003, Method A.

The reheat rate of each of the molded discs was determined as follows. The disc was placed onto a support which was in contact with the sample along its edges only. An actuator then automatically moved the disc beneath a pyrometer and measured the initial temperature ($T_i$). The disc was then moved to a fixed distance below a lamp housing equipped with a bulb (GE DYH projection bulb, 250 W, 120 V) operating at 60 V. The sample was exposed to a radiant light for 20 seconds. The color temperature of the lamp was approximately 2,200° C. After heating, the disc was automatically returned to the pyrometer where the surface temperature ($T_f$) of the center area of the side which faced the lamp (front side) was recorded two seconds after the lamp was turned off. A 90-second cooling cycle was used between consecutive tests, during which a fan cooled the lamp housing prior to loading the next sample. The RIT is calculated by subtracting the $T_f$ of the control without reheat additive from the $T_f$ of the sample containing the reheat additive.

PET samples containing antimony and phosphorus were tested for metals by X-ray fluorescence spectroscopy (XRF). PET samples containing aluminum, lithium and/or phosphorus were tested for metals by inductively coupled plasma optical emission spectroscopy (ICP-OES). For the samples in the Examples Section, a wet ash method for ICP-OES involved digestion of PET in sulfuric and nitric acid on a hot plate prior to analysis of an aqueous sample. There is more background contamination possible in the ICP measurements for aluminum in PET for than for lithium in PET. For Example 2, Al and Li levels are measured in duplicate in quartz glassware to minimize background Al contamination. A single test in standard glassware is reported for the other examples. A procedure follows.

Sample Preparation:

Weigh approx. 1.0 g of polymer into a 100 mL quartz beaker. Add 5 mL concentrated $H_2SO_4$. Cover with a watch glass. Prepare a method blank in the same manner except exclude sample. Place beakers on hot plate and heat on low setting (~100° C.) until charring begins. At this point begin to add conc. $HNO_3$ drop-wise, gradually increasing heat, until solution becomes clear. Reflux for approximately 30 min. on highest heat setting (approx. 400° C.). Cool to room temperature. Quantitatively transfer contents of beaker into a 100 mL volumetric flask. Add Sc internal standard at the 1 ppm level and dilute to the mark with 18 Mohm water.

Analysis using inductively coupled plasma-optical emission spectroscopy (ICP-OES):

Instrument Configuration:

| | |
|---|---|
| Spray Chamber: | Quartz Glass Cyclonic—unbaffled |
| Nebulizer: | Quartz Glass Concentric |
| Injector: | 2 mm ID Quartz |
| Plasma Power: | 1450 Watts |
| Plasma Ar Flow: | 18 L/min |
| Aux Flow: | 0.2 L/min |
| Neb Flow: | 0.65 L/min |
| Sample Uptake: | 1.56 mL/min |

Method Parameters:

| Analytical Lines: | |
|---|---|
| Al—396.153 nm | Axial plasma view |
| Li—670.784 nm | Radial plasma view |
| Internal Standard Line: | |
| Sc—361.383 nm | Axial plasma view |

Calibrate the instrument—2 point calibration using a calibration blank and NIST traceable standards prepared at the 1 ppm level.

Aspirate the samples and analyze using 3 replicates. Report the average of the 3 replicates.

The It.V. values described throughout this description are set forth in dL/g units as calculated from the inherent viscosity measured at 25° C. in 60% phenol and 40% 1,1,2,2-tetrachloroethane by weight. Polymer samples are dissolved in the solvent at a concentration of 0.25 g/50 mL. For samples in the Examples section, the viscosity of the polymer solutions is determined using a Rheotek Glass Capillary viscometer. A description of the operating principle of this viscometer can be found in ASTM D 4603. The inherent viscosity is calculated from the measured solution viscosity. The following equations describe such solution viscosity measurements and subsequent calculations to Ih.V. and from Ih.V. to It.V:

$$\eta_{inh} = [\ln(t_s/t_o)]/C$$

where
$\eta_{inh}$=Inherent viscosity at 25° C. at a polymer concentration of 0.5 g/100 mL of 60% phenol and 40% 1,1,2,2-tetrachloroethane by weight
ln=Natural logarithm
$t_s$=Sample flow time through a capillary tube $t_o$=Solvent-blank flow time through a capillary tube
C=Concentration of polymer in grams per 100 mL of solvent (0.50%)

The intrinsic viscosity is the limiting value at infinite dilution of the specific viscosity of a polymer. It is defined by the following equation:

$$\eta_{int} = \lim_{C \to 0} (\eta_{sp}/C) = \lim_{C \to 0} (\ln \eta_r)/C$$

where
$\eta_{int}$=Intrinsic viscosity
$\eta_r$=Relative viscosity=$t_s/t_o$
$\eta_{sp}$=Specific viscosity=$\eta_r-1$ Instrument calibration involves triplicate testing of a standard reference material and then applying appropriate mathematical equations to produce the "accepted" Ih.V. values. The three values used for calibration shall be within a range of 0.010; if not, correct problems and repeat testing of standard until three consecutive results within this range are obtained.

Calibration Factor=Accepted Ih.V. of Reference Material/Average of Triplicate Determinations The intrinsic viscosity (It.V. or $\eta_{int}$) may be estimated using the Billmeyer equation as follows:

$$\eta_{int}=0.5[e^{0.5 \times Corrected\ IhV.}-1]+(0.75 \times Corrected\ Ih.V.)$$

The reference for estimating intrinsic viscosity (Billmeyer relationship) is *J. Polymer Sci.*, 4, pp. 83-86 (1949).

Alternatively, the viscosity of the polymer solutions is determined using a Viscotek Modified Differential Viscometer. A description of the operating principle of the differential pressure viscometers can be found in ASTM D 5225. The uncorrected inherent viscosity ($\eta_{inh}$) of each sample is calculated from the Viscotek Model Y501 Relative Viscometer using the following equation:

$$\eta_{inh}=[\ln(P_2/KP_1)]/C$$

where
$P_2$=The pressure in capillary $P_2$
$P_1$=The pressure in capillary $P_1$
ln=Natural logarithm
K=Viscosity constant obtained from baseline reading
C=Concentration of polymer in grams per 100 mL of solvent The corrected Ih.V., based on calibration with standard reference materials, is calculated as follows:

Corrected Ih.V.=Calculated Ih.V.×Calibration Factor

Differential scanning calorimetry is performed using a Mettler-Toledo 821e with Nitrogen as a purge gas. The calorimeter is calibrated using Indium and Lead standards. A 10 milligram sample is scanned at a heating rate of 20° C./min from room temperature to 290° C. in a first heat, held at temperature for 2 minutes, removed from the instrument using the instrument autosampler to quench to room temperature, scanned a second time at 20° C./min to 290° C., held at temperature for 2 minutes, and then control-cooled at 20° C./min to room temperature. Instrument software is used to determine the summary thermal properties. The glass transition is identified as the midpoint of the step-change in heat-flow near 80° C. A baseline is calculated between approximately 110° C. and 280° C. The exothermic peak temperature (if present) is identified as the Tch, or temperature of crystallization upon heating, and the heat of crystallization is calculated from the integral of area on the exothermic side of the baseline. The melting temperature, Tm, is identified as the peak temperature on the endothermic side of the baseline, and heat of melting is calculated from the integral of area on the endothermic side of the baseline. The heat of fusion is identified as the difference between the heat of melting and the heat of crystallization. The temperature of crystallization upon cooling, Tcc, is identified as the peak exothermic event of the controlled cooling portion of the experiment.

The solution haze is measured by nephelometry. Sample (2.3 g) and 30 mL of solvent (30% hexafluoroisopropanol, 70% methylene chloride, by volume) are placed in a 8-dram vial. The organic portion of the polyester polymer sample is allowed to dissolve. The solution in the vial is then read directly in the Hach Ratio Turbidimeter. The value reported is in nephelometric turbidity units (ntu) and is an average of four readings. Four readings of the Gelex 0-20 NTU standard are taken every time samples are run.

The PET oligomer used as a starting material in all the examples has about 94 to 96.5% conversion by proton NMR. The IPA level is about 2.0 to 2.2 mole %. The DEG level is about 4.6-4.8 mole %.

The fit between the stirrer and the flask can impact the finisher time required during torque terminated runs. A paddle stirrer is selected to have a typical fit with the flask being used. Prior to the run, toothpaste is put in the flask, which is then fitted with a paddle stirrer, polymer head, lipped Teflon tube and hose. The flask is inverted as the stirrer is pushed up and turned by hand. The clear areas on both sides of the center are measured. The width of the clear areas should total between 1.7 and 2.7 cm. The flask is rinsed out with water and acetone prior to use. For polycondensation, the ground oligomer (103 g) is weighed into a half-liter, single-necked, round-bottomed flask selected per the preceding paragraph. The catalyst solution is added to the flask. The flask is fitted with a 316 L stainless steel paddle stirrer selected per the preceding paragraph and a glass polymer head fitted with lipped Teflon tube and hose. After attaching the polymer head to a side arm and a purge hose, two nitrogen purges to 0.5 torr are completed.

Polymer disks made in the lab cool from the outside (where the polymer meets the flask) to the inside (where the polymer meets the stirrer rod; the deepest part of disk is in the center where the stirrer rod is located). While polymer disks made in the lab are cooling, some AA generation may occur. In a production environment, molten strands or melt globules that become particles or pellets are much thinner and cool much more quickly than relatively large disks or are actively quenched. The % reduction in free AA is still of interest as the point of comparison and the experimental case have about the same cooling time.

Comparative Example 1

A 0.69 wt./wt. % Li solution is made in ethylene glycol from lithium acetate dihydrate. A 2.02 wt./wt. % Al solution is made in water from hydroxyaluminum diacetate, which contained 2.1% of boron from boric acid (stabilizer). A 0.85 wt./wt. % Sb solution is made from antimony triacetate in ethylene glycol. The same oligomer and procedure as described above are used to prepare the polymer of this example.

The polymerization reactor is operated under control of a CAMILE™ automation system, programmed to implement the following array.

| Stage | Time (min.) | Temp. °C. | Vacuum (torr) | Stir Speed (rpm) |
|---|---|---|---|---|
| 1 | 0.1 | 285 | 730 | 0 |
| 2 | 10 | 285 | 730 | 150* |
| 3 | 2 | 285 | 140* | 300* |

-continued

| Stage | Time (min.) | Temp. ° C. | Vacuum (torr) | Stir Speed (rpm) |
|---|---|---|---|---|
| 4 | 1 | 285 | 140 | 300 |
| 5 | 10 | 285 | 51* | 300 |
| 6 | 5 | 285 | 51 | 300 |
| 7 | 2 | 285 | 140* | 300 |
| 8 | 2 | 285 | 140 | 300 |
| 9 | 2 | 285 | 4.5* | 300 | converting the ICP data for lithium and aluminum levels into moles and then dividing the lithium moles by the aluminum moles. These calculated Li:Al MR are negatively impacted by the following two issues. First, there is more background contamination possible in the ICP measurements for aluminum in PET for than for lithium in PET. This is especially true for this example, where Al and Li levels are measured in by a single test in standard glassware. Secondly, there is a lot of variability when dividing two small numbers, that is, small changes in the numbers being divided make big changes in the Li:Al MR. Use of the targeted Li:Al MR is preferred.

TABLE 1

| Samples | Temp. (deg C.) | Finisher Time (min) | XRF Sb (ppm) | ICP Al ppm | ICP Li ppm | Li:Al MR | XRF P (ppm) | IhV (dL/g) | ItV (dL/g) |
|---|---|---|---|---|---|---|---|---|---|
| CB-12 | | | | | | | | | |
| 149 | 270 | 169.2 | | 35.8 | 19.6 | 2.1 | | 0.852 | 0.905 |
| 164 | 285 | 88.2 | | 29.2 | 19.2 | 2.6 | | 0.879 | 0.935 |
| 139 | 270 | 125.6 | | 54.5 | 43.2 | 3.1 | | 0.807 | 0.854 |
| 138 | 285 | 49.2 | | 50.6 | 43.7 | 3.4 | | 0.849 | 0.901 |
| 147 | 275 | 139.7 | 252 | | | | 19 | 0.814 | 0.862 |

| Samples | Temp. (deg C.) | ICP Al (ppm) | ICP Li (ppm) | L* | a* | b* | L* adj. | Free AA (ppm) | AA GEN 295/5 (ppm) | Solution Haze (ntu) |
|---|---|---|---|---|---|---|---|---|---|---|
| CB-12 | | | | | | | | 0.9 | 19.6 | |
| 149 | 270 | 35.8 | 19.6 | 85.2 | -2.2 | 7.9 | 78.0 | 13.9 | 41.7 | 6.85 |
| 164 | 285 | 29.2 | 19.2 | 85.8 | -2.0 | 8.4 | 78.3 | 27 | 24 | 6.45 |
| 139 | 270 | 54.5 | 43.2 | 86.3 | -2.2 | 8.5 | 78.6 | 13.3 | 43.9 | 33.75 |
| 138 | 285 | 50.6 | 43.7 | 85.3 | -2.7 | 11.1 | 75.3 | 29.9 | 39.6 | 22.25 |
| 147 | 275 | | | 82.8 | -1.8 | 1.6 | 80.8 | 16.4 | 34.4 | 29.5 |

-continued

| Stage | Time (min.) | Temp. ° C. | Vacuum (torr) | Stir Speed (rpm) |
|---|---|---|---|---|
| 10 | 20 | 285 | 4.5 | 300 |
| 11 | 10 | 285 | 0.8* | 30* |
| 12 | 500# | 285 | 0.8 | 30 |

*= ramp;
= torque termination

A molten bath of Belmont metal is raised to surround the flask, and the CAMILE™ array is implemented. The temperature listed in Table 1 is the one used in the array. For instance, if Table 1 indicates a temperature of 270° C., all of the 285° C. in the above array are replaced with 270° C. In this array, a "ramp" is defined as a linear change of vacuum, temperature, or stir speed during the specified stage time. For Sb controls, 1.03 wt./wt. % P solution of an oligomeric phosphate triester in 80 wt. % ethylene glycol and 20% n-BuOH is added during Stage 8. The stirring system is calibrated on torque between stages 4 and 5. The finisher stage (#12) is terminated when the stirrer torque target is met or exceeded on three separate occasions. The polymer is cooled for about 17 min., separated from the glass flask, cooled for 12 min. and placed immediately into liquid nitrogen. The polymers are ground cryogenically to pass a 3 mm screen. The residual or free AA sample is kept frozen until its measurement by headspace GC per ASTM # F2013-00.

The data are shown in Table 1. The catalyst targets in Samples 149 & 164 were about 23 ppm each Li and Al. The catalyst targets in Samples 139 & 138 were about 46 ppm each Li and Al. The lithium to aluminum mole ratio ("Li:Al MR") has a target of 4 for all the Li/Al runs in Table 1. The lithium to aluminum mole ratio ("Li:Al MR") is calculated by The adjusted L* color (L* adj.) indicates the impact of toning on the polyester color. The formula used subtracts 0.8 times b* from L* and adds 0.4 times a* to L*. The acetaldehyde generated upon melting at 295° C. for 5 min. is labeled as "AA GEN 295/5."

It can be seen from Table 3 that PET prepared with a lithium aluminum catalyst system is brighter (higher L* color) and more yellow (higher b* color) than the Sb control. The L* adj. for PET made with a Li/Al catalyst system is lower than that of Sb-catalyzed PET. In most cases, AA GEN 295/5 is higher than the Sb control. At the lower catalyst targets of ~23 ppm each, the Li/Al-catalyzed PET has less particulate haze than Sb-catalyzed PET.

Example 1

The Sb solution described in Comparative Example 1 are used here. For each type of catalyst system, catalyst level and temperature combination, the finisher time from the torque terminated run in Comparative Example 1 will be the finisher time (stage 12 time) used in this example. The same oligomer and procedure are used as described in the introduction to the Examples section. The lithium and aluminum solutions used are described in Comparative Example 1. The catalyst targets in Samples 159 & 166 were ~23 ppm each Li & Al. The catalyst targets in Samples 161 &-154 were ~46 ppm each Li & Al. The lithium to aluminum mole ratio ("Li:Al MR") has a target of 4 for all the Li/Al runs in Table 2. The phosphorus target is 0 or 120 ppm.

For Li/Al runs in Table 2 with a phosphorus target of 120 ppm, an oligomeric phosphate triester with about 9 weight/weight percent phosphorus is added neat in Stage 14 of the following array. For Sb controls, 1.03 wt./wt. % P solution of the same oligomeric phosphate triester in 80 wt. % ethylene glycol and 20% n-BuOH was added during Stage 8.

The polymerization reactor is operated under control of a CAMILE™ automation system, programmed to implement the following array. The temperature listed in the Table 2 is the one used in the array.

| Stage | Time (min.) | Temp. ° C. | Vacuum (torr) | Stir Speed (rpm) |
|---|---|---|---|---|
| 1 | 0.1 | 285 | 730 | 0 |
| 2 | 10 | 285 | 730 | 150* |
| 3 | 2 | 285 | 140* | 300* |
| 4 | 1 | 285 | 140 | 300 |
| 5 | 10 | 285 | 51* | 300 |
| 6 | 5 | 285 | 51 | 300 |
| 7 | 2 | 285 | 140* | 300 |
| 8 | 2 | 285 | 140 | 300 |
| 9 | 2 | 285 | 4.5* | 300 |
| 10 | 20 | 285 | 4.5 | 300 |
| 11 | 10 | 285 | 0.8* | 30* |
| 12 | various | 285 | 0.8 | 30 |
| 13 | 3 | 285 | 650* | 30 |
| 14 | 2 | 285 | 650 | 30 |
| 15 | 1 | 285 | 0.5* | 45* |
| 16 | 5 | 285 | 0.5 | 45 |

*= ramp

TABLE 2

| Samples | Temp. (deg C.) | Finisher Time (min) | XRF Sb (ppm) | ICP Al ppm | ICP Li ppm | Li:Al MR | ICP P (ppm) | XRF P (ppm) | IhV (dL/g) | ItV (dL/g) |
|---|---|---|---|---|---|---|---|---|---|---|
| CB-12 | | | | | | | | | | |
| 159 | 270 | 169 | | 23.5 | 21.2 | 3.5 | 127.6 | | 0.767 | 0.809 |
| 166 | 285 | 88 | | 29.2 | 19.3 | 2.6 | 0 | | 0.909 | 0.969 |
| 161 | 270 | 126 | | 47.6 | 42.5 | 3.5 | 0 | | 0.776 | 0.819 |
| 154 | 285 | 49 | | 49.1 | 42.1 | 3.3 | 130.5 | | 0.881 | 0.937 |
| 156 | 275 | 140 | 258 | | | | | 19 | 0.827 | 0.876 |

| Samples | Temp. (deg C.) | ICP Al (ppm) | ICP Li (ppm) | ICP P ppm | L* | a* | b* | L* adj. | Free AA (ppm) | AA GEN 295/5 (ppm) | Solution Haze (ntu) |
|---|---|---|---|---|---|---|---|---|---|---|---|
| CB-12 | | | | | | | | | 0.9 | 19.6 | |
| 159 | 270 | 23.5 | 21.2 | 127.6 | 86.8 | −1.6 | 6.4 | 81 | 3.3 | 10.3 | 6.0 |
| 166 | 285 | 29.2 | 19.3 | 0 | 84.3 | −2.2 | 8.2 | 76.9 | 27.5 | 26.3 | 9.1 |
| 161 | 270 | 47.6 | 42.5 | 0 | 85.8 | −2.0 | 8.0 | 78.6 | 11.1 | 31.5 | 37.5 |
| 154 | 285 | 49.1 | 42.1 | 130.5 | 82.9 | −2.5 | 9.6 | 74.3 | 7.3 | 10.9 | 10.2 |
| 156 | 275 | | | | 80.2 | −1.9 | 1.3 | 78.4 | 18.3 | 32.7 | 29.8 |

In Table 2, the Li/Al-catalyzed samples made at 270° C. have lower IV's than the samples made at 285° C. Different torque targets are selected for different temperatures, which affect viscosity; however, this is only part of the answer as the IhV for the 285° C. runs in Comparative Example 1 were only about 0.03 dL/g higher than the 270° C. runs in the same example.

The PET samples made with a lithium aluminum catalyst system with a phosphorus compound added late have much lower free AA and AA generated upon melting. Comparing PET runs with late addition of about 120 ppm P from a phosphorus compound to analogous, torque-terminated PET runs with none added (see Comparative Example 1), there is about a 76% reduction in the amount of free AA and about a 74% reduction in the amount of AA generated upon melting. These reductions are arrived at by comparing run Sample 149 in Table 1 to run Sample 159 in Table 2, and by comparing run Sample 138 in Table 1 to run Sample 154 in Table 2. As compared to Table 1 runs, the runs in Table 2 had 11 extra minutes at the end where the phosphorus compound was added and mixed in to the polymer melt (stages 13-16), of which 6 minutes were under vacuum.

Comparing the average of Li/Al/late P runs to the Sb control in Table 2, there is about a 71% reduction in the amount of free AA and about a 68% reduction in the amount of AA generated upon melting. Comparing the average of Li/Al/late P runs to CB-12 in Table 2, there is about a 46% reduction in the amount of AA generated upon melting. With late addition of a phosphorus compound to PET made with a Li/Al catalyst, it may be possible to get melt-phase only PET with AA generation rates low enough for use in the water bottle market or as a dual use resin.

The free AA level in CB-12 is very low because CB-12 has been solid-stated. The free AA of the pellets made by a melt phase process can be reduced by techniques described herein, such as AA stripping with warm air or a low flow of ambient air, prior to introduction into a subsequent melt processing zone for making articles.

It is of note that the Sb control is made at 275° C. Even when the PET with Li/Al/late P is made at 285° C., a much lower amount of AA is generated upon melting. The higher temperatures at which PET with Li/Al/late P can be made without a large negative impact on AA generation rates, along with the inherent higher melt-phase catalytic activity of some Li/Al combinations, open up the possibility of faster melt-phase polymerization rates than with Sb controls.

At the higher levels studied of lithium & aluminum catalysts, PET made with late addition of a phosphorus compound (Sample 154) has much lower particulate haze: about a 54% reduction relative to the no phosphorus added case in Table 1 (Sample 138) and about a 66% reduction relative to the Sb control in Table 2 (Sample 156).

Comparative Example 2

A 1.03 wt./wt. % Li solution is made from lithium acetate dihydrate in water. The Al solution is the same one described in Comparative Example 1. The oligomer and procedure used are described in the introduction to the Examples section. The array and antimony solution used are described in Comparative Example 1. The lithium to aluminum mole ratio ("Li:Al MR") has a target of 4 for all the Li/Al runs in Table 3. The catalyst targets are ~11.5 ppm each Li & Al, ~28.5 ppm each Li & Al or ~45.5 ppm each Li and Al.

TABLE 3

| Samples | Samples | Temp. (deg C.) | Finisher Time (min) | XRF Sb (ppm) | ICP Al ppm | ICP Li ppm | Li:Al MR | XRF P (ppm) | IhV (dL/g) | ItV (dL/g) |
|---|---|---|---|---|---|---|---|---|---|---|
| 54 | | 270 | 308.3 | | 15.5 | 16.8 | 4.2 | | 0.82 | 0.868 |
| 92 | | 285 | 157.2 | | 20.1 | 14.6 | 2.8 | | 0.846 | 0.898 |
| 48 | | 277.5 | 90.7 | | 34.8 | 36 | 4 | | 0.829 | 0.879 |
| 84 | | 270 | 151.7 | | 54.1 | 55.9 | 4 | | 0.82 | 0.868 |
| | 139 | 270 | 125.6 | | 54.5 | 43.2 | 3.1 | | 0.807 | 0.854 |
| 53 | | 285 | 43.2 | | 55.3 | 59.3 | 4.2 | | 0.805 | 0.852 |
| | 147 | 275 | 139.7 | 252 | | | . | 19 | 0.814 | 0.862 |

| Samples | Samples | Temp. (deg C.) | ICP Al (ppm) | ICP Li (ppm) | Li:Al MR | L* | a* | b* | L* adj. |
|---|---|---|---|---|---|---|---|---|---|
| 54 | | 270 | 15.5 | 16.8 | 4.2 | 87.2 | −1.8 | 7.2 | 80.8 |
| 92 | | 285 | 20.1 | 14.6 | 2.8 | 86.5 | −2.8 | 8.2 | 78.9 |
| 48 | | 277.5 | 34.8 | 36 | 4 | 85.3 | −2.1 | 8.3 | 77.8 |
| 84 | | 270 | 54.1 | 55.9 | 4 | 85.3 | −1.9 | 10 | 76.5 |
| | 139 | 270 | 54.5 | 43.2 | 3.1 | 86.3 | −2.2 | 8.5 | 78.6 |
| 53 | | 285 | 55.3 | 59.3 | 4.2 | 85.4 | −2.4 | 10.8 | 75.8 |
| | 147 | 275 | | | . | 82.8 | −1.8 | 1.6 | 80.8 |

Per Table 3, there are opportunities with a Li/Al catalyst to significantly shorten the finisher time relative to the Sb control. Given appropriate reactor designs, shorter finisher times translate into faster PET production rates. Li/Al-catalyzed PET is brighter and more yellow than Sb-catalyzed PET. Without the addition of late phosphorus, there are no Li/Al-catalyzed runs that are faster than Sb and have the same or higher L* adjusted.

Example 2

The same array and oligomeric phosphate triester are used as described in Example 1. For each type of catalyst system, catalyst level and temperature combination, the finisher time from the torque termination run in Comparative Example 2 will be the finisher time used in this example. The same lithium and aluminum solutions are used as described in Comparative Example 2 and Comparative Example 1, respectively. The oligomer and procedure used are described in the introduction to the Examples section. The antimony solution used is described in Comparative Example 1.

The data are shown in Table 4. The lithium to aluminum mole ratio ("Li:Al MR") has a target of 4 for all the Li/Al runs in Table 4. The catalyst targets are ~11.5 ppm each Li & Al, ~28.5 ppm each Li & Al or ~45.5 ppm each Li & Al. The phosphorus target was 0, 120 or 240 ppm.

TABLE 4

| Samples | Temp. (deg C.) | Finisher Time (min) | XRF Sb (ppm) | ICP Al ppm | ICP Li ppm | Li:Al Mole Ratio | ICP P (ppm) | P:M Mole Ratio | P:Al Mole Ratio | XRF P (ppm) | IhV (dL/g) | ItV (dL/g) |
|---|---|---|---|---|---|---|---|---|---|---|---|---|
| CB-12 | | | | | | | | | | | | |
| 111 | 270 | 308 | | 12.9 | 15.9 | 4.8 | 0 | 0 | 0 | | 0.918 | 0.98 |
| 82 | 270 | 308 | | 12.8 | 15.2 | 4.6 | 252 | 3.05 | 17.2 | | 0.832 | 0.882 |
| 98 | 285 | 157 | | 12.7 | 15.1 | 4.7 | 0 | 0 | 0 | | 0.768 | 0.81 |
| 100 | 285 | 157 | | 12.6 | 15.4 | 4.8 | 217 | 2.6 | 15 | | 0.777 | 0.82 |
| 73 | 277.5 | 91 | | 33.7 | 36.4 | 4.2 | 121 | 0.6 | 3.1 | | 0.836 | 0.886 |
| 68 | 277.5 | 91 | | 33.9 | 36.5 | 4.2 | 126 | 0.63 | 3.3 | | 0.794 | 0.839 |
| 58 | 277.5 | 91 | | 32.1 | 36.8 | 4.4 | 131 | 0.65 | 3.5 | | 0.769 | 0.811 |
| 57 | 270 | 126 | | 50.9 | 58.8 | 4.5 | 0 | 0 | 0 | | 0.747 | 0.787 |
| 88 | 270 | 152 | | 53.6 | 59.3 | 4.3 | 269 | 0.83 | 4.4 | | 0.708 | 0.743 |
| 96 | 270 | 152 | | 51.9 | 58.6 | 4.4 | 0 | 0 | 0 | | 0.803 | 0.849 |
| 64 | 285 | 43 | | 51.4 | 58.5 | 4.4 | 0 | 0 | 0 | | 0.848 | 0.9 |
| 71 | 285 | 43 | | 53.0 | 58.3 | 4.3 | 230 | 0.72 | 3.8 | | 0.788 | 0.832 |
| 60 | 275 | 140 | 243 | | | | | | | 16 | 0.782 | 0.826 |
| 65 | 275 | 140 | 244 | | | | | | | 16 | 0.785 | 0.829 |
| 74 | 275 | 140 | 239 | | | | | | | 23 | 0.82 | 0.868 |
| 104 | 275 | 140 | 232 | | | | | | | 18 | 0.786 | 0.83 |

| Sample | Temp. (Deg C.) | ICP Al (ppm) | ICP Li (ppm) | ICP P (ppm) | Solution Haze (ntu) | L* | a* | b* | L* adj. | Free AA (ppm) | AA GEN 295/5 (ppm) |
|---|---|---|---|---|---|---|---|---|---|---|---|
| CB-12 | | | | | | | | | | 0.8 | 16.8 |
| 111 | 270 | 12.9 | 15.9 | 0 | 3.2 | 87.0 | −3.3 | 9.8 | 77.9 | 11.4 | 21.9 |
| 82 | 270 | 12.8 | 15.2 | 252 | 4.7 | 85.9 | −1.9 | 7.9 | 78.7 | 11.4 | 18.6 |
| 98 | 285 | 12.7 | 15.1 | 0 | 5.7 | 85.8 | −2.5 | 7.6 | 78.7 | 18.5 | 23.3 |
| 100 | 285 | 12.6 | 15.4 | 217 | 4.4 | 88.4 | −2.6 | 7.9 | 81.0 | 18.6 | 22.7 |
| 73 | 277.5 | 33.7 | 36.4 | 121 | 5.8 | 86.2 | −2.0 | 8.8 | 78.4 | 4.9 | 8.1 |
| 68 | 277.5 | 33.9 | 36.5 | 126 | 5.6 | 87.7 | −1.8 | 8.6 | 80.2 | 4.1 | 7.6 |
| 58 | 277.5 | 32.1 | 36.8 | 131 | 6.0 | 87.3 | −1.8 | 8.5 | 79.8 | 4.2 | 8.3 |
| 57 | 270 | 50.9 | 58.8 | 0 | 57.0 | 87.4 | −1.9 | 7.8 | 80.4 | 11.9 | 38.4 |
| 88 | 270 | 53.6 | 59.3 | 269 | 27.8 | 88.0 | −2.9 | 8.2 | 80.3 | 4.5 | 12.7 |

TABLE 4-continued

| | | | | | | | | | | |
|---|---|---|---|---|---|---|---|---|---|---|
| 96 | 270 | 51.9 | 58.6 | 0 | 59.0 | 88.2 | −3.3 | 11.0 | 78.1 | 11.6 | 29.5 |
| 64 | 285 | 51.4 | 58.5 | 0 | 45.5 | 86.3 | −2.1 | 10.2 | 77.3 | 27.7 | 39.9 |
| 71 | 285 | 53.0 | 58.3 | 230 | 7.4 | 87.7 | −1.9 | 10.0 | 79.0 | 6.7 | 10.2 |
| 60 | 275 | | | | 12.8 | 81.1 | −1.4 | 2.3 | 78.7 | 14.8 | 25.3 |
| 65 | 275 | | | | 25.5 | 82.2 | −1.6 | 1.3 | 80.5 | 16.5 | 27.1 |
| 74 | 275 | 3.3 | 0 | 22.5 | 29.5 | 80.5 | −1.7 | 1.4 | 78.7 | 18.6 | 32.1 |
| 104 | 275 | | | | 20.5 | 81.9 | −1.7 | 1.1 | 80.4 | 16.1 | 26.6 |

| Sample | Temp. (deg C.) | XRF Sb (ppm) | ICP Al (ppm) | ICP Li (ppm) | ICP P (ppm) | DSC Tm1a (deg C.) | DSC Tm1b (deg C.) | DSC Tm1c (deg C.) | DSC Tch2 (deg C.) | DSC Tcc (deg C.) |
|---|---|---|---|---|---|---|---|---|---|---|
| 111 | 270 | . | 12.9 | 15.9 | 0 | 180 | 200 | 239 | 159 | 148 |
| 82 | 270 | . | 12.8 | 15.2 | 251.6 | 191.6 | . | 238 | 155.4 | 149.4 |
| 98 | 285 | . | 12.6 | 15.1 | 0 | 184 | . | 242 | 155.7 | 151.7 |
| 100 | 285 | . | 12.6 | 15.4 | 217.1 | 179 | 194 | 239 | 152 | 151 |
| 73 | 277.5 | . | 33.7 | 36.4 | 120.6 | 185.4 | . | 238 | 155 | 151.7 |
| 68 | 277.5 | . | 33.9 | 36.5 | 126.3 | 182.6 | . | 240 | 154.7 | 151 |
| 58 | 277.5 | . | 32.1 | 36.8 | 130.8 | . | . | 238 | 154.4 | 152.4 |
| 57 | 270 | . | 50.9 | 58.8 | 0 | 202 | . | 241 | 147.1 | 154.1 |
| 88 | 270 | . | 53.6 | 59.3 | 269.4 | 192.3 | . | 240 | 143.2 | 153.4 |
| 96 | 270 | . | 51.9 | 58.6 | 0 | 188 | . | 241 | 149.4 | 152.4 |
| 64 | 285 | . | 51.4 | 58.5 | 0 | 182.5 | . | 239 | 153.3 | 146.4 |
| 71 | 285 | . | 53 | 58.3 | 230 | . | . | 238 | 150.7 | 151.4 |
| 60 | 275 | 243 | . | . | . | . | . | 238 | 160.9 | 163.8 |
| 65 | 275 | 244 | . | . | . | . | . | 239 | 155.4 | 161.8 |
| 74 | 275 | 239 | . | . | . | . | . | 236 | 154 | 155.4 |
| 104 | 275 | 232 | . | . | . | . | . | 237 | 154 | 165.8 |

With the addition of late phosphorus, there are Li/Al-catalyzed runs that are faster, have a lower free AA level, have a lower AA generation rate, have a lower solution haze level, and have a similar L* adjusted, relative to the Sb controls. Run Samples 58, 68 & 73 have catalyst levels of about 33 ppm Al and about 37 ppm Li, a polymerization temperature of about 277.5° C., and about 126 ppm P added late (P:M MR of about 0.6). On average, runs Samples 58, 68 & 73 have about a 35% reduction in finisher time, about a 73% reduction in free AA, about a 71% reduction in AA generation rate, about a 74% reduction in solution haze and about the same L* adjusted, relative to the Sb controls. Using the same temperature and catalyst levels but without late phosphorus addition, Samples 48 in Table 3 had L* adjusted of 77.8, lower than the L* adjusted for the Sb controls (about 79.6).

Run 71 has catalyst levels of about 53 ppm Al and about 58 ppm Li, a polymerization temperature of about 285° C., and about 230 ppm P added late (P:M MR of about 0.7). Run 71 has about a 69% reduction in finisher time, about a 59% reduction in free AA, about a 63% reduction in AA generation rate, about a 66% reduction in solution haze and about a similar L* adjusted, relative to the Sb controls.

Runs 82 and 100 have catalyst levels of about 13 ppm Al and about 15 ppm Li, a polymerization temperature of about 270° C. and 285° C., respectively, and about 252 ppm P and 217 ppm P added late, respectively (P:M MR of about 3 and about 2.6, respectively). The residual AA and AA generation rates are higher for Runs 82 and 100 than for Runs 58, 68, 71 & 73. Runs 58, 68, 71 & 73 have P:M MR in the optimum range.

PET samples catalyzed by the levels of Li/Al studied have lower peak temperatures for crystallization upon cooling from the melt ($T_{cc}$=146-154° C.) than the Sb controls (ave. ~162° C.). As $T_{cc}$ decreases, this indicates that the crystallization rate from the melt is slower. Slower crystallization rates from the melt can result in less haze in molded articles, like preforms. Slower crystallization rates from the melt result in shorter injection molding cycle times. Converters will value the productivity increases associated with reduced injection molding cycle times.

PET samples catalyzed by the higher Li and Al levels studied at the lower polymerization temperatures studied have lower peak temperatures for crystallization upon heating from the glass ($T_{ch2}$=143-149° C.) than the Sb controls (ave. ~156° C.). The sample with the lowest $T_{ch2}$ (Sample 88) also has a phosphorus compound added late. As $T_{ch2}$ decreases, this indicates that the crystallization rate from the glass is faster. Faster crystallization from the glass is desirable in thermoformable tray applications and resin producers who crystallize amorphous pellets optionally prior to polymerizing in the solid state.

With late addition of a phosphorus compound to PET made with Li & Al catalysts, it may be possible to get a melt-phase only PET with AA generation rates low enough for use in the water bottle market and/or as a dual use resin. In addition to improved AA generation rates, PET made with Li/Al catalyst system with late addition of a phosphorus compound may also have higher production rates, lower free AA, lower haze, slower crystallization rates from the melt, and/or equivalent or improved color, relative to PET made with a conventional Sb catalyst system.

Example 3

Melt blending a preformed polymer with an additive in a glass flask achieves a uniform distribution of additive within the polymer like an extruder would—only with less shear and more time. A polymer is the starting material. It is catalyzed by 16 ppm Li and 21.5 ppm Al added right after esterification, is modified by 1.4 wt. % IPA and 1.7 wt. % DEG, and has an It. V. of 0.850 dL/g and an Ih.V. of 0.804 dL/g. This polymer does not contain any catalyst deactivators or toners. The pellets are cryogenically ground to pass a 2 mm screen, and 100 grams of the polyester powder are weighed into a 500 mL round bottom flask. The powder is dried at 150° C. under full vacuum (25-30 in. Hg) overnight (about 16 hours) in a vacuum oven. After cooling the flask to room temperature in a desiccator, the catalyst-deactivating additive is weighed into the flask. The additive is 85% or 95% phosphoric acid ($H_3PO_4$). A polymer head with stirrer is attached and the flask purged twice with nitrogen. A molten bath of Belmont metal is raised to surround the flask, and the following CAMILE™ array is implemented.

| Stage | Time Min. | Temp. °C. | Vac Torr | Stir RPM |
|---|---|---|---|---|
| 1 | .1 | 275 | 730 | 0 |
| 2 | 5 | 275 | 730 | 0 |
| 3 | 5 | 275 | 730 | 0 |
| 4 | 5 | 275 | 730 | 15* |
| 5 | 4 | 275 | 0.5* | 35* |
| 6 | 2 | 275 | 0.5 | 75* |
| 7 | 5 | 275 | 0.5 | 75 |

*= ramp

A moderate nitrogen purge was employed at 730 torr. During Stages 2 & 3, the stirrer is turned slowly by hand. Following the end of the array, the polymer is cooled for about 15 min., separated from the glass flask, cooled for about 10 min. and placed immediately into liquid nitrogen. The polymers are ground cryogenically to pass a 3 mm screen. The residual or free AA sample is kept frozen until residual AA testing is done.

Aluminum isopropoxide and lithium hydroxide are heated up to 125° C. in an open bottle, which is fitted with a nitrogen purge, a magnetic stir bar and a thermocouple. The mixture is heated for 3.5 h once 125° C. is achieved. The target Al level is 0.3 wt. %, and the target Li:Al mole ratio is 3. Per ICP-OES, the mixture has 0.33 wt. % Al and 0.28 wt. % Li.

Aluminum isopropoxide and sodium hydroxide are heated up in an open bottle, which is fitted with a nitrogen purge, a magnetic stir bar and a thermocouple. Once the mixture reaches 121° C., it is heated for 3 h. The target Al level is 0.3 wt. %, and the target Na:Al mole ratio is 3. Per ICP-OES, the mixture has 0.35 wt. % Al and 0.9 wt. % Na.

The polymerization reactor is operated under control of a CAMILE™ automation system, programmed to implement the following array. For the Sb controls, the stage 5-12 temperatures are 275° C.

| Stage | Time (min) | Temp (° C.) | Vac (torr) | Stir (rpm) |
|---|---|---|---|---|
| 1 | 0.1 | 265 | 730 | 0 |
| 2 | 10 | 265 | 730 | 150* |
| 3 | 2 | 265 | 330* | 300* |
| 4 | 1 | 265 | 330 | 300 |
| 5 | 50 | 285* | 30* | 300 |
| 6 | 2 | 285 | 30 | 300 |
| 7 | 1 | 285 | 30 | 200* |
| 8 | 20 | 285 | 30 | 200 |
| 9 | 2 | 285 | 4* | 200 |
| 10 | 60 | 285 | 4 | 200 |
| 11 | 2 | 285 | 0.5* | 30* |
| 12 | 500# | 285 | 0.5 | 30 |

*= ramp;
= torque termination

TABLE 5

| Sample | Additive Type | L* | a* | b* | Ih.V. (dL/g) | It.V (dL/g) | Li (ppm) | Al (ppm) | ICP P (ppm) | AA Gen 295/5 (ppm) | % Redctn in AA Gen | Free AA (ppm) | % Redctn in Free AA |
|---|---|---|---|---|---|---|---|---|---|---|---|---|---|
| CB-12 | | . | . | . | | | | | | 18.6 | | | |
| 76 | None | 84.6 | −3.0 | 12.3 | 0.79 | 0.835 | 21.5 | 26.6 | . | 27.9 | 0 | 12.8 | 0 |
| 102 | 85% H₃PO₄ | 85.3 | −2.0 | 10.6 | 0.742 | 0.781 | 21.8 | 25.4 | 52.8 | 8.7 | 68.9 | 2.7 | 79.0 |
| 92 | 85% H₃PO₄ | 88.4 | −2.0 | 9.9 | 0.717 | 0.753 | 20.2 | 28.2 | 106.5 | 6.2 | 77.7 | 2.2 | 83.1 |
| 93 | 95% H₃PO₄ | 88.6 | −2.8 | 10.1 | 0.777 | 0.82 | 19.9 | 25.8 | 30.6 | 15.0 | 46.2 | 6.3 | 50.9 |
| 90 | 95% H₃PO₄ | 87.8 | −1.7 | 9.4 | 0.738 | 0.777 | 19.3 | 26.6 | 78.3 | 5.6 | 80.1 | 2.3 | 82.2 |
| CB-12 | | . | . | . | . | . | . | . | . | 18.1 | | | |

Table 5 illustrates that late addition of phosphoric acid is effective at lowering the AA generation and the free AA. Within the range studied, the % reduction in AA generation and in the free AA increases as the phosphorus to metals mole ratio (P:M MR) increases until a P:M MR of about 0.69. About 46% reduction in AA Gen 295/5 and 51% reduction in free AA is seen at P:M MR of about 0.26 (Sample 93). About 69% reduction in AA Gen 295/5 and 79% reduction in free AA is seen at P:M MR of about 0.42 (Sample 102). About 80% reduction in AA Gen 295/5 and 82% reduction in free AA is seen at P:M MR of about 0.67 (Sample 90). About 78% reduction in AA Gen 295/5 and 83% reduction in free AA is seen at P:M MR of about 0.87 (Sample 92). Since the It.V. decreases as the P:M MR increases, the objective is to use the minimum P:M MR that will result in the % reduction in AA generation and free AA required; thereby, minimizing the It.V. loss.

Per Table 5, the late addition of a phosphorus compound also improves the color. Sample 76 is darker (lower L*) and more yellow (higher b*) than any of the samples with phosphoric acid added late (Samples 90, 92, 93, 102).

Comparative Example 3

The oligomer and procedure used are described the introduction to the Examples section. The antimony solution used is described in Comparative Example 1.

For Sb controls, 1.07 wt./wt. % P solution of an oligomeric phosphate triester in 80 wt. % ethylene glycol and 20% n-BuOH is added during Stage 6. The stirring system is automatically calibrated on torque between stages 4 and 5. The finisher stage (#12) is terminated when the stirrer torque target is met or exceeded on three separate occasions. The Sb control was made on a different rig. The rig that the other runs were made on later had its torque targets lowered.

TABLE 6

| Sample | Temp. (deg C.) | Finisher Time (min) | ICP Al (ppm) | ICP Na (ppm) | ICP Li (ppm) | XRF Sb (ppm) | XRF P (ppm) | IhV (dL/g) | ItV (dL/g) |
|---|---|---|---|---|---|---|---|---|---|
| CB-12 | . | . | . | . | . | . | . | . | . |
| 6 | 285 | 46.5 | 34.7 | . | 28.8 | . | . | 0.898 | 0.957 |
| 189 | 285 | 86.2 | 40.8 | 91.1 | 0 | . | . | 0.921 | 0.983 |
| 7 | 285 | 82.9 | 41.8 | 101.9 | . | . | . | 0.912 | 0.973 |
| 188 | 275 | 150.7 | . | . | . | 240 | 17 | 0.841 | 0.892 |

| Sample | ICP Al (ppm) | ICP Na (ppm) | ICP Li (ppm) | XRF Sb (ppm) | XRF P (ppm) | L* | a* | b* | L* Adj | Free AA (ppm) | AA Gen 295/5 (ppm) | Soln Haze (ntu) |
|---|---|---|---|---|---|---|---|---|---|---|---|---|
| CB-12 | . | . | . | . | . | . | . | . | . | 0.8 | 18.7 | . |
| 6 | 34.7 | . | 28.8 | . | . | 86.6 | -3.9 | 11.8 | 75.6 | 15.5 | 35.0 | 13.1 |
| 189 | 40.8 | 91.1 | 0 | . | . | 86.5 | -2.4 | 7.2 | 79.8 | 29.6 | 26.8 | 40.5 |
| 7 | 41.8 | 101.9 | . | . | . | 89.6 | -2.9 | 9.8 | 80.6 | 24.1 | 24.1 | 44.3 |
| 188 | . | . | . | 240 | 17 | 84.9 | -1.7 | 1.9 | 82.6 | 16.4 | 36.4 | 17.1 |

Per Table 6, alkali metal compounds other than those containing lithium can be used as part of a catalyst system with aluminum compounds. For samples 6, 189 and 7, the target aluminum level was 40 ppm and the target alkali metal to aluminum mole ratio was 3. The run with a Li/Al catalyst is faster than that with a Na/Al catalyst; however, the Na/Al catalyst could still provide rate advantages for a plant designed for an Sb case at 275° C., like sample 188. The samples made with a Na/Al catalyst, #189 & 7, are less yellow, less green, and, on average, brighter than the sample made with a comparable Li/Al catalyst system, #6. This color improvement is summarized by the higher L* adjusted for the Na/Al catalyst samples than for the Li/Al-catalyzed samples. The samples made with a Na/Al, catalyst also have a lower AA generation rate than the sample made with a comparable Li/Al catalyst system, #6, and than the Sb sample made at a temperature 10° C. cooler. The solution haze is higher for samples made with a Na/Al catalyst than the sample made with a comparable Li/Al catalyst system and than the Sb sample.

Example 4

The oligomer and procedure used are described the introduction to the Examples section. The antimony solution used is described in Comparative Example 1. The sodium/aluminum mixture used are described in Comparative Example 3. In the cases indicated in Table 7, 85% phosphoric acid is added neat in Stage 14 of the following array.

The polymerization reactor is operated under control of a CAMILE™ automation system, programmed to implement the following array. The temperature listed in Table 7 is the one used in the array.

| Stage | Time (min) | Temp (° C.) | Vac (torr) | Stir (rpm) |
|---|---|---|---|---|
| 1 | 0.1 | 265 | 730 | 0 |
| 2 | 10 | 265 | 730 | 150* |
| 3 | 2 | 265 | 330* | 300* |
| 4 | 1 | 265 | 330 | 300 |
| 5 | 50 | 285* | 30* | 300 |
| 6 | 2 | 285 | 30 | 300 |
| 7 | 1 | 285 | 30 | 200* |
| 8 | 20 | 285 | 30 | 200 |
| 9 | 2 | 285 | 4* | 200 |
| 10 | 60 | 285 | 4 | 200 |
| 11 | 2 | 285 | 0.5* | 30* |
| 12 | Variable | 285 | 0.5 | 30 |
| 13 | 3 | 285 | 650* | 30 |
| 14 | 2 | 285 | 650 | 30 |
| 15 | 1 | 285 | 0.5* | 45* |
| 16 | 5 | 285 | 0.5 | 45 |

*= ramp

For Sb controls, 1.07 wt./wt. % P solution of an oligomeric phosphate triester in 80 wt. % ethylene glycol and 20% n-BuOH is added during Stage 6. The stirring system is automatically calibrated on torque between stages 4 and 5.

TABLE 7

| Sample | Finisher Stg Temperature (deg C.) | Finisher Time (min) | Finisher Time (min) | ICP Al (ppm) | ICP Na (ppm) | ICP P (ppm) | XRF Sb (ppm) | XRF P (ppm) | IhV (dL/g) | ItV (dL/g) |
|---|---|---|---|---|---|---|---|---|---|---|
| CB-12 | . | . | . | . | . | . | . | . | . | . |
| 47 | 285 | 85 | . | 35.65 | 103.5 | 103 | . | . | 0.843 | 0.894 |
| 50 | 285 | 85 | . | 36.6 | 104.2 | 101.9 | . | . | 0.852 | 0.905 |
| 12 | 275 | . | 171.42 | . | . | . | 237 | 19 | 0.861 | 0.915 |

| Sample | ICP Al (ppm) | ICP Na (ppm) | ICP P (ppm) | XRF Sb (ppm) | XRF P (ppm) | L* | a* | b* | L* Adj | Free AA (ppm) | AA Gen 295/5 (ppm) | Soln Haze (ntu) |
|---|---|---|---|---|---|---|---|---|---|---|---|---|
| CB-12 | . | . | . | . | . | . | . | . | . | . | 18.8 | . |
| 47 | 35.65 | 103.5 | 103 | . | . | 88.2 | -2.6 | 8.6 | 80.3 | 5.6 | 7.5 | 14.9 |

TABLE 7-continued

| | | | | | | | | | | | | |
|---|---|---|---|---|---|---|---|---|---|---|---|---|
| 50 | 36.6 | 104.2 | 101.9 | . | . | 87.6 | −2.4 | 8.8 | 79.6 | 7.5 | 7.5 | 18.8 |
| 12 | . | . | . | 237 | 19 | 83.6 | −1.6 | 1.5 | 81.7 | 16.4 | 34.7 | 22.3 |

There is about a 71% reduction in AA generation for samples 47 & 50 in Table 7, 'Na/Al-catalyzed PET with late addition of P' as compared to samples 189 & 7 in Table 6, 'Na/Al-catalyzed PET without late addition of P.' The large magnitude of this reduction may enable entry into AA-sensitive water bottles and dual-use applications (water & CSD). There is about a 78% reduction in AA generation for samples 47 & 50 made at 285° C. in Table 7, 'Na/Al-catalyzed PET with late addition of P,' as compared to the Sb control made at 275° C., sample 12 in Table 7, There is about a 76% reduction in free AA for samples 47 & 50 in Table 7, 'Na/Al-catalyzed PET with late addition of P' as compared to samples 189 & 7 in Table 6, 'Na/Al-catalyzed PET without late addition of P.' Less stripping of free AA will by needed, if any. There is about a 60% reduction in solution haze for samples 47 & 50 in Table 7, 'Na/Al-catalyzed PET with late addition of P' as compared to samples 189 & 7 in Table 6, 'Na/Al-catalyzed PET without late addition of P.' The Na/Al-catalyst system with late addition of a phosphorous compound has not yet been optimized; therefore, these samples do not necessarily illustrate the best that can be done with a Na/Al-catalyst system.

Comparative Example 4

The oligomer and procedure used are described the introduction to the Examples section. A 0.94 wt./wt. % Sb solution is made from antimony triacetate in ethylene glycol.

Aluminum isopropoxide and lithium hydroxide are heated up to 125° C. in an open bottle, which is fitted with a nitrogen purge, a magnetic stir bar and a thermocouple. The mixture is heated for about 3.5 h once 125° C. is achieved. The target Al level is 0.3 wt. %, and the target Li:Al mole ratio is 1, 3 or 5. Per ICP-OES, the mixture with the Li:Al mole ratio of 1 has 0.33 wt. % Al and 0.084 wt. % Li. Per ICP-OES, the mixture with the Li:Al mole ratio of 3 has 0.33 wt. % Al and 0.28 wt. % Li. Per ICP-OES, the mixture with the Li:Al mole ratio of 5, which is heated for about 3 hours, has 0.38 wt. % Al and 0.45 wt. % Li.

The polymerization reactor is operated under control of a CAMILE™ automation system, programmed to implement the following array. For the Sb controls, the stage 5-12 temperatures are 280° C. The temperature listed in Table 8 is the one used in the array for stages 5-12 The aluminum target is 10 or 25 or 40 ppm. The target Li:Al mole ratio is 1, 3 or 5.

| Stage | Time (min) | Temp (° C.) | Vac (torr) | Stir (rpm) |
|---|---|---|---|---|
| 1 | 0.1 | 265 | 730 | 0 |
| 2 | 10 | 265 | 730 | 150* |
| 3 | 2 | 265 | 330* | 300* |
| 4 | 1 | 265 | 330 | 300 |
| 5 | 50 | 285* | 30* | 300 |
| 6 | 2 | 285 | 30 | 300 |
| 7 | 1 | 285 | 30 | 200* |
| 8 | 20 | 285 | 30 | 200 |
| 9 | 2 | 285 | 4* | 200 |
| 10 | 60 | 285 | 4 | 200 |
| 11 | 2 | 285 | 0.5* | 30* |
| 12 | 500# | 285 | 0.5 | 30 |

*= ramp;
= torque termination

The stirring system is automatically calibrated on torque between stages 4 and 5. The finisher stage (#12) is terminated when the stirrer torque target is met or exceeded on three separate occasions. No phosphorus compound is added to any of the runs in the example.

TABLE 8

| ItV (dL/g) | Sample | Ave ICP Al (ppm) | Ave ICP Li (ppm) | Ave ICP Li:Al MR | XRF Sb (ppm) | L* New | a* New | b* New |
|---|---|---|---|---|---|---|---|---|
| 0.899 | 184 | 11.8 | 2.65 | 0.87 | | 89.58 | −2.11 | 5.3 |
| 0.936 | 185 | 11.7 | 2.65 | 0.88 | | 87.72 | −2.21 | 5.59 |
| 0.939 | 196 | 11.35 | 2.55 | 0.87 | | 87.93 | −2.62 | 7.31 |
| 0.932 | 127 | 9.6 | 7.4 | 3 | | 86.67 | −2.47 | 6.88 |
| 0.934 | 119 | 10.35 | 11.75 | 4.41 | | 88.63 | −2.94 | 8.44 |
| 0.923 | 112 | 11.7 | 11.35 | 3.77 | | 85.02 | −2.63 | 6.61 |
| 0.917 | 137 | 24.8 | 6.15 | 0.96 | | 83.41 | −2.72 | 5.54 |
| 0.987 | 131 | 23.75 | 19.95 | 3.27 | | 85.41 | −3.4 | 9.04 |
| 0.912 | 113 | 22.35 | 18.05 | 3.14 | | 87.95 | −3.37 | 10.66 |
| 0.976 | 114 | 21.7 | 18.3 | 3.28 | | 88.21 | −3.36 | 10.34 |
| 0.969 | 115 | 20.85 | 18.5 | 3.45 | | 88.15 | −3.14 | 9.24 |
| 0.936 | 124 | 25 | 19.8 | 3.08 | | 85.61 | −3.7 | 10.03 |
| 0.898 | 116 | 23.35 | 29.55 | 4.92 | | 88.82 | −3.01 | 9.51 |
| 0.956 | 199 | 45.1 | 18.5 | 1.59 | | 87.31 | −3.26 | 9.39 |
| 0.935 | 5 | 39.25 | 9.8 | 0.97 | | 88.87 | −3 | 8.78 |
| 0.875 | 121 | 35.8 | 30.5 | 3.31 | | 88.66 | −3.29 | 11.13 |
| 0.93 | 120 | 34.9 | 44.95 | 5.01 | | 88.83 | 3.48 | 11.34 |
| 0.922 | 111 | 36.85 | 46.25 | 4.88 | | 86.42 | −3.17 | 12.43 |
| 0.909 | 132 | | | | 243.9 | 83.98 | −1.15 | 4.23 |
| 0.896 | 135 | | | | 247.2 | 81.63 | −1.2 | 4.6 |
| 0.884 | 136 | | | | 239.1 | 82.42 | −1.45 | 4.18 |

TABLE 8-continued

| Sample | Ave ICP Li (ppm) | Ave ICP Li:Al MR | XRF Sb (ppm) | L* New | a* New | b* New | L* New Adj |
|---|---|---|---|---|---|---|---|
| 184 | 2.65 | 0.87 | | 89.6 | −2.1 | 5.3 | 84.5 |
| 185 | 2.65 | 0.88 | | 87.7 | −2.2 | 5.6 | 82.4 |
| 196 | 2.55 | 0.87 | | 87.9 | −2.6 | 7.3 | 81.0 |
| 127 | 7.4 | 3 | | 86.7 | −2.5 | 6.9 | 80.2 |
| 119 | 11.75 | 4.41 | | 88.6 | −2.9 | 8.4 | 80.7 |
| 112 | 11.35 | 3.77 | | 85.0 | −2.6 | 6.6 | 78.7 |
| 137 | 6.15 | 0.96 | | 83.4 | −2.7 | 5.5 | 77.9 |
| 131 | 19.95 | 3.27 | | 85.4 | −3.4 | 9.0 | 76.8 |
| 113 | 18.05 | 3.14 | | 88.0 | −3.4 | 10.7 | 78.1 |
| 114 | 18.3 | 3.28 | | 88.2 | −3.4 | 10.3 | 78.6 |
| 115 | 18.5 | 3.45 | | 88.2 | −3.1 | 9.2 | 79.5 |
| 124 | 19.8 | 3.08 | | 85.6 | −3.7 | 10.0 | 76.1 |
| 116 | 29.55 | 4.92 | | 88.8 | −3.0 | 9.5 | 80.0 |
| 199 | 18.5 | 1.59 | | 87.3 | −3.3 | 9.4 | 78.5 |
| 5 | 9.8 | 0.97 | | 88.9 | −3.0 | 8.8 | 80.6 |
| 121 | 30.5 | 3.31 | | 88.7 | −3.3 | 11.1 | 78.4 |
| 120 | 44.95 | 5.01 | | 88.8 | 3.5 | 11.3 | 81.2 |
| 111 | 46.25 | 4.88 | | 86.4 | −3.2 | 12.4 | 75.2 |
| 132 | | | 243.9 | 84.0 | −1.2 | 4.2 | 80.1 |
| 135 | | | 247.2 | 81.6 | −1.2 | 4.6 | 77.5 |
| 136 | | | 239.1 | 82.4 | −1.5 | 4.2 | 78.5 |

*The ICP data reported on −199 is a single measurement.

Example 5

The oligomer and procedure used are described in the introduction to the Examples section. The antimony solution and the lithium/aluminum mixtures used are described in Comparative Example 4. The aluminum target is 10 or 25 or 40 ppm. The target Li:Al mole ratio is 1, 3 or 5. The P:M MR target is 0, 0.5 or 1.

In the cases indicated in Table 9, 85% phosphoric acid is added in Stage 14 of the following array. 85% phosphoric acid is added neat or as a 50:50 or 1:1 solution of 85% phosphoric acid and Millipore water. An exception is Sample 12 where a 75:25 phosphoric acid (85%): Millipore water solution is used.

The polymerization reactor is operated under control of a CAMILE™ automation system, programmed to implement the following array. The temperature listed in Table 9 is the one used in stages 5 to 16 of the array. The finisher times used in stage 12 are based on finisher times in Comparative Example 4.

| Stage | Time (min) | Temp (° C.) | Vac (torr) | Stir (rpm) |
|---|---|---|---|---|
| 1 | 0.1 | 265 | 730 | 0 |
| 2 | 10 | 265 | 730 | 150* |
| 3 | 2 | 265 | 330* | 300* |
| 4 | 1 | 265 | 330 | 300 |
| 5 | 50 | 285* | 30* | 300 |
| 6 | 2 | 285 | 30 | 300 |
| 7 | 1 | 285 | 30 | 200* |
| 8 | 20 | 285 | 30 | 200 |
| 9 | 2 | 285 | 4* | 200 |
| 10 | 60 | 285 | 4 | 200 |
| 11 | 2 | 285 | 0.5* | 30* |
| 12 | Variable | 285 | 0.5 | 30 |
| 13 | 3 | 285 | 650* | 30 |
| 14 | 2 | 285 | 650 | 30 |
| 15 | 1 | 285 | 0.5* | 45* |
| 16 | 5 | 285 | 0.5 | 45 |

*= ramp

The stirring system is automatically calibrated on torque between stages 4 and 5. Calibrating on torque means that the background torque, that is the torque before the polymer starts to build appreciably, is determined and subtracted out of the measured torque as the polymer builds.

TABLE 9

| Sample | Li:Al Mole Ratio | Temp. (deg C.) | P:M Mole Ratio | Finisher Time (min) | ICP Al (ppm) | ICP Li (ppm) | ICP Li:Al MR | ICP P (ppm) | ICP P:M MR |
|---|---|---|---|---|---|---|---|---|---|
| 21 | 1 | 275 | 0 | 274 | 9.2 | 2.4 | 1.01 | 0 | 0.0 |
| 71 | 1 | 275 | 1 | 274 | 10.6 | 2.5 | 0.92 | 21.1 | 0.9 |
| 10 | 1 | 285 | 0 | 174 | 9.6 | 2.5 | 1.01 | 3.4 | 0.2 |
| 39 | 1 | 285 | 1 | 174 | 10.8 | 2.5 | 0.9 | 12.9 | 0.5 |
| 68 | 1 | 285 | 1 | 174 | 10.6 | 2.4 | 0.88 | 30.3 | 1.3 |
| 49 | 3 | 280 | 0.5 | 182 | 9 | 8 | 3.46 | 26.7 | 0.6 |
| 50 | 5 | 275 | 0 | 189 | 10.9 | 11.4 | 4.07 | 2 | 0.0 |
| 72 | 5 | 275 | 1 | 189 | 13.4 | 11.9 | 3.45 | 55.4 | 0.8 |
| 25 | 5 | 285 | 0 | 90 | 11.4 | 11.1 | 3.78 | 1.9 | 0.0 |
| 67 | 5 | 285 | 1 | 90 | 9.5 | 11.1 | 4.54 | 62.4 | 1.0 |
| 66 | 1 | 280 | 0.5 | 143 | 26.3 | 6 | 0.89 | 29.8 | 0.5 |
| 19 | 3 | 275 | 0.5 | 164 | 22.8 | 18.5 | 3.15 | 54.2 | 0.5 |
| 26 | 3 | 280 | 0 | 114 | 21.2 | 17.2 | 3.15 | 1.8 | 0.0 |
| 1 | 3 | 280 | 0.5 | 114 | 23.2 | 19.3 | 3.23 | 50.2 | 0.4 |
| 2 | 3 | 280 | 0.5 | 114 | 24.6 | 19.6 | 3.1 | 61.6 | 0.5 |

TABLE 9-continued

|  |  |  |  |  |  |  |  |  |  |
|---|---|---|---|---|---|---|---|---|---|
| 3 | 3 | 280 | 0.5 | 114 | 24.8 | 19.5 | 3.06 | 59.5 | 0.5 |
| 27 | 3 | 280 | 0.5 | 114 | 24.7 | 18.5 | 2.91 | 46.3 | 0.4 |
| 28 | 3 | 280 | 0.5 | 114 | 22 | 17.7 | 3.13 | 44.7 | 0.4 |
| 29 | 3 | 280 | 0.5 | 114 | 22.8 | 18.3 | 3.12 | 55.3 | 0.5 |
| 57 | 3 | 280 | 0.5 | 114 | 23 | 18.3 | 3.09 | 43.7 | 0.4 |
| 58 | 3 | 280 | 0.5 | 114 | 22.8 | 18.9 | 3.22 | 51.3 | 0.5 |
| 59 | 3 | 280 | 0.5 | 114 | 24.5 | 18.5 | 2.94 | 54.4 | 0.5 |
| 52 | 3 | 280 | 1 | 114 | 22.1 | 18.8 | 3.31 | 116.4 | 1.1 |
| 73 | 3 | 285 | 0.5 | 64 | 24 | 18.6 | 3.01 | 47.6 | 0.4 |
| 69 | 5 | 280 | 0.5 | 84 | 25 | 28.4 | 4.42 | 85.4 | 0.5 |
| 20 | 1 | 275 | 0 | 163 | 36.7 | 9.2 | 0.97 | 0 | 0.0 |
| 65 | 1 | 275 | 1 | 163 | 39.8 | 9.8 | 0.96 | 115.7 | 1.3 |
| 48 | 1 | 285 | 0 | 63 | 37.6 | 9.7 | 1 | 2 | 0.0 |
| 47 | 1 | 285 | 1 | 63 | 40.4 | 9.95 | 0.96 | 123.4 | 1.3 |
| 76 | 1 | 285 | 1 | 63 | 37.8 | 9.9 | 1.02 | 99.4 | 1.1 |
| 12 | 3 | 280 | 0.5 | 96 | 37.6 | 30.8 | 3.18 | 92.2 | 0.5 |
| 51 | 5 | 275 | 0 | 129 | 35.3 | 44.8 | 4.93 | 2 | 0.0 |
| 24 | 5 | 275 | 1 | 129 | 37 | 45 | 4.73 | 258.2 | 1.1 |
| 56 | 5 | 285 | 0 | 29 | 37.7 | 45.7 | 4.71 | 2 | 0.0 |
| 11 | 5 | 285 | 1 | 29 | 35.2 | 45.3 | 5 | 289.2 | 1.2 |
| 77 | 5 | 285 | 1 | 29 | 36.8 | 42.85 | 4.53 | 299.4 | 1.3 |
| 6 |  | 280 |  | 100 |  |  |  |  |  |
| 7 |  | 280 |  | 100 |  |  |  |  |  |
| 8 |  | 280 |  | 100 |  |  |  |  |  |
| 31 |  | 280 |  | 100 |  |  |  |  |  |
| 32 |  | 280 |  | 100 |  |  |  |  |  |
| 33 |  | 280 |  | 100 |  |  |  |  |  |
| 60 |  | 280 |  | 100 |  |  |  |  |  |
| 61 |  | 280 |  | 100 |  |  |  |  |  |
| 64 |  | 280 |  | 100 |  |  |  |  |  |

| Sample | XRF Sb (ppm) | XRF P (ppm) | IhV (dL/g) | ItV (dL/g) | L* New | a* New | b* New | L* New Adj |
|---|---|---|---|---|---|---|---|---|
| 21 |  |  | 0.784 | 0.828 | 88.3 | −1.9 | 4.8 | 83.7 |
| 71 |  |  | 0.775 | 0.818 | 85.9 | −1.5 | 4.2 | 82.0 |
| 10 |  |  | 0.86 | 0.914 | 85.2 | −2.4 | 5.5 | 79.8 |
| 39 |  |  | 0.823 | 0.872 | 88.2 | −2.4 | 6.2 | 82.3 |
| 68 |  |  | 0.828 | 0.877 | 79.8 | −1.8 | 3.3 | 76.5 |
| 49 |  |  | 0.895 | 0.953 | 90.2 | −2.7 | 8.8 | 82.1 |
| 50 |  |  | 0.876 | 0.932 | 86.2 | −2.8 | 7.5 | 79.1 |
| 72 |  |  | 0.781 | 0.825 | 82.9 | −1.9 | 5.0 | 78.2 |
| 25 |  |  | 0.87 | 0.925 | 88.4 | −3.2 | 9.1 | 79.9 |
| 67 |  |  | 0.775 | 0.818 | 85.8 | −1.8 | 5.6 | 80.6 |
| 66 |  |  | 0.843 | 0.894 | 89.1 | −2.8 | 8.4 | 81.3 |
| 19 |  |  | 0.818 | 0.866 | 88.9 | −2.7 | 9.5 | 80.2 |
| 26 |  |  | 0.889 | 0.947 | 81.9 | −3.5 | 7.8 | 74.3 |
| 1 |  |  | 0.869 | 0.924 | 86.5 | −3.0 | 9.3 | 77.8 |
| 2 |  |  | 0.824 | 0.873 | 87.5 | −3.0 | 10.1 | 78.2 |
| 3 |  |  | 0.83 | 0.88 | 86.5 | −2.1 | 9.7 | 77.9 |
| 27 |  |  | 0.813 | 0.861 | 86.1 | −3.4 | 10.0 | 76.8 |
| 28 |  |  | 0.813 | 0.861 | 88.2 | −3.2 | 11.0 | 78.1 |
| 29 |  |  | 0.82 | 0.868 | 84.6 | −3.3 | 8.6 | 76.4 |
| 57 |  |  | 0.812 | 0.859 | 88.7 | −2.8 | 10.3 | 79.3 |
| 58 |  |  | 0.841 | 0.892 | 88.9 | −3.0 | 11.2 | 78.8 |
| 59 |  |  | 0.818 | 0.866 | 87.6 | −2.9 | 8.6 | 79.6 |
| 52 |  |  | 0.828 | 0.877 | 84.0 | −2.5 | 9.2 | 75.6 |
| 73 |  |  | 0.822 | 0.871 | 86.1 | −2.2 | 9.1 | 78.0 |
| 69 |  |  | 0.773 | 0.816 | 88.5 | −2.1 | 10.7 | 79.1 |
| 20 |  |  | 0.855 | 0.908 | 85.8 | −2.9 | 7.4 | 78.7 |
| 65 |  |  | 0.809 | 0.856 | 84.3 | −2.5 | 6.9 | 77.8 |
| 48 |  |  | 0.835 | 0.885 | 83.3 | −3.1 | 6.6 | 76.8 |
| 47 |  |  | 0.714 | 0.75 | 88.7 | −2.4 | 7.4 | 81.8 |
| 76 |  |  | 0.723 | 0.76 | 88.9 | −1.8 | 7.7 | 82.0 |
| 12 |  |  | 0.837 | 0.888 | 85.7 | −3.1 | 12.9 | 74.1 |
| 51 |  |  | 0.89 | 0.948 | 85.1 | −3.6 | 10.5 | 75.3 |
| 24 |  |  | 0.712 | 0.748 | 86.7 | −1.9 | 9.0 | 78.7 |
| 56 |  |  | 0.804 | 0.85 | 84.0 | −3.6 | 10.1 | 74.5 |
| 11 |  |  | 0.633 | 0.661 | 86.4 | −2.1 | 9.9 | 77.6 |
| 77 |  |  | 0.658 | 0.688 | 87.3 | −1.8 | 9.9 | 78.7 |
| 6 | 238.6 | 74.5 | 0.728 | 0.766 | 83.1 | −0.8 | 4.0 | 79.5 |
| 7 | 242.1 | 72.1 | 0.746 | 0.786 | 82.8 | −1.2 | 3.0 | 79.9 |
| 8 | 226.4 | 65.8 | 0.763 | 0.804 | 82.1 | −1.2 | 3.5 | 78.9 |
| 31 | 229.8 | 92.8 | 0.708 | 0.743 | 80.3 | −1.4 | 3.7 | 76.9 |
| 32 | 238 | 57.2 | 0.769 | 0.811 | 82.6 | −1.3 | 3.6 | 79.2 |
| 33 | 234.9 | 65.3 | 0.764 | 0.806 | 81.0 | −1.2 | 3.2 | 78.0 |
| 60 | 241.8 | 110.4 | 0.758 | 0.799 | 83.6 | −1.0 | 5.0 | 79.2 |
| 61 | 245.9 | 119.2 | 0.792 | 0.837 | 83.3 | −1.4 | 3.3 | 80.0 |
| 64 | 245.3 | 104.2 | 0.776 | 0.819 | 81.4 | −1.2 | 4.3 | 77.5 |

TABLE 9-continued

| Sample | Ave ICP Al (ppm) | ICP Li (ppm) | ICP P (ppm) | Chip L* | Chip a* | Chip b* | Chip L* Adj | Pressed Chip-Haze | Pressed Chip RHI |
|---|---|---|---|---|---|---|---|---|---|
| 21 | 9.2 | 2.4 | 0 | 85.3 | −2.0 | 10.0 | 76.52 | 7.6 | 0.993 |
| 71 | 10.6 | 2.5 | 21.1 | 84.2 | −1.4 | 7.6 | 77.57 | 12.2 | 1.013 |
| 10 | 9.6 | 2.5 | 3.4 | 83.0 | −2.7 | 12.9 | 71.59 | 10.3 | 1.035 |
| 39 | 10.8 | 2.5 | 12.9 | 85.5 | −1.7 | 9.1 | 77.53 | 9.3 | 0.984 |
| 68 | 10.6 | 2.4 | 30.3 | 73.7 | −2.0 | 10.9 | 64.13 | 22.1 | 1.114 |
| 49 | 9 | 8 | 26.7 | 86.4 | −2.4 | 11.2 | 76.43 | 7.0 | 0.988 |
| 50 | 10.9 | 11.4 | 2 | 83.8 | −3.0 | 14.0 | 71.40 | 6.9 | 1.017 |
| 72 | 13.4 | 11.9 | 55.4 | 81.6 | −2.1 | 9.5 | 73.20 | 12.0 | 1.034 |
| 25 | 11.4 | 11.1 | 1.9 | 85.6 | −3.6 | 15.7 | 71.65 | 5.4 | 0.98 |
| 67 | 9.5 | 11.1 | 62.4 | 83.4 | −2.0 | 9.8 | 74.76 | 13.8 | 1.006 |
| 66 | 26.3 | 6 | 29.8 | 86.5 | −2.1 | 9.8 | 77.87 | 9.1 | 0.967 |
| 19 | 22.8 | 18.5 | 54.2 | 85.6 | −3.2 | 14.9 | 72.36 | 9.1 | 0.977 |
| 26 | 21.2 | 17.2 | 1.8 | 77.6 | −4.0 | 22.9 | 57.65 | 21.4 | 1.064 |
| 1 | 23.2 | 19.3 | 50.2 | 84.3 | −3.6 | 16.4 | 69.78 | 13.2 | 1.009 |
| 2 | 24.6 | 19.6 | 61.6 | 85.1 | −3.4 | 15.3 | 71.54 | 14.4 | 1.009 |
| 3 | 24.8 | 19.5 | 59.5 | 83.3 | −2.7 | 17.1 | 68.48 | 12.6 | 0.987 |
| 27 | 24.7 | 18.5 | 46.3 | 83.4 | −3.4 | 17.1 | 68.43 | 16.4 | 0.998 |
| 28 | 22 | 17.7 | 44.7 | 85.7 | −3.4 | 15.9 | 71.67 | 12.8 | 0.976 |
| 29 | 22.8 | 18.3 | 55.3 | 81.9 | −3.1 | 15.2 | 68.45 | 19.8 | 1.04 |
| 57 | 23 | 18.3 | 43.7 | 84.8 | −3.2 | 19.0 | 68.28 | 15.9 | 0.964 |
| 58 | 22.8 | 18.9 | 51.3 | 85.2 | −3.5 | 17.0 | 70.13 | 17.9 | 0.987 |
| 59 | 24.5 | 18.5 | 54.4 | 84.3 | −3.1 | 14.8 | 71.22 | 15.2 | 0.967 |
| 52 | 22.1 | 18.8 | 116.4 | 82.9 | −2.8 | 15.4 | 69.47 | 18.0 | 0.977 |
| 73 | 24 | 18.6 | 47.6 | 83.8 | −3.4 | 16.4 | 69.34 | 17.2 | 1.002 |
| 69 | 25 | 28.4 | 85.4 | 83.6 | −2.9 | 16.5 | 69.22 | 19.3 | 0.982 |
| 20 | 36.7 | 9.2 | 0 | 83.9 | −3.4 | 16.6 | 69.29 | 11.5 | 0.992 |
| 65 | 39.8 | 9.8 | 115.7 | 81.8 | −1.9 | 10.9 | 72.26 | 16.6 | 1.028 |
| 48 | 37.6 | 9.7 | 2 | 79.3 | −3.3 | 17.2 | 64.20 | 16.4 | 1.061 |
| 47 | 40.4 | 9.95 | 123.4 | 85.5 | −2.1 | 10.5 | 76.19 | 11.4 | 0.992 |
| 76 | 37.8 | 9.9 | 99.4 | 86.7 | −2.1 | 9.8 | 78.06 | 8.9 | 0.97 |
| 12 | 37.6 | 30.8 | 92.2 | 84.1 | −4.1 | 21.0 | 65.68 | 13.4 | 0.979 |
| 51 | 35.3 | 44.8 | 2 | 80.8 | −4.0 | 23.6 | 60.35 | 26.7 | 1.015 |
| 24 | 37 | 45 | 258.2 | 84.1 | −2.6 | 16.9 | 69.56 | 7.3 | 0.98 |
| 56 | 37.7 | 45.7 | 2 | 79.5 | −4.0 | 26.6 | 56.58 | 20.2 | 1.015 |
| 11 | 35.2 | 45.3 | 289.2 | 83.4 | −3.1 | 19.0 | 66.96 | 12.3 | 0.995 |
| 77 | 36.8 | 42.85 | 299.4 | 84.7 | −3.4 | 17.2 | 69.55 | 9.4 | 0.982 |
| 6 | | | | 77.9 | −0.2 | 13.1 | 67.39 | 18.1 | 1.018 |
| 7 | | | | 79.5 | −0.5 | 10.0 | 71.31 | 12.3 | 1.007 |
| 8 | | | | 77.6 | −0.5 | 11.4 | 68.24 | 17.0 | 1.024 |
| 31 | | | | 75.0 | −0.5 | 13.1 | 64.34 | 17.2 | 1.044 |
| 32 | | | | 80.9 | −0.5 | 11.5 | 71.42 | 9.2 | 0.986 |
| 33 | | | | 77.8 | −0.4 | 11.6 | 68.38 | 14.0 | 1.023 |
| 60 | | | | 81.4 | −0.6 | 11.6 | 71.86 | 6.8 | 0.998 |
| 61 | | | | 78.8 | −0.9 | 9.4 | 70.93 | 7.5 | 1.005 |
| 64 | | | | 79.1 | −0.4 | 10.4 | 70.60 | 9.3 | 1.013 |

| Sample | ICP Al (ppm) | ICP Li (ppm) | ICP P (ppm) | DSC Tm 1a (C) | DSC Tm 1b (C) | DSC Tch 2 (C) | DSC Tcc (C) | % Cryst. |
|---|---|---|---|---|---|---|---|---|
| 21 | 9.2 | 2.4 | 0 | 200 | 241 | 157 | 148 | 39.6 |
| 71 | 10.6 | 2.5 | 21.1 | 179 | 241 | 156 | 149 | 37.1 |
| 10 | 9.6 | 2.5 | 3.4 | 175 | 239 | 154 | 145 | 34.4 |
| 39 | 10.8 | 2.5 | 12.9 | 192 | 239 | 161 | 148 | 34.8 |
| 68 | 10.6 | 2.4 | 30.3 | 196 | 238 | 158 | 149 | 32.7 |
| 49 | 9 | 8 | 26.7 | 193 | 233 | 161 | 150 | 34.3 |
| 50 | 10.9 | 11.4 | 2 | 194 | 242 | 160 | 147 | 32.7 |
| 72 | 13.4 | 11.9 | 55.4 | 186 | 240 | 157 | 149 | 33.9 |
| 25 | 11.4 | 11.1 | 1.9 | 191 | 239 | 159 | 146 | 39.3 |
| 67 | 9.5 | 11.1 | 62.4 | 200 | 240 | 156 | 147 | 38.9 |
| 66 | 26.3 | 6 | 29.8 | 185 | 238 | 157 | 155 | 36.5 |
| 19 | 22.8 | 18.5 | 54.2 | 189 | 235 | 158 | 155 | 37.4 |
| 26 | 21.2 | 17.2 | 1.8 | | 239 | 158 | 147 | 50.4 |
| 1 | 23.2 | 19.3 | 50.2 | | 234 | 156 | 168 | 38 |
| 2 | 24.6 | 19.6 | 61.6 | 191 | 240 | 158 | 150 | 35.2 |
| 3 | 24.8 | 19.5 | 59.5 | | 236 | 156 | 162 | 35.1 |
| 27 | 24.7 | 18.5 | 46.3 | | 236 | 155 | 168 | 40.4 |
| 28 | 22 | 17.7 | 44.7 | | 238 | 153 | 170 | 41.9 |
| 29 | 22.8 | 18.3 | 55.3 | | 235 | 157 | 158 | 32.6 |
| 57 | 23 | 18.3 | 43.7 | | 239 | 154 | 164 | 30.9 |
| 58 | 22.8 | 18.9 | 51.3 | 235 | 195 | 158 | 156 | 41.9 |
| 59 | 24.5 | 18.5 | 54.4 | | 237 | 153 | 169 | 40.3 |
| 52 | 22.1 | 18.8 | 116.4 | | 239 | 157 | 149 | 39 |
| 73 | 24 | 18.6 | 47.6 | 197 | 236 | 153 | 172 | 36.3 |
| 69 | 25 | 28.4 | 85.4 | | 238 | 150 | 160 | 37.1 |
| 20 | 36.7 | 9.2 | 0 | | 239 | 158 | 151 | 30.8 |
| 65 | 39.8 | 9.8 | 115.7 | 196 | 240 | 157 | 148 | 32.6 |

TABLE 9-continued

| | | | | | | | | |
|---|---|---|---|---|---|---|---|---|
| 48 | 37.6 | 9.7 | 2 | 190 | 240 | 160 | 147 | 36.4 |
| 47 | 40.4 | 9.95 | 123.4 | 208 | 241 | 153 | 149 | 39.4 |
| 76 | 37.8 | 9.9 | 99.4 | 191 | 240 | 155 | 151 | 49.2 |
| 12 | 37.6 | 30.8 | 92.2 | | 234 | 152 | 168 | 36.5 |
| 51 | 35.3 | 44.8 | 2 | | 238 | 151 | 145 | 38.8 |
| 24 | 37 | 45 | 258.2 | 196 | 241 | 153 | 150 | 36.9 |
| 56 | 37.7 | 45.7 | 2 | | 240 | 151 | 145 | 39.2 |
| 11 | 35.2 | 45.3 | 289.2 | 190 | 242 | 151 | 151 | 40 |
| 77 | 36.8 | 42.85 | 299.4 | | 241 | 151 | 153 | 36.8 |
| 6 | | | | | 236 | 156 | 170 | 40.4 |
| 7 | | | | | 235 | 160 | 164 | 38.3 |
| 8 | | | | 194 | 235 | 158 | 159 | 39.6 |
| 31 | | | | | 238 | 155 | 168 | 37.3 |
| 32 | | | | | 237 | 161 | 161 | 38.2 |
| 33 | | | | | 239 | 159 | 161 | 37.3 |
| 60 | | | | 195 | 236 | 164 | 156 | 39.6 |
| 61 | | | | 177 | 237 | 159 | 150 | 41.3 |
| 64 | | | | 189 | 238 | 158 | 151 | 37.2 |

| Sample | Chip L* | Chip a* | Chip b* | Chip L* Adj | Pressed Chip - Haze | Pressed Chip RHI |
|---|---|---|---|---|---|---|
| CM-01 | 84.6 | −0.6 | 2.3 | 82.5 | 7.8 | 1.0 |
| CM-01 | 84.9 | −0.5 | 2.5 | 82.7 | 6.9 | 1.0 |
| CM-01 | 85.2 | −0.6 | 2.4 | 83.0 | 10.5 | 1.0 |
| CM-01 | 85.4 | −0.5 | 2.3 | 83.4 | 6.2 | 1.0 |
| CM-01 | 84.9 | −0.5 | 2.5 | 82.7 | 6.9 | 1.0 |
| CM-01 | 85.1 | −0.4 | 2.2 | 83.2 | 7.0 | 1.0 |
| CM-01 | 85.1 | −0.5 | 2.3 | 83.1 | | 1.0 |

| Sample | ICP Al (ppm) | ICP Li (ppm) | ICP P (ppm) | Residual AA (ppm) | AA GEN 295/5 (ppm) | AA Gen 275/10 (ppm) | Solution Haze (ntu) |
|---|---|---|---|---|---|---|---|
| 21 | 9.2 | 2.4 | 0 | 21.0 | 18.5 | 15.4 | 7.2 |
| 71 | 10.6 | 2.5 | 21.1 | 11.8 | 9.4 | 7.3 | 11.3 |
| 10 | 9.6 | 2.5 | 3.4 | 37.7 | 22.7 | 22.9 | 10.4 |
| 39 | 10.8 | 2.5 | 12.9 | 18.1 | 12.7 | 10.5 | 5.8 |
| 68 | 10.6 | 2.4 | 30.3 | 20.2 | 22.2 | 19.5 | 25.3 |
| 49 | 9 | 8 | 26.7 | 17.6 | 8.7 | 6.0 | 2.8 |
| 50 | 10.9 | 11.4 | 2 | 25.6 | 22.1 | 16.9 | 5.7 |
| 72 | 13.4 | 11.9 | 55.4 | 11.0 | 10.0 | 6.6 | 13.4 |
| 25 | 11.4 | 11.1 | 1.9 | 38.0 | 22.9 | 20.0 | 2.4 |
| 67 | 9.5 | 11.1 | 62.4 | 21.8 | 12.7 | 9.8 | 8.8 |
| 66 | 26.3 | 6 | 29.8 | 17.0 | 9.5 | 6.0 | 11.1 |
| 19 | 22.8 | 18.5 | 54.2 | 12.8 | 8.5 | 6.1 | 4.4 |
| 26 | 21.2 | 17.2 | 1.8 | 35.9 | 25.6 | 17.5 | 14.1 |
| 1 | 23.2 | 19.3 | 50.2 | 4.9 | 9.8 | 6.7 | 15.2 |
| 2 | 24.6 | 19.6 | 61.6 | 4.1 | 8.1 | 6.1 | 11.0 |
| 3 | 24.8 | 19.5 | 59.5 | 4.1 | 9.7 | 5.7 | 11.2 |
| 27 | 24.7 | 18.5 | 46.3 | 12.8 | 9.7 | 7.2 | 6.2 |
| 28 | 22 | 17.7 | 44.7 | 15.1 | 9.3 | 7.4 | 4.4 |
| 29 | 22.8 | 18.3 | 55.3 | 16.5 | 9.0 | 9.6 | 9.9 |
| 57 | 23 | 18.3 | 43.7 | 15.4 | 10.5 | 8.2 | 4.2 |
| 58 | 22.8 | 18.9 | 51.3 | 16.6 | 8.7 | 5.8 | 3.9 |
| 59 | 24.5 | 18.5 | 54.4 | 12.8 | 8.5 | 7.9 | 6.5 |
| 52 | 22.1 | 18.8 | 116.4 | 21.4 | 13.9 | 10.5 | 8.0 |
| 73 | 24 | 18.6 | 47.6 | 22.9 | 10.3 | 7.3 | 7.2 |
| 69 | 25 | 28.4 | 85.4 | 21.7 | 9.4 | 6.2 | 4.5 |
| 20 | 36.7 | 9.2 | 0 | 24.0 | 23.0 | 18.9 | 22.0 |
| 65 | 39.8 | 9.8 | 115.7 | 14.5 | 18.1 | 12.2 | 21.3 |
| 48 | 37.6 | 9.7 | 2 | 44.7 | 27.6 | 21.0 | 20.5 |
| 47 | 40.4 | 9.95 | 123.4 | 35.5 | 21.7 | 20.6 | 28.5 |
| 76 | 37.8 | 9.9 | 99.4 | 30.7 | 17.5 | 15.8 | 12.2 |
| 12 | 37.6 | 30.8 | 92.2 | 21.7 | 10.8 | 8.4 | 8.3 |
| 51 | 35.3 | 44.8 | 2 | 26.2 | 34.2 | 22.6 | 39.3 |
| 24 | 37 | 45 | 258.2 | 28.2 | 15.0 | 10.8 | 5.7 |
| 56 | 37.7 | 45.7 | 2 | 65.4 | 41.0 | 25.7 | 38.5 |
| 11 | 35.2 | 45.3 | 289.2 | 55.2 | 22.2 | 14.7 | 7.5 |
| 77 | 36.8 | 42.85 | 299.4 | 41.6 | 18.6 | 13.8 | 6.5 |
| 6 | | | | 22.9 | 31.7 | | 21.0 |
| 7 | | | | 30.1 | 33.4 | 25.0 | 16.6 |
| 8 | | | | 29.4 | 33.3 | 23.6 | 18.5 |
| 31 | | | | 28.2 | 28.2 | 20.8 | 29.8 |
| 32 | | | | 34.2 | 34.1 | 26.9 | 15.3 |
| 33 | | | | 36.6 | 34.9 | 18.2 | 23.5 |
| 60 | | | | 25.6 | 31.0 | 22.5 | 5.5 |
| 61 | | | | 33.6 | 33.7 | 15.9 | 9.8 |
| 64 | | | | 31.3 | 34.4 | 22.2 | 8.5 |

TABLE 9-continued

| Sample | Residual AA (ppm) | AA GEN 295/5 (ppm) | AA Gen 275/10 (ppm) |
|---|---|---|---|
| CB-12 | 0.8 | 17.6 | 14.7 |
| CB-12 | 0.7 | 16.9 | 14.7 |
| CB-12 | 0.7 | 16.0 | 14.2 |
| CB-12 | 0.9 | 18.2 | 19.3 |
| CB-12 | 0.8 | 16.5 | 14.2 |
| CB-12 | | | 14.8 |
| CB-12 | | | 14.7 |
| CB-12 | 0.8 | 17.3 | 14.9 |
| CB-12 | | 18.8 | 16.0 |

Example 6

The oligomer and procedure used are described the introduction to the Examples section. The lithium/aluminum mixtures used are described in Comparative Example 4. The aluminum target is 10 or 18 or 24 ppm. The target Li:Al mole ratio is 1:1, 3:1 or 5:1.

The P:M MR target is 0.6. In Stage 14 of the following array, 85% phosphoric acid is added. 85% phosphoric acid is added as a 50:50 or 1:1 solution of 85% phosphoric acid and Millipore water. Sample 111 did not contain much, if any phosphorus. The detection limit for phosphorus is about 2 ppm. Sample 111 serves as a P:M MR ~0 example for a Li:Al MR of 1:1.

The polymerization reactor is operated under control of a CAMILE™ automation system, programmed to implement the following array. The temperature in stages 5 to 16 of the array is 280° C. The finisher time used in stage 12, 140 minutes, is predicted from finisher times in Comparative Example 4.

| Stage | Time (min) | Temp (° C.) | Vac (torr) | Stir (rpm) |
|---|---|---|---|---|
| 1 | 0.1 | 265 | 730 | 0 |
| 2 | 10 | 265 | 730 | 150* |
| 3 | 2 | 265 | 330* | 300* |
| 4 | 1 | 265 | 330 | 300 |
| 5 | 50 | 280* | 30* | 300 |
| 6 | 2 | 280 | 30 | 300 |
| 7 | 1 | 280 | 30 | 200* |
| 8 | 20 | 280 | 30 | 200 |
| 9 | 2 | 280 | 4* | 200 |
| 10 | 60 | 280 | 4 | 200 |
| 11 | 2 | 280 | 0.5* | 30* |
| 12 | 140 | 280 | 0.5 | 30 |
| 13 | 3 | 280 | 650* | 30 |
| 14 | 2 | 280 | 650 | 30 |
| 15 | 1 | 280 | 140* | 45* |
| 16 | 5 | 280 | 140 | 45 |

*= ramp

The stirring system is automatically calibrated on torque between stages 4 and 5.

TABLE 10

| Sample | Li:Al Mole Ratio | ICP Al (ppm) | ICP Li ppm | ICP Li:Al MR | ICP P (ppm) | P:M MR act. | IhV (dL/g) |
|---|---|---|---|---|---|---|---|
| 111 | 1 | 22.2 | 5.8 | 1.02 | 2.9 | 0.1 | 0.857 |
| 116 | 1 | 26.5 | 6.3 | 0.92 | 44.7 | 0.8 | 0.845 |
| 119 | 1 | 23.8 | 5.7 | 0.93 | 43.7 | 0.8 | 0.809 |
| 112 | 3 | 16 | 13.7 | 3.33 | 37.3 | 0.5 | 0.873 |
| 120 | 3 | 17.2 | 13.9 | 3.14 | 47 | 0.6 | 0.84 |
| 114 | 3 | 17.2 | 13.6 | 3.07 | 56.3 | 0.7 | 0.822 |
| 115 | 5 | 11.6 | 11.8 | 3.95 | 51.5 | 0.8 | 0.834 |
| 118 | 5 | 9.6 | 12 | 4.86 | 38.7 | 0.6 | 0.835 |

| Sample | ICP Al (ppm) | ICP Li ppm | ICP P (ppm) | L* New | a* New | b* New | L* New Adj |
|---|---|---|---|---|---|---|---|
| 111 | 22.2 | 5.8 | 2.9 | 87.6 | −2.9 | 8.3 | 79.9 |
| 116 | 26.5 | 6.3 | 44.7 | 88.1 | −2.5 | 6.7 | 81.7 |
| 119 | 23.8 | 5.7 | 43.7 | 88.0 | −2.8 | 7.7 | 80.7 |
| 112 | 16 | 13.7 | 37.3 | 89.2 | −3.1 | 11.0 | 79.1 |
| 120 | 17.2 | 13.9 | 47 | 85.0 | −3.0 | 8.9 | 76.7 |
| 114 | 17.2 | 13.6 | 56.3 | 86.3 | −2.8 | 8.1 | 78.7 |
| 115 | 11.6 | 11.8 | 51.5 | 86.2 | −2.6 | 9.5 | 77.6 |
| 118 | 9.6 | 12 | 38.7 | 85.4 | −2.8 | 8.7 | 77.3 |
| 113 | 9.5 | 11.5 | 41.6 | 88.0 | −3.0 | 9.4 | 79.3 |

| Sample | ICP Al (ppm) | ICP Li ppm | ICP P (ppm) | Chip L* | Chip a* | Chip b* | Chip L* Adj | Pressed Chip RHI |
|---|---|---|---|---|---|---|---|---|
| 111 | 22.2 | 5.8 | 2.9 | 86.2 | −2.9 | 11.8 | 75.7 | 0.990 |
| 116 | 26.5 | 6.3 | 44.7 | 86.6 | −2.0 | 8.7 | 78.8 | 0.987 |
| 119 | 23.8 | 5.7 | 43.7 | 86.4 | −1.9 | 8.3 | 78.9 | 0.996 |
| 112 | 16 | 13.7 | 37.3 | 86.7 | −3.4 | 13.8 | 74.3 | 0.976 |
| 120 | 17.2 | 13.9 | 47 | 83.7 | −3.0 | 13.7 | 71.5 | 1.031 |
| 114 | 17.2 | 13.6 | 56.3 | 84.6 | −2.8 | 12.3 | 73.6 | 1.031 |
| 115 | 11.6 | 11.8 | 51.5 | 86.3 | −2.6 | 11.2 | 76.4 | 0.997 |
| 118 | 9.6 | 12 | 38.7 | 86.3 | −2.6 | 10.9 | 76.5 | 0.988 |

TABLE 10-continued

| | | | | | | | | |
|---|---|---|---|---|---|---|---|---|
| 113 | 9.5 | 11.5 | 41.6 | 86.8 | −2.6 | 10.7 | 77.2 | 0.991 |
| CM-01 CB-12 | | | | 85.1 | −0.5 | 2.3 | 83.1 | 0.981 |
| CM-O1 | | | | 85.4 | −0.6 | 1.8 | 83.7 | 1.011 |

| Sample | ICP Al (ppm) | ICP Li ppm | ICP P (ppm) | AA GEN 295/5 (ppm) | AA Gen 275/10 (ppm) | Solution Haze 1 (ntu) |
|---|---|---|---|---|---|---|
| 111 | 22.2 | 5.8 | 2.9 | 20.1 | 18.2 | 11.6 |
| 116 | 26.5 | 6.3 | 44.7 | 12.4 | 8.8 | 9.1 |
| 119 | 23.8 | 5.7 | 43.7 | 11.6 | 9.2 | 13.6 |
| 112 | 16 | 13.7 | 37.3 | 10.3 | 7.4 | 4.0 |
| 120 | 17.2 | 13.9 | 47 | 9.4 | 7.6 | 9.4 |
| 114 | 17.2 | 13.6 | 56.3 | 9.3 | 7.6 | 7.0 |
| 115 | 11.6 | 11.8 | 51.5 | 11.1 | 8.3 | 3.4 |
| 118 | 9.6 | 12 | 38.7 | 8.5 | 6.4 | 3.9 |
| 113 CM-01 | 9.5 | 11.5 | 41.6 | 8.8 | 8.4 | 3.9 |
| CB-12 CM-O1 | | | | 18.8 | 16.0 | |

What we claim is:

1. A polyester polymer composition comprising:
a polyester polymer comprising repeating units of ethylene terephthalate or ethylene naphthalate, aluminum atoms in an amount of at least 3 ppm based on the weight of the polyester polymer, and less than 5 ppm of catalytically active titanium atoms based on the weight of the polyester polymer, said polyester polymer having an It.V. of at least 0.72 dL/g obtained through a melt phase polymerization process and a particle residual acetaldehyde level of 10 ppm or less, wherein said aluminum atoms are residues of an aluminum compound represented by the formula:

$$\text{Al}[OR]_a[OR']_b[OR'']_c[R''']_d$$

wherein R, R', R" are independently an alkyl group, aryl group, acyl group or hydrogen, R'" is an anionic group, and a, b, c, d are independently 0 or positive integers, and a+b+c+d is no greater than 3.

2. The composition of claim 1, wherein the polyester polymer comprises
(a) a carboxylic acid component comprising at least 80 mole % of the residues of terephthalic acid, derivatives of terephthalic acid, naphthalene-2,6-dicarboxylic acid, derivatives of naphthalene-2,6-dicarboxylic acid, or mixtures thereof, and
(b) a hydroxyl component comprising at least 80 mole % of the residues of ethylene glycol,
based on 100 mole percent of carboxylic acid component residues and 100 mole percent of hydroxyl component residues in the polyester polymer.

3. The composition of claim 2, wherein the carboxylic acid component comprises at least 90 mole % of the residues of terephthalic acid, derivatives of terephthalic acid or mixtures thereof and the hydroxyl component comprises at least 90 mole % of the residues of ethylene glycol.

4. The composition of claim 3, wherein said composition further comprises alkaline earth metal atoms or alkali metal atoms.

5. The composition of claim 4, wherein said composition further comprises phosphorus atoms.

6. The composition of claim 5, wherein the phosphorus atoms are added at the end of polycondensation in the melt phase polymerization process.

7. The composition of claim 5, wherein the alkali metal atoms comprise lithium atoms.

8. The composition of claim 5, wherein the alkali metal atoms comprise sodium atoms.

9. The composition of claim 5, wherein the alkali metal atoms comprise potassium atoms.

10. The composition of claim 4, wherein the aluminum atoms are present in an amount ranging from 3 ppm to 100 ppm based on the weight of the polyester polymer.

11. The composition of claim 10, wherein the aluminum atoms are present in an amount ranging from 5 ppm to 60 ppm based on the weight of the polyester polymer.

12. The composition of claim 4, wherein the composition comprises the alkali metal atoms comprising one or more of lithium atoms, sodium atoms, and potassium atoms, the aluminum atoms are present in an amount ranging from 3 ppm to 100 ppm based on the weight of the polyester polymer, and the molar ratio of said alkali metal atoms to said aluminum atoms ranges from 0.1 to 75.

13. The composition of claim 4, wherein the composition comprises the alkali metal atoms comprising one or more of lithium atoms, sodium atoms, and potassium atoms, the aluminum atoms are present in an amount ranging from 5 ppm to 60 ppm based on the weight of the polyester polymer, and the molar ratio of said alkali metal atoms to said aluminum atoms ranges from 0.25 to 10.

14. The composition of claim 4, wherein the composition comprises the alkali metal atoms comprising one or more of lithium atoms, sodium atoms, and potassium atoms, the aluminum atoms are present in an amount ranging from 5 ppm to 40 ppm based on the weight of the polyester polymer, and the molar ratio of said alkali metal atoms to said aluminum atoms ranges from 0.5 to 5.

15. The composition of claim 11, wherein the alkali metal atoms comprise sodium atoms.

16. The composition of claim 11, wherein the alkali metal atoms comprise lithium atoms.

17. The composition of claim 1, wherein the polyester polymer has an It.V. of at least 0.76 dL/g obtained through the melt phase polymerization process.

18. The composition of claim 17, wherein the polyester polymer has an It.V. of at least 0.80 dL/g obtained through the melt phase polymerization process.

19. The composition of claim 18, wherein the polyester polymer has an It.V. of at least 0.84 dL/g obtained through the melt phase polymerization process.

20. The composition of claim 1, wherein the composition has an acetaldehyde generation rate of 18 ppm or less.

21. The composition of claim 1, wherein the composition has an acetaldehyde generation rate of 13 ppm or less.

22. The composition of claim 1, wherein the composition has an acetaldehyde generation rate of 10 ppm or less.

23. The composition of claim 1, wherein the composition has an acetaldehyde generation rate of 8 ppm or less.

24. The composition of claim 1, wherein the aluminum compound comprises one or more of carboxylic acid salts of aluminum, substituted aluminum hydroxides, aluminum alcoholates, and aluminum chelates in which the alkoxy group of an aluminum alcoholate is partially or wholly substituted by a chelating agent.

25. The composition of claim 1, wherein the aluminum compound comprises aluminum carboxylates, basic aluminum carboxylates or aluminum alkoxides, or a combination thereof.

26. The composition of claim 1, wherein a+b+c+d is equal to 3.

27. The composition of claim 1, wherein the aluminum atoms are obtained from the aluminum compound dispersed or dissolved in a diluent or a carrier reactive with one or more polyester forming ingredients or are contained in a polyester polymer concentrate.

28. The composition of claim 1, further comprising alkaline earth metal atoms or alkali metal atoms, wherein the molar ratio of the alkaline earth metal atoms or the alkali metal atoms to the aluminum atoms ranges from 0.1 to 75.

29. The composition of claim 28, wherein the molar ratio ranges from 0.5 to 10.

30. The composition of claim 1, wherein the polyester polymer is made without the addition of cobalt to the melt phase polymerization process.

31. The composition of claim 1, wherein the composition contains less than 3 ppm of the catalytically active titanium atoms based on the weight of the polyester polymer.

32. The composition of claim 1, wherein the polyester polymer is made without addition of the catalytically active atoms of titanium, or catalytically active atoms of cobalt, antimony, or germanium effective to catalyze the manufacture of the polyester polymer in the melt phase polymerization process and increase polyester polymer It.V. from a starting point of 0.2 to 0.4 dL/g by 0.1 dL/g or more after 1 hour at 280° C. and 0.8 mm Hg.

33. The composition of claim 4, wherein the polyester polymer is made without addition of any catalyst metal atoms other than one or more sources of the aluminum atoms and one or more sources of the alkaline earth metal atoms or the alkali metal atoms effective to catalyze the manufacture of the polyester polymer in the melt phase polymerization process and increase polyester polymer It.V. from a starting point of 0.2 to 0.4 dL/g by 0.1 dL/g or more after 1 hour at 280° C. and 0.8 mm Hg.

34. The composition of claim 33, wherein the composition further comprises the residues of a catalyst deactivator.

35. The composition of claim 1, wherein the composition further comprises phosphorus atoms.

36. The composition of claim 35, wherein said phosphorus atoms are obtained from phosphorus compound catalyst deactivators.

37. The composition of claim 35, wherein said phosphorus atoms are obtained from phosphoric acid, phosphorus acid, polyphosphoric acid, pyrophosphoric acid, carboxyphosphonic acids, phosphonic acid derivatives, or each of their salts, esters, derivatives or mixtures thereof.

38. The composition of claim 37, wherein said phosphorus atoms are obtained from a phosphoric acid composition comprising the phosphoric acid or an ester derivative of the phosphoric acid.

39. The composition of claim 38, wherein said phosphoric acid composition comprises 95 weight percent of phosphoric acid.

40. The composition of claim 28, further comprising phosphorus atoms, wherein the molar ratio of the phosphorus atoms to the total moles of the aluminum atoms, the alkaline earth metal atoms, and the alkali metal atoms ranges from 0.1 to 3.

41. The composition of claim 40, wherein the molar ratio of the phosphorus atoms to the total moles of the aluminum atoms, the alkaline earth metal atoms, and the alkali metal atoms ranges from 0.5 to 1.5.

42. The composition of claim 1, wherein said composition has a degree of crystallinity of at least 30%, an acetaldehyde generation rate of 20 ppm or less, an L* of at least 60, and the polyester polymer has the It.V. of at least 0.76 dL/g obtained through the melt phase polymerization process.

43. The composition of claim 42, wherein the acetaldehyde generation rate is 15 ppm or less.

44. The composition of claim 1, wherein said composition has a degree of crystallinity of at least 40%, and an acetaldehyde generation rate of 10 ppm or less.

45. The composition of claim 1, wherein the polyester polymer comprises:
(a) a carboxylic acid component comprising at least 90 mole % of the residues of terephthalic acid, derivatives of terephthalic acid, naphthalene-2,6-dicarboxylic acid, derivatives of naphthalene-2,6-dicarboxylic acid, or mixtures thereof, and
(b) a hydroxyl component comprising at least 90 mole % of the residues of ethylene glycol, based on 100 mole percent of carboxylic acid component residues and 100 mole percent of hydroxyl component residues in the polyester polymer, and the amount of the aluminum atoms ranges from 3 ppm to 100 ppm based on the weight of the polyester polymer, said composition further comprises alkaline earth metal atoms or alkali metal atoms and phosphorus atoms, wherein the molar ratio of the alkaline earth metal atoms or the alkali metal atoms to the aluminum atoms ranges from 0.1 to 10, and the molar ratio of the phosphorus atoms to the total moles of the aluminum atoms, the alkaline earth metal atoms, and the alkali metal atoms ranges from 0.1 to 3.

46. The composition of claim 45, wherein the polyester polymer comprises
(a) a carboxylic acid component comprising at least 95 mole % of the residues of terephthalic acid, derivates of terephthalic acid, or mixtures thereof and
(b) a hydroxyl component comprising at least 95 mole % of the residues of ethylene glycol, based on 100 mole percent of carboxylic acid component residues and 100 mole percent of hydroxyl component residues in the polyester polymer, and the amount of the aluminum atoms ranges from 7 ppm to 60 ppm based on the weight of the polyester polymer, and the molar ratio of the alkaline earth metal atoms or the alkali metal atoms to the aluminum atoms ranges from 0.5 to 5, and the molar ratio of the phosphorus atoms to the total moles of the aluminum atoms, the alkaline earth metal atoms, and the alkali metal atoms ranges from 0.3 to 2.

47. The composition of claim 46, wherein the amount of the aluminum atoms ranges from 10 ppm to 40 ppm based on the weight of the polyester polymer, and the molar ratio of the alkaline earth metal atoms or the alkali metal atoms to the aluminum atoms ranges from 0.5 to 5, and the molar ratio of the phosphorus atoms to the total moles of the aluminum atoms, the alkaline earth metal atoms, and the alkali metal atoms ranges from 0.5 to 1.5.

48. A bottle preform obtained from the composition of any one of claims 1-47.

49. A polyester composition comprising a polyester polymer wherein said polyester polymer comprises repeating units of ethylene terephthalate or ethylene naphthalate and:
(i) aluminum atoms
(ii) alkaline earth metal atoms or alkali metal atoms, and
(iii) less than 5 ppm of catalytically active titanium atoms based on the weight of the polyester polymer, and
(iv) a catalyst deactivator residue effective to at least partially deactivate the catalytic activity of the combination of (i) the aluminum atoms and (ii) the alkaline earth metal atoms or the alkali metal atoms,
wherein the polyester polymer has an It.V. of at least 0.72 dL/g obtained through a melt phase polymerization process wherein said aluminum atoms are residues of an aluminum compound represented by the formula:

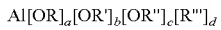

$Al[OR]_a[OR']_b[OR'']_c[R''']_d$ wherein R, R', R" are independently an alkyl group, aryl group, acyl group or hydrogen, R'" is an anionic group, and a, b, c, d are independently 0 or positive integers, and a+b+c+d is no greater than 3.

50. The composition of claim 49, wherein said polyester polymer comprises
(a) a carboxylic acid component comprising at least 80 mole % of the residues of terephthalic acid, derivatives of terephthalic acid, naphthalene-2,6-dicarboxylic acid, derivatives of naphthalene-2,6-dicarboxylic acid, or mixtures thereof, and
(b) a hydroxyl component comprising at least 80 mole % of the residues of ethylene glycol,
based on 100 mole percent of carboxylic acid component residues and 100 mole percent of hydroxyl component residues in the polyester polymer.

51. The composition of claim 50, wherein said catalyst deactivator residue comprises phosphorus atoms.

52. The composition of claim 51, wherein the alkali metal atoms comprise lithium atoms.

53. The composition of claim 51, wherein the amount of the aluminum atoms ranges from 5 ppm to 100 ppm based on the weight of the polyester polymer.

54. The composition of claim 53, wherein the It.V. of the polyester polymer is at least 0.76 dL/g obtained through the melt phase polymerization process.

55. The composition of claim 54, wherein the polyester polymer comprises:
(a) a carboxylic acid component comprising at least 80 mole % of the residues of terephthalic acid, derivatives of terephthalic acid, or mixtures thereof and
(b) a hydroxyl component comprising at least 80 mole % of the residues of ethylene glycol,
based on 100 mole percent of carboxylic acid component residues and 100 mole percent of hydroxyl component residues in the polyester polymer.

56. The composition of claim 55, wherein the polyester polymer comprises
(a) a carboxylic acid component comprising at least 90 mole% of the residues of terephthalic acid, derivatives of terephthalic acid, or mixtures thereof and
(b) a hydroxyl component comprising at least 90 mole% of the residues of ethylene glycol,
based on 100 mole percent of carboxylic acid component residues and 100 mole percent of hydroxyl component residues in the polyester polymer.

57. The composition of claim 50, wherein the catalyst deactivator residue comprises phosphorus atoms, wherein the amount of the phosphorus atoms ranges from 10 ppm to 300 ppm.

58. The composition of claim 49, wherein the polyester polymer has an It.V. of at least 0.76 dL/g obtained through the melt phase polymerization process.

59. The composition of claim 49, wherein the composition has an acetaldehyde generation rate of 18 ppm or less.

60. The composition of claim 49, wherein the composition has an acetaldehyde generation rate of 13 ppm or less.

61. The composition of claim 49, wherein the composition has an acetaldehyde generation rate of 10 ppm or less.

62. The composition of claim 49, wherein the aluminum compound comprises carboxylic acid salts of aluminum, substituted aluminum hydroxides, aluminum alcoholates, or aluminum chelates in which the alkoxy group of an aluminum alcoholate is partially or wholly substituted by a chelating agent.

63. The composition of claim 49, wherein the aluminum compound comprises aluminum carboxylates, aluminum alcoholates, substituted aluminum hydroxides, or a combination thereof.

64. The composition of claim 49, wherein the aluminum atoms are obtained from the aluminum compound dissolved, slurried or dispersed in a diluent or a carrier reactive with one or more polyester forming ingredients, or are contained in a solid polyester polymer concentrate.

65. The composition of claim 49, wherein the molar ratio of the alkaline earth metal atoms or the alkali metal atoms to the aluminum atoms ranges from 0.1 to 10.

66. The composition of claim 65, wherein the molar ratio of the alkaline earth metal atoms or the alkali metal atoms to the aluminum atoms ranges from 1 to 5.

67. The composition of claim 49, wherein the polyester polymer is made without addition of cobalt to the melt phase polymerization process.

68. The composition of claim 49, wherein the polyester polymer is made without addition after esterification of the catalytically active titanium atoms or catalytically active atoms of, cobalt, antimony, or germanium effective to catalyze the manufacture of the polyester polymer in the polyester melt phase polymerization process and increase the It.V. by 0.1 dL/g or more as measured starting with a polyester polymer It.V. ranging from 0.2 dlg to 0.4 dL/g, after 1 hour at 280° C. and 0.8 mmHg.

69. The composition of claim 49, wherein the polyester polymer is made without addition of any catalyst metal compound other than the aluminum compounds comprising the aluminum atoms and one or more of alkaline earth metal compounds comprising the alkaline earth metal atoms or alkali metal compounds comprising the alkali metal atoms to the melt phase polymerization process.

70. The composition of claim 49 wherein said catalyst deactivator residue comprises the residues of an acidic phosphorus compound or their ester derivatives or mixtures thereof.

71. The composition of claim 70, wherein said acidic phosphorus compound comprises phosphoric acid, pyrophosphoric acid, phosphorous acid, polyphosphoric acid, carboxyphosphonic acids, phosphonic acid derivatives, or each of their salts, esters, derivatives or mixtures thereof.

72. The composition of claim 71, wherein the acidic phosphorus compound contains phosphorus atoms, and wherein the molar ratio of the phosphorus atoms to the total of the aluminum atoms, the alkaline earth metal atoms and the alkali metal atoms ranges from 0.05 to 3.0.

73. The composition of claim 72, wherein the molar ratio of the phosphorus atoms to the total of the aluminum atoms, the alkaline earth metal atoms, and the alkali metal atoms ranges from 0.5 to 2.

74. The composition of claim 49, wherein the composition has an acetaldehyde generation rate of 15 or less, an L* of at least 60, and the polyester polymer has the It.V. of at least 0.76 dL/g obtained through the melt phase polymerization process.

75. A bottle preform obtained from the composition of any one of claims 49 through 74.

76. The bottle preform of claim 75, wherein the bottle preform has a residual acetaldehyde content of 8 ppm or less.

77. The bottle preform of claim 76, wherein the residual acetaldehyde content is 6 ppm or less.

78. A continuous process for the manufacture of a polyester polymer, comprising adding phosphorus atoms to a polyester melt containing a) aluminum atoms, b) alkaline earth metal atoms or alkali metal atoms, and c) less than 5 ppm of catalytically active titanium atoms based on the weight of the polyester polymer, wherein said phosphorus atoms are added to the polyester melt when one or more of the following conditions are satisfied or thereafter and before solidification of the polyester melt:
   a) the polyester melt reaches an It.V. of at least 0.50 dL/g; or
   b) vacuum applied to the polyester melt, if any, is at least partially released; or
   c) if the polyester melt is present in a melt phase polymerization process, adding the phosphorus atoms within a final reactor for making the polyester polymer or after the final reactor and before a cutter for cutting the polyester melt; or
   d) if the polyester melt is present in a melt phase polymerization process, following at least 85% of the time for polycondensing the polyester melt; or
   e) the It.V. of the polyester melt is within +/−0.15 dL/g of the It.V. obtained upon solidification; or
   f) at a point within 20 minutes or less of solidifying the polyester melt;
wherein the polyester polymer has an It.V. of at least 0.72 dL/g obtained through the melt phase polymerization process, wherein said polyester polymer comprises repeating units of ethylene terephthalate or ethylene naphthalate and wherein said aluminum atoms are residues of an aluminum compound represented by the formula:

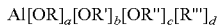

$Al[OR]_a[OR']_b[OR'']_c[R''']_d$ wherein R, R', R" are independently an alkyl group, aryl group, acyl group or hydrogen, R'" is an anionic group, and a, b, c, d are independently 0 or positive integers, and a+b+c+d is no greater than 3.

79. The process of claim 78, wherein the polyester melt is present in the melt phase polymerization process for the manufacture of said polyester polymer.

80. The process of claim 78, wherein the polyester melt is present in a melt processing zone for manufacture of an article.

81. The process of claim 80, wherein said melt processing zone comprises an extruder barrel.

82. The process of claim 81, wherein said melt processing zone comprises the extruder barrel of an injection molding machine.

83. The process of claim 78, wherein the phosphorus atoms are added to the polyester melt after the polyester melt obtains an It.V. of at least 0.74 dL/g.

84. The process of claim 78, wherein the phosphorus atoms are added to the polyester melt after bringing the pressure in the final reactor to a level of 600 mm Hg or greater and before the polyester melt is solidified.

85. The process of claim 78, wherein the phosphorus atoms are added at a location near or at the end of the final reactor or after the final reactor and before the cutter for cutting the polyester melt into particles.

86. The process of claim 78, wherein the phosphorus atoms are added to the polyester melt following at least 95% of the time for polycondensing the polyester melt.

87. The process of claim 78, wherein the phosphorus atoms are added to the polyester melt when the It.V. of the polyester melt is within 0.05 dL/g of the polyester polymer It.V. upon solidification.

88. The process of claim 78, wherein the phosphorus atoms are added to the polyester melt within 10 minutes or less of solidifying the polyester melt.

89. The process of claim 78, wherein the melt phase polymerization process is continuous and has a throughput of at least 1 ton/day in a steady state operation.

90. The process of claim 89, wherein the throughput is at least 300 tons/day.

91. The process of claim 78, wherein a reaction time of the polyester melt from an It.V. of 0.40 dL/g through and up to an It.V. ranging from at least 0.68 dL/g to 0.94 dL/g is 150 minutes or less.

92. The process of claim 91, wherein the reaction time is 90 minutes or less.

93. The process of claim 78, wherein prior to adding the phosphorus atoms, the It.V. of the polyester melt upon solidification ranges from 0.82 dL/g to 0.92 dL/g.

94. The process of claim 78, wherein vacuum is applied in the final reactor at a pressure ranging from 0.5 to 1.0 torr and at a temperature ranging from 270° C. to 285° C.

95. The process of claim 78, wherein the polyester polymer comprises:
   (a) a carboxylic acid component comprising at least 80 mole % of the residues of terephthalic acid, derivatives of terephthalic acid, or mixtures thereof and
   (b) a hydroxyl component comprising at least 80 mole % of the residues of ethylene glycol,
based on 100 mole percent of carboxylic acid component residues and 100 mole percent of hydroxyl component residues in the polyester polymer.

96. Finished polyester polymer particles having an average It.V. of at least 0.74 dL/g obtained through a melt phase polymerization process and a residual acetaldehyde level of 5 ppm or less, wherein said particles have a degree of crystallinity of at least 30%, contain aluminum atoms in an amount of at least 10 ppm based on the weight of the polyester polymer, and contain less than 5 ppm of catalytically active titanium atoms based on the weight of the polyester polymer, wherein said polyester polymer comprises:
   (a) a carboxylic acid component comprising at least 80 mole % of the residues of terephthalic acid, derivatives of terephthalic acid, or mixtures thereof and
   (b) a hydroxyl component comprising at least 80 mole % of the residues of ethylene glycol,
based on 100 mole percent of carboxylic acid component residues and 100 mole percent of hydroxyl component residues in the polyester polymer, and wherein said aluminum atoms are residues of an aluminum compound represented by the formula:

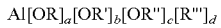

wherein R, R', R" are independently an alkyl group, aryl group, acyl group or hydrogen, R''' is an anionic group, and a, b, c, d are independently 0 or positive integers, and a+b+c+d is no greater than 3.

97. The particles of claim 96, contained in a shipping container.

98. The particles of claim 96, containing a nonzero amount of alkaline earth metal atoms or alkali metal atoms, and a nonzero amount of phosphorus atoms.

99. The particles of claim 98, wherein the polyester polymer has an acetaldehyde generation rate of less than 15 ppm.

100. The particles of claim 99, wherein the acetaldehyde generation rate is less than 10 ppm.

101. The particles of claim 98, wherein the particles have an L* of at least 60.

102. The particles of claim 101, wherein the L* is at least 73.

103. The particles of claim 96, wherein the particles lack organic acetaldehyde scavengers.

104. The particles of claim 96, wherein the particles are not solid state polymerized.

105. The particles of claim 96, wherein the particles are fed to an injection molding machine for converting the particles into articles.

106. The particles of claim 105, wherein the particles are molded into bottle preforms.

107. The particles of claim 106, wherein the particles are molded into the bottle preforms at a temperature ranging from 280° C. to 290° C. with a melt residence time of 2 minutes or less, and wherein the bottle preforms have an L* of 65 or more.

108. An article obtained by feeding pellets to a melt processing zone, melting the pellets to form a polyester melt, and forming the article from the polyester melt, wherein said pellets have an It.V. of at least 0.72 dL/g and have not been solid state polymerized, said pellets comprising a polyester polymer and:
   a) aluminum atoms; and
   b) alkaline earth metal atoms or alkali metal atoms;
   c) phosphorus atoms; and
   d) less than 5 ppm of catalytically active titanium atoms based on the weight of the polyester polymer,
wherein said article has an acetaldehyde level of less than 11 ppm, wherein said polyester polymer comprises
   (a) a carboxylic acid component comprising at least 80 mole% of the residues of terephthalic acid, derivatives of terephthalic acid, or mixtures thereof and
   (b) a hydroxyl component comprising at least 80 mole% of the residues of ethylene glycol,
based on 100 mole percent of carboxylic acid component residues and 100 mole percent of hydroxyl component residues in the polyester polymer, and wherein said aluminum atoms are residues of an aluminum compound represented by the formula:

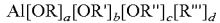

wherein R, R', R" are independently an alkyl group, aryl group, acyl group or hydrogen, R''' is an anionic group, and a, b, c, d are independently 0 or positive integers, and a+b+c+d is no greater than 3.

109. The article of claim 108, wherein said article is a bottle preform.

110. The article of claim 109, wherein the bottle preform is made without the addition of organic acetaldehyde scavengers.

111. The article of claim 109, wherein the pellets have an It.V. of at least 0.76 dL/g.

112. The article of claim 108, wherein the acetaldehyde level is 7 ppm or less.

113. The article of claim 108, wherein the pellets contain the phosphorus atoms in an amount of at least 20 ppm.

114. The article of claim 108, wherein the article has an L* of at least 70.

115. The article of claim 108, wherein the acetaldehyde level is 4 ppm or less.

116. The composition of claim 7, wherein said lithium atoms are residues of a lithium compound comprising lithium acetate dihydrate or lithium hydroxide.

117. The composition of claim 1, wherein the aluminum compound comprises aluminum acetate.

118. The composition of claim 12, wherein the molar ratio of said lithium atoms to said aluminum atoms is 0.1 to 75.

119. The composition of claim 118, wherein the molar ratio of said lithium atoms to said aluminum atoms is 0.5 to 5.

120. The composition of claim 45, wherein the alkali metal atoms comprise lithium atoms and the molar ratio of the lithium atoms to the aluminum atoms ranges from 0.1 to 10, and the molar ratio of the phosphorus atoms to the total moles of the aluminum atoms and the lithium atoms ranges from 0.1 to 3.

121. The composition of claim 120, wherein the molar ratio of the lithium atoms to the aluminum atoms ranges from 0.5 to 5, and the molar ratio of the phosphorus atoms to the total moles of the aluminum atoms and the lithium atoms ranges from 0.3 to 2.

122. The composition of claim 65, wherein the alkali metal atoms are lithium atoms and the molar ratio of the lithium atoms to the aluminum atoms ranges from 0.1 to 10.

123. The composition of claim 122, wherein the molar ratio of the lithium atoms to the aluminum atoms ranges from 1 to 5.

124. The composition of claim 72, wherein the alkali metal atoms comprise lithium atoms and the molar ratio of the phosphorus atoms to the total of the aluminum atoms and the lithium atoms ranges from 0.05 to 3.

125. The composition of claim 124, wherein the molar ratio of the phosphorus atoms to the total of the aluminum atoms and the lithium atoms ranges from 0.5 to 2.

* * * * *